United States Patent
Isono

(10) Patent No.: US 11,181,177 B2
(45) Date of Patent: Nov. 23, 2021

(54) TORQUE VECTORING DEVICE

(71) Applicant: TOYOTA JIDOSHA KABUSHIKI KAISHA, Toyota (JP)

(72) Inventor: Hiroshi Isono, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/996,003

(22) Filed: Aug. 18, 2020

(65) Prior Publication Data
US 2021/0062903 A1 Mar. 4, 2021

(30) Foreign Application Priority Data

Sep. 3, 2019 (JP) .............................. JP2019-160039

(51) Int. Cl.
*F16H 48/36* (2012.01)
*F16H 48/08* (2006.01)
*F16H 48/24* (2006.01)

(52) U.S. Cl.
CPC ............. *F16H 48/36* (2013.01); *F16H 48/08* (2013.01); *F16H 48/24* (2013.01); *F16H 2048/082* (2013.01); *F16H 2048/085* (2013.01); *F16H 2048/364* (2013.01); *F16H 2048/368* (2013.01)

(58) Field of Classification Search
None
See application file for complete search history.

(56) References Cited

U.S. PATENT DOCUMENTS

| 6,340,077 | B1 * | 1/2002 | Schaffer ............... B60T 13/741 |
| | | | 188/156 |
| 10,059,199 | B2 * | 8/2018 | Jeong ........................ B60K 1/02 |
| 10,358,051 | B2 * | 7/2019 | Isono .................... F16D 65/186 |
| 10,384,535 | B2 * | 8/2019 | Isono ................... F16D 55/2262 |
| 10,442,282 | B2 * | 10/2019 | Shinohara ................. B60L 7/26 |
| 2016/0153537 | A1 | 6/2016 | Kubo et al. |
| 2017/0210244 | A1 * | 7/2017 | Isono .................. B60L 15/2009 |
| 2017/0227104 | A1 * | 8/2017 | Isono ..................... F16H 48/36 |

FOREIGN PATENT DOCUMENTS

JP 6122119 B2 4/2017

* cited by examiner

*Primary Examiner* — Leslie A Nicholson, III
(74) *Attorney, Agent, or Firm* — Oliff PLC

(57) ABSTRACT

A downsized torque vectoring device that is easily to be mounted on an automobile. The torque vectoring device comprises: a differential mechanism that allows a first driveshaft and second driveshaft to rotate at different speeds; an actuator that applies a control torque to the differential mechanism to rotate the first driveshaft and the second driveshaft at different speeds; and a reversing mechanism that allows the first driveshaft and the second driveshaft to rotate in opposite directions. A gear ratio of a first gear train and a gear ratio of the second gear train are different from each other.

25 Claims, 22 Drawing Sheets

TORQUE VECTORING DEVICE

CROSS REFERENCE TO RELATED APPLICATION

The present disclosure claims the benefit of Japanese Patent Application No. 2019-160039 filed on Sep. 3, 2019, with the Japanese Patent Office, the disclosures of which are incorporated herein by reference in its entirety.

BACKGROUND

Field of the Invention

Embodiments of the present disclosure relate to the art of a torque vectoring device for controlling a distribution ratio of a torque delivered to right and left driveshafts.

Discussion of the Related Art

JP-B2-6122119 describes one example of a drive gear unit as a torque vectoring device mounted on a vehicle. The drive gear unit taught by JP-B2-6122119 comprises a differential gear unit that distributes rotational torque into right and left wheels, and a control (or differential) motor that controls a distribution ratio of torque distributed through the differential gear unit to the right and left wheels. As illustrated in FIG. 1 of JP-B2-6122119, the drive gear unit comprises two sets of planetary gear units. In the drive gear unit, sun gears of the planetary gear units are connected to each other through a connection shaft to serve as an input element, each carrier of the planetary gear units individually serves as an output element, and each ring gear of the planetary gear units individually serves as a reaction element. An intermediate gear is fitted onto an intermediate portion of the connection shaft, and an input gear to which torque is delivered from a prime mover is mated with the intermediate gear. Each of the carriers is individually connected to the drive wheels through a driveshaft. The ring gears are connected to each other through a reverse rotation member including a first gear and a second gear, and the control motor is connected to one of the ring gears. Specifically, the first gear includes a first pinion engaged with outer teeth of one of the ring gears, a shaft member, and a second pinion, and the first pinion and the second pinion are mounted on each end of the shaft member. Likewise, the second gear includes a first pinion engaged with outer teeth of other one of the ring gears, a shaft member, and a second pinion, and the first pinion and the second pinion are mounted on each end of the shaft member. The second pinion of the first gear is engaged with the second pinion of the second gear. Thus, the reverse rotation member transmits torque delivered to one of the ring gears from the control motor to the other one of ring gears while reversing.

The drive gear unit shown in FIG. 19 of JP-B2-6122119 the ring gears are connected to each other through the connection member to serve as the input element, the carriers serve the output element respectively, and the sun gears serve as the reaction element respectively. Specifically, the connection member includes the first pinion engaged with the outer teeth of one of the ring gears, the second pinion engaged with the outer teeth of other one of the ring gears, and the shaft member, and the first pinion and the second pinion are mounted on each end of the shaft member. A drive gear to which torque is delivered from the prime mover is engaged with the outer teeth of the other one of the ring gears, and each of the carriers is individually connected to the drive wheels through the driveshaft. In the drive gear unit shown in FIG. 19 of JP-B2-6122119, the sun gears are connected to each other through a reversing motor including a motor and a gear unit. In the reversing motor, one end of a rotor shaft serves as a first output shaft, and a pinion is mounted on the other end of the rotor shaft. A first counter gear is mounted on one end of a counter shaft to be engaged with the pinion, and a second counter gear is mounted on the other end of the counter shaft to be engaged with inner teeth of a rotary member formed on a second output shaft extending coaxially with the first output shaft. The first output shaft is connected to one of the sun gears and the second output shaft is connected to the other one of the sun gears so that the torque delivered to one of the sun gears is delivered to the other one of the sun gears through the reversing motor while being reversed. That is, the reversing motor serves not only the control motor but also a reversing mechanism.

In order to fit the drive gear unit taught by JP-B2-6122119 into an automobile, it is preferable to downsize the drive gear unit as much as possible. However, in the drive gear unit shown in FIG. 1 of JP-B2-6122119, the reverse rotation member and the control motor are situated radially outer side of the ring gears thereby increasing the size of the drive gear unit. In the drive gear unit of this kind, for example, a torque of the control motor may be increased to downsize the control motor by arranging a speed reducing mechanism of large speed reducing ratio between the control motor and the ring gear. In this case, however, the size of the drive gear unit may be increased by the speed reducing mechanism.

On the other hand, in the drive gear unit shown in FIG. 19 of JP-B2-6122119, the reversing motor is disposed between the sun gears, and hence the drive gear unit may be downsized in a radial direction but it is not easy. That is, the reversing motor has a complicated dual-axis structure in which the counter shaft extends parallel to the first output shaft and the second output shaft. Therefore, if the additional speed reducing mechanism is arranged in the drive gear unit to downsize the reversing motor, the structure of the reversing motor becomes more complicated and this makes the reversing motor difficult to be fitted within an outer diameter of each of the planetary gear units.

SUMMARY

Aspects of embodiments of the present disclosure have been conceived noting the foregoing technical problems, and it is therefore an object of embodiments of the present disclosure to downsize a torque vectoring device so as to mount the torque vectoring device easily on an automobile.

An exemplary embodiment of the present disclosure relates to a torque vectoring device, comprising: an input member to which a torque is delivered from a prime mover; a first driveshaft and a second driveshaft extending coaxially while being allowed to rotate relatively to each other; a differential mechanism that distributes the torque delivered to the input member to the first driveshaft and the second driveshaft, and that allows the first driveshaft and the second driveshaft to rotate at different speeds; an actuator that applies a control torque to the differential mechanism to rotate the first driveshaft and the second driveshaft at different speeds; and a reversing mechanism that allows the first driveshaft and the second driveshaft to rotate in opposite directions when the first driveshaft and the second driveshaft rotate at different speeds. In order to achieve the above-explained objective, according to the exemplary embodiment of the present disclosure, the differential mechanism comprises a first power transmission gear set and a second power transmission gear set arranged coaxially while being opposed to each other. The first power transmission gear set comprises: a power input element to which the torque is delivered from the input member; a first power output element which delivers the torque to the first driveshaft; and a first differential reaction element to which the control torque is applied as a reaction force against the torque delivered from the power input element to the first power output element. The second power transmission gear set comprises: the power input element; a second power output element which delivers the torque to the second driveshaft; and a second differential reaction element to which the control torque is applied as a reaction force against the torque delivered from the power input element to the second power output element. The reversing mechanism comprises: a first control gear set that is arranged coaxially around the first driveshaft and the second driveshaft to transmit the control torque to the first driveshaft through the first differential reaction element; and a second control gear set that is arranged coaxially around the first driveshaft and the second driveshaft to transmit the control torque to the second driveshaft through the second differential reaction element. The first control gear set comprises: a control input element to which the control torque of the actuator is applied; a first control output element which delivers the control torque to the first driveshaft; a first planetary gear to which the control torque is delivered from the control input element; and a first gear that engages with the first planetary gear to serve as the control input element or the first control output element. The second control gear set comprises: the control input element; a second control output element which delivers the control torque to the second driveshaft; a second planetary gear which is arranged coaxially with the first planetary gear, and to which the control torque is delivered from the control input element; and a second gear that engages with the second planetary gear to serve as the control input element or the second control output element. A first gear train includes the first planetary gear and the first gear, and a second gear train includes the second planetary gear and the second gear. A gear ratio of the first gear train and a gear ratio of the second gear train are different from each other.

In a non-limiting embodiment, a first speed reducing ratio of the reversing mechanism as a ratio of a speed of the first control output element to a speed of the control input element may be greater than 1. A second speed reducing ratio of the reversing mechanism as a ratio of a speed of the second control output element to the speed of the control input element may be greater than 1. The reversing mechanism may serve as a speed reducing gear set to transmit the control torque to the first control output element and the second control output element while multiplying the control torque.

In a non-limiting embodiment, in the differential mechanism, the power input element may be connected to the input member, the first power output element may be connected to the first driveshaft, and the second power output element may be connected to the second driveshaft. In the reversing mechanism, the control input element may be connected to the actuator, the first gear may serve as the first control output element, and the second gear may serve as the second control output element. The reversing mechanism may transmit the control torque applied to the control input element to the first driveshaft and the second driveshaft while multiplying the control torque.

In a non-limiting embodiment, the reversing mechanism may be rotated passively together with the power input element, the first power output element, and the second power output element, when the first driveshaft and the second driveshaft rotate in a same direction at a same speed.

In a non-limiting embodiment, the torque vectoring device may further comprise: a third planetary gear arranged coaxially with the first planetary gear and the second planetary gear; and a carrier that supports the first planetary gear, the second planetary gear, and the third planetary gear in a rotatable and revolvable manner. The first planetary gear, the second planetary gear, and the third planetary gear may rotate integrally, and the torque may be delivered from the power input element to the third planetary gear.

In a non-limiting embodiment, the torque vectoring device may further comprise: a third planetary gear and a fourth planetary gear arranged coaxially with the first planetary gear and the second planetary gear; and a carrier that supports the first planetary gear, the second planetary gear, the third planetary gear, and the fourth planetary gear in a rotatable and revolvable manner. The first planetary gear and the third planetary gear may be formed integrally to rotate integrally. The second planetary gear and the fourth planetary gear may be formed integrally to rotate integrally. A unit of the first planetary gear and the third planetary gear and a unit of the second planetary gear and the fourth planetary gear may be allowed to rotate relatively to each other. The torque may be delivered to the third planetary gear and the fourth planetary gear from the power input element.

In a non-limiting embodiment, the differential mechanism may comprise: the first planetary gear, the second planetary gear, and the third planetary gear; a first sun gear, a second sun gear, and a third sun gear arranged coaxially with one another while engaging with the first planetary gear, the second planetary gear, and the third planetary gear, respectively; and the carrier. The first sun gear, the second sun gear, and the third sun gear may be allowed to rotate relatively to one another. The first power transmission gear set may comprise: the third sun gear serving as the power input element; the first sun gear serving as the first power output element; and the carrier serving as the first differential reaction element. The second power transmission gear set may comprise: the third sun gear serving as the power input element; the second sun gear serving as the second power output element; and the carrier serving as the second differential reaction element. The reversing mechanism may comprise: the first planetary gear, the second planetary gear, and the third planetary gear; the first sun gear, the second sun gear, and the third sun gear; and the carrier. The first control gear set may comprise: the carrier serving as the control input element; and the first sun gear serving as the first gear to serve as the first control output element. The second control gear set may comprise: the carrier serving as the control input element; and the second sun gear serving as the second gear to serve as the second control output element. A number of teeth of the first sun gear, a number of teeth of the second sun gear, and a number of teeth of the third sun gear may be identical to one another. A number of teeth of the first planetary gear may be larger than a number of teeth of the third planetary gear. A number of teeth of the second planetary gear may be smaller than the number of teeth of the third planetary gear.

In a non-limiting embodiment, the differential mechanism may comprise: the first planetary gear, the second planetary gear, and the third planetary gear; a first sun gear, a second sun gear, and a third sun gear arranged coaxially with one another while engaging with the first planetary gear, the second planetary gear, and the third planetary gear, respectively; the carrier; and a ring gear as an internal gear engaging with the third planetary gear. The first sun gear, the second sun gear, and the third sun gear may be allowed to rotate relatively to one another. The first power transmission gear set may comprise: the third sun gear serving as the power input element; the first sun gear serving as the first power output element; and the ring gear serving as the first differential reaction element. The second power transmission gear set may comprise: the third sun gear serving as the power input element; the second sun gear serving as the second power output element; and the ring gear serving as the second differential reaction element. The reversing mechanism may comprise: the first planetary gear, the second planetary gear, and the third planetary gear; the first sun gear, the second sun gear, and the third sun gear; the carrier; and the ring gear. The first control gear set may comprise: the ring gear serving as the control input element; and the first sun gear serving as the first gear to serve as the first control output element. The second control gear set may comprise: the ring gear serving as the control input element; and the second sun gear serving as the second gear to serve as the second control output element. A number of teeth of the first sun gear, a number of teeth of the second sun gear, and a number of teeth of the third sun gear may be identical to one another. A number of teeth of the first planetary gear may be larger than a number of teeth of the third planetary gear. A number of teeth of the second planetary gear may be smaller than the number of teeth of the third planetary gear.

In a non-limiting embodiment, the differential mechanism may comprise: the first planetary gear, the second planetary gear, and the third planetary gear; a first ring gear as an internal gear, a second ring gear as an internal gear, and a third ring gear as an internal gear arranged coaxially with one another while engaging with the first planetary gear, the second planetary gear, and the third planetary gear, respectively; and the carrier. The first ring gear, the second ring gear, and the third ring gear may be allowed to rotate relatively to one another. The first power transmission gear set may comprise: the third ring gear serving as the power input element; the first ring gear serving as the first power output element; and the carrier serving as the first differential reaction element. The second power transmission gear set may comprise: the third ring gear serving as the power input element; the second ring gear serving as the second power output element; and the carrier serving as the second differential reaction element. The reversing mechanism may comprise: the first planetary gear, the second planetary gear, and the third planetary gear; the first ring gear, the second ring gear, and the third ring gear; and the carrier. The first control gear set may comprise: the carrier serving as the control input element; and the first ring gear serving as the first gear to serve as the first control output element. The second control gear set may comprise: the carrier serving as the control input element; and the second ring gear serving as the second gear to serve as the second control output element. A number of teeth of the first ring gear, a number of teeth of the second ring gear, and a number of teeth of the third ring gear may be identical to one another. A number of teeth of the first planetary gear may be larger than a number of teeth of the third planetary gear. A number of teeth of the second planetary gear may be smaller than the number of teeth of the third planetary gear.

In a non-limiting embodiment, the differential mechanism may comprise: the first planetary gear, the second planetary gear, and the third planetary gear; a first sun gear, a second sun gear, and a third sun gear arranged coaxially with one another while engaging with the first planetary gear, the second planetary gear, and the third planetary gear, respectively; and the carrier. The first sun gear, the second sun gear, and the third sun gear may be allowed to rotate relatively to one another. The first power transmission gear set may comprise: the third sun gear serving as the power input element; the first sun gear serving as the first power output element; and the carrier serving as the first differential reaction element. The second power transmission gear set may comprise: the third sun gear serving as the power input element; the second sun gear serving as the second power output element; and the carrier serving as the second differential reaction element. The reversing mechanism may comprise: the first planetary gear, the second planetary gear, and the third planetary gear; the first sun gear, the second sun gear, and the third sun gear; and the carrier. The first control gear set may comprise: the carrier serving as the control input element; and the first sun gear serving as the first gear to serve as the first control output element. The second control gear set may comprise: the carrier serving as the control input element; and the second sun gear serving as the second gear to serve as the second control output element. A number of teeth of the first sun gear, a number of teeth of the second sun gear, and a number of teeth of the third sun gear may be identical to one another. A number of teeth of the first planetary gear may be larger than a number of teeth of the third planetary gear. A number of teeth of the second planetary gear may be smaller than the number of teeth of the third planetary gear. The torque vectoring device may further comprise a speed reducing gear set that transmits the control torque of the actuator to the carrier while multiplying the control torque.

In a non-limiting embodiment, the differential mechanism may comprise: the first planetary gear, the second planetary gear, and the third planetary gear; a first sun gear, a second sun gear, and a third sun gear arranged coaxially with one another while engaging with the first planetary gear, the second planetary gear, and the third planetary gear, respectively; and the carrier. The first sun gear, the second sun gear, and the third sun gear may be allowed to rotate relatively to one another. The first power transmission gear set may comprise: the third sun gear serving as the power input element; the first sun gear serving as the first power output element; and the carrier serving as the first differential reaction element. The second power transmission gear set may comprise: the third sun gear serving as the power input element; the second sun gear serving as the second power output element; and the carrier serving as the second differential reaction element. The reversing mechanism may comprise: the first planetary gear, the second planetary gear, and the third planetary gear; the first sun gear, the second sun gear, and the third sun gear; and the carrier. The torque vectoring device may further comprise a speed reducing gear set that transmits the control torque of the actuator to the carrier while multiplying the control torque. The speed reducing gear set may comprise a fourth sun gear, a ring gear, and the carrier. The first control gear set may comprise: the fourth sun gear serving as the control input element; and the first sun gear serving as the first gear to serve as the first control output element. The second control gear set may comprise: the fourth sun gear serving as the control input element; and the second sun gear serving as the second gear to serve as the second control output element. A number of teeth of the first sun gear, a number of teeth of the second sun gear, and a number of teeth of the third sun gear may be identical to one another. A number of teeth of the first planetary gear may be larger than a number of teeth of the third planetary gear. A number of teeth of the second planetary gear may be smaller than the number of teeth of the third planetary gear.

In a non-limiting embodiment, the speed reducing gear set may further comprise a fourth planetary gear that engages with the fourth sun gear and the ring gear. The fourth planetary gear may be arranged coaxially with the first planetary gear, the second planetary gear, and the third planetary gear while being allowed to rotate relatively to the first planetary gear, the second planetary gear, and the third planetary gear. The first planetary gear, the second planetary gear, the third planetary gear, and the fourth planetary gear may be supported by the carrier in a rotatable and revolvable manner.

In a non-limiting embodiment, the differential mechanism may comprise: the first planetary gear, the second planetary gear, the third planetary gear, and the fourth planetary gear; a first ring gear as an internal gear, a second ring gear as an internal gear, a third ring gear as an internal gear, and a fourth ring gear arranged coaxially with one another while engaging with the first planetary gear, the second planetary gear, the third planetary gear, and the fourth planetary gear, respectively; and the carrier. The third ring gear and the fourth ring gear may rotate integrally. The first ring gear and the second ring gear may be allowed to rotate relatively to the third ring gear and the fourth ring gear. The first power transmission gear set may comprise: the third ring gear serving as the power input element; the first ring gear serving as the first power output element; and the carrier serving as the first differential reaction element. The second power transmission gear set may comprise: the fourth ring gear serving as the power input element; the second ring gear serving as the second power output element; and the carrier serving as the second differential reaction element. The reversing mechanism may comprise: the first planetary gear, the second planetary gear, the third planetary gear, and the fourth planetary gear; the first ring gear, the second ring gear, the third ring gear, and the fourth ring gear; and the carrier. The first control gear set may comprise: the carrier serving as the control input element; and the first ring gear serving as the first gear to serve as the first control output element. The second control gear set may comprise: the carrier serving as the control input element; and the second ring gear serving as the second gear to serve as the second control output element. A number of teeth of the first planetary gear, a number of teeth of the second planetary gear, a number of teeth of the third planetary gear, and a number of teeth of the fourth planetary gear may be identical to one another. A number of teeth of the first ring gear and a number of teeth of the second ring gear may be identical to each other. A number of teeth of the third ring gear may be smaller than the number of teeth of the first ring gear and the number of teeth of the second ring gear. A number of teeth of the fourth ring gear may be larger than the number of teeth of the first ring gear and the number of teeth of the second ring gear.

In a non-limiting embodiment, in the differential mechanism, the power input element may be connected to the input member, the first power output element may be connected to the first driveshaft, the second power output element may be connected to the second driveshaft, and the first differential reaction element and the second differential reaction element may be connected to the actuator through the reversing mechanism. In the reversing mechanism, the control input element may be connected to the actuator, the first gear may serve as the control input element or the first control output element, the second gear may serve as the control input element or the second control output element, and the reversing mechanism may transmit the control torque applied to the control input element to the first differential reaction element and the second differential reaction element while multiplying the control torque.

In a non-limiting embodiment, the first control gear set and the second control gear set of the reversing mechanism may serve as a speed reducing mechanism that multiplies the control torque. The control torque multiplied by the first control gear set may be delivered to the first differential reaction element, and the control torque multiplied by the second control gear set may be delivered to the second differential reaction element.

In a non-limiting embodiment, the torque vectoring device may further comprise: a first speed reducing mechanism that multiplies the torque delivered to the first driveshaft; and a second speed reducing mechanism that multiplies the torque delivered to the second driveshaft and that is arranged coaxially with the first speed reducing mechanism. The first power output element and the first driveshaft may be connected to each other through the first speed reducing mechanism, and the second power output element and the second driveshaft may be connected to each other through the second speed reducing mechanism. The reversing mechanism may be arranged between the first speed reducing mechanism and the second speed reducing mechanism in an axial direction.

In a non-limiting embodiment, the reversing mechanism may comprise: a first planetary gear, a second planetary gear, a third planetary gear, and a fourth planetary gear arranged coaxially with one another; a first sun gear, a second sun gear, a third sun gear, and a fourth sun gear arranged coaxially with one another while engaging with the first planetary gear, the second planetary gear, the third planetary gear, and the fourth planetary gear, respectively; and a carrier that supports the first planetary gear, the second planetary gear, the third planetary gear, and the fourth planetary gear in a rotatable and revolvable manner. The first planetary gear may rotate integrally with the third planetary gear, and the second planetary gear may rotate integrally with the fourth planetary gear. A pair of the first planetary gear and the third planetary gear and a pair of the second planetary gear and the fourth planetary gear may be allowed to rotate relatively to each other. The third sun gear and the fourth sun gear may be joined to each other. The first sun gear, the second sun gear, and a unit of the third sun gear and the fourth sun gear may be allowed to rotate relatively to one another. The first sun gear (128) is joined to the first differential reaction element, and the second sun gear may be joined to the second differential reaction element. The first control gear set may comprise: the carrier serving as the control input element; and the first sun gear serving as the first gear to serve as the first control output element. The second control gear set may comprise: the carrier serving as the control input element; and the second sun gear serving as the second gear to serve as the second control output element. A number of teeth of the first sun gear, a number of teeth of the second sun gear, a number of teeth of the third sun gear, and a number of teeth of the fourth sun gear may be identical to one another. A number of teeth of the third planetary gear and a number of teeth of the fourth planetary gear may be identical to each other. A number of teeth of the first planetary gear may be larger than the number of teeth of the third planetary gear and the number of teeth of the fourth planetary gear. A number of teeth of the second planetary gear may be smaller than the number of teeth of the third planetary gear and the number of teeth of the fourth planetary gear.

In a non-limiting embodiment, the reversing mechanism may comprise: a first planetary gear, a second planetary gear, and a third planetary gear arranged coaxially with one another; a first sun gear, a second sun gear, and a third sun gear arranged coaxially with one another while engaging with the first planetary gear, the second planetary gear, and the third planetary gear, respectively; and a carrier that supports the first planetary gear, the second planetary gear, and the third planetary gear in a rotatable and revolvable manner. The first planetary gear, the second planetary gear, and the third planetary gear may rotate integrally. The first sun gear, the second sun gear, and the third sun gear may be allowed to rotate relatively to one another. The first sun gear may be connected to the first differential reaction element, and the second sun gear may be connected to the second differential reaction element. The first control gear set may comprise: the carrier serving as the control input element; and the first sun gear serving as the first gear to serve as the first control output element. The second control gear set may comprise: the carrier serving as the control input element; and the second sun gear serving as the second gear to serve as the second control output element. A number of teeth of the first sun gear, a number of teeth of the second sun gear, and a number of teeth of the third sun gear may be identical to one another. A number of teeth of the first planetary gear may be smaller than a number of teeth of the third planetary gear. A number of teeth of the second planetary gear may be larger than the number of teeth of the third planetary gear.

In a non-limiting embodiment, the reversing mechanism may comprise: a first planetary gear, a second planetary gear, a third planetary gear, and a fourth planetary gear arranged coaxially with one another; a first sun gear, a second sun gear, a third sun gear and a fourth sun gear arranged coaxially with one another while engaging with the first planetary gear, the second planetary gear, the third planetary gear, and the fourth planetary gear, respectively; a first ring gear as an internal gear, a second ring gear as an internal gear, a third ring gear as an internal gear, and a fourth ring gear as an internal gear arranged coaxially with one another while engaging with the first planetary gear, the second planetary gear, the third planetary gear, and the fourth planetary gear, respectively; and a first carrier, a second carrier, and a third carrier arranged coaxially with one another while supporting the first planetary gear, the second planetary gear, the third planetary gear and the fourth planetary gear respectively in a rotatable and revolvable manner. The first planetary gear, the second planetary gear, the third planetary gear, and the fourth planetary gear may be allowed to rotate relatively to one another. The first sun gear and the third sun gear may rotate integrally, and the second sun gear and the fourth sun gear may rotate integrally. A unit of the first sun gear and the third sun gear and a unit of the second sun gear and the fourth sun gear may be allowed to rotate relatively to each other. The first ring gear, the second ring gear, the third ring gear, and the fourth ring gear may rotate integrally. The first carrier, the second carrier, and the third carrier may be allowed to rotate relatively to one another. The first carrier may be connected to the first differential reaction element, and the second carrier may be connected to the second differential reaction element. The first control gear set may comprise: the first ring gear serving as the first gear to serve as the control input element; and the first carrier serving as the first control output element. The second control gear set may comprise: the second ring gear serving as the second gear to serve as the control input element; and the second carrier serving as the second control output element. A number of teeth of the first planetary gear, a number of teeth of the second planetary gear, a number of teeth of the third planetary gear, and a number of teeth of the fourth planetary gear may be identical to one another. A number of teeth of the third sun gear and a number of teeth of the fourth sun gear may be identical to each other. A number of teeth of the first sun gear may be smaller than the number of teeth of the third sun gear and the number of teeth of the fourth sun gear, and a number of teeth of the second sun gear may be larger than the number of teeth of the third sun gear and the number of teeth of the fourth sun gear. A number of teeth of the third ring gear and a number of teeth of the fourth ring gear may be identical to each other. A number of teeth of the first ring gear may be larger than the number of teeth of the third ring gear and the number of teeth of the fourth ring gear, and a number of teeth of the second ring gear may be smaller than the number of teeth of the third ring gear and the number of teeth of the fourth ring gear.

In a non-limiting embodiment, the reversing mechanism may comprise: a first planetary gear, a second planetary gear, and a third planetary gear arranged coaxially with one another; a first sun gear, a second sun gear, and a third sun gear arranged coaxially with one another while engaging with the first planetary gear, the second planetary gear, and the third planetary gear, respectively; a first ring gear as an internal gear, a second ring gear as an internal gear, and a third ring gear as an internal gear arranged coaxially with one another while engaging with the first planetary gear, the second planetary gear, and the third planetary gear, respectively; and a first carrier, a second carrier, and a third carrier arranged coaxially with one another while supporting the first planetary gear, the second planetary gear, and the third planetary gear respectively in a rotatable and revolvable manner. The first sun gear, the second sun gear, and the third sun gear may rotate integrally. The first ring gear, the second ring gear, and the third ring gear may rotate integrally. The first carrier, the second carrier, and the third carrier may be allowed to rotate relatively to one another. The first carrier may be connected to the first differential reaction element, and the second carrier may be connected to the second differential reaction element. The first control gear set may comprise: the first ring gear serving as the first gear to serve as the control input element; and the first carrier serving as the first control output element. The second control gear set may comprise: the second ring gear serving as the second gear to serve as the control input element; and the second carrier serving as the second control output element. A number of teeth of the first planetary gear, a number of teeth of the second planetary gear, and a number of teeth of the third planetary gear may be identical to one another. A number of teeth of the first sun gear may be smaller than a number of teeth of the third sun gear, and a number of teeth of the second sun gear may be larger than the number of teeth of the third sun gear. A number of teeth of the first ring gear may be larger than a number of teeth of the third ring gear, and a number of teeth of the second ring gear may be smaller than the number of teeth of the third ring gear.

In a non-limiting embodiment, the reversing mechanism may comprise: a first planetary gear, a second planetary gear, and a third planetary gear arranged coaxially with one another; a first sun gear, a second sun gear, and a third sun gear arranged coaxially with one another while engaging with the first planetary gear, the second planetary gear, and the third planetary gear, respectively; a ring gear as an internal gear that engages with the second planetary gear; and a first carrier supporting the first planetary gear and the third planetary gear in a rotatable and revolvable manner, and a second carrier supporting the second planetary gear in a rotatable and revolvable manner that is arranged coaxially with the first carrier. The first planetary gear and the third planetary gear may rotate integrally with each other, but relatively to the second planetary gear. The first sun gear, the second sun gear, and the third sun gear may be allowed to rotate relatively to one another. The first carrier and the second carrier may be allowed to rotate relatively to each other. The first carrier may be connected to the second sun gear, the third sun gear and the ring gear may be fixed to be halted, the first sun gear may be connected to the first differential reaction element, and the second carrier may be connected to the second differential reaction element. The first control gear set may comprise: the first carrier serving as the control input element; and the first sun gear serving as the first gear to serve as the first control output element. The second control gear set may comprise: the second sun gear serving as the second gear to serve as the control input element; and the second carrier serving as the second control output element. A gear ratio of a gear train to transmit the control torque to the first differential reaction element through the first carrier, the first planetary gear, and the first sun gear may be different from a gear ratio of a gear train to transmit the control torque to the second differential reaction element through the second sun gear, the second planetary gear, and the second carrier.

In a non-limiting embodiment, the input member may comprise an output shaft as a hollow shaft that transmits the torque of the prime mover to the differential mechanism, and the actuator may comprise an output shaft as a hollow shaft that transmits the control torque to the reversing mechanism. The reversing mechanism may be held in hollow spaces of the output shaft of the input member and the output shaft of the actuator.

In a non-limiting embodiment, the actuator may comprise: a first rotary shaft protruding toward the first driveshaft to transmit the control torque to the first driveshaft; and a second rotary shaft protruding toward the second driveshaft to transmit the control torque to the second driveshaft. The reversing mechanism may comprise the first control gear set, and the second control gear set arranged on both sides of the actuator. The first control gear set may comprise a first input shaft to which the control torque is applied, and a first output shaft which delivers the control torque to the first driveshaft. The second control gear set may comprise a second input shaft to which the control torque is applied, and a second output shaft which delivers the control torque to the second driveshaft. The first rotary shaft may be connected to the first input shaft, and the second rotary shaft may be connected to the second input shaft. The first output shaft may be connected to the first differential reaction element, and the second output shaft may be connected to the second differential reaction element. A gear ratio of a gear train transmitting the control torque to the first differential reaction element through the first rotary shaft, the first input shaft, the first control gear set, and the first output shaft may be different from a gear ratio of a gear train transmitting the control torque to the second differential reaction element through the second rotary shaft, the second input shaft, the second control gear set, and the second output shaft.

In a non-limiting embodiment, the actuator may include: a motor that generates a drive torque as the control torque to rotate the first differential reaction element and the second differential reaction element; or a brake device that generates a brake torque as the control torque to brake the first differential reaction element and the second differential reaction element.

In a non-limiting embodiment, the prime mover may include at least one of: a motor that generates a drive torque to drive the first driveshaft and the second driveshaft; and a brake device that generates a brake torque to brake the first driveshaft and the second driveshaft.

In the torque vectoring device according to the exemplary embodiment of the present disclosure, the torque generated by the prime mover is distributed to the first driveshaft and the second driveshaft through the differential mechanism while absorbing a speed difference between the first driveshaft and the second driveshaft by the differential mechanism. That is, the differential mechanism allows the first driveshaft and the second driveshaft to rotate at different speeds. When the first driveshaft and the second driveshaft rotate at different speeds, the first driveshaft and the second driveshaft are allowed to rotate in opposite directions by the reversing mechanism. According to the exemplary embodiment of the present disclosure, therefore, speed difference between the first driveshaft and the second driveshaft can be absorbed efficiently. For example, the torque vectoring device according to the embodiment of the present disclosure may be mounted on a vehicle to serve as a differential mechanism in a powertrain.

As described, the torque vectoring device according to the embodiment of the present disclosure is provided with the actuator that applies the control torque to the differential reaction elements of the differential mechanism. Therefore, in addition to the above-explained advantage, a torque distribution ratio and a differential rotation between the first driveshaft and the second driveshaft may be controlled effectively.

Moreover, according to the exemplary embodiment of the present disclosure, the reversing mechanism is arranged coaxially around the first driveshaft and the second driveshaft. That is, the reversing mechanism as a main constituent of the torque vectoring device has a simple uniaxial structure. According to the exemplary embodiment of the present disclosure, therefore, the reversing mechanism may be arranged easily in the torque vectoring device without increasing a size of the torque vectoring device in the radial direction. Specifically, the first driveshaft and the second driveshaft are allowed to rotate in opposite directions by differentiating the gear ratio of the first gear train of the first control gear set and the gear ratio of the second gear train of the second control gear set from each other. For example, the gear ratio of the first gear train and the gear ratio of the second gear train may be differentiated from each other by increasing or reducing a number of teeth of the first gear with respect to a reference number, and increasing or reducing a number of teeth of the second gear with respect to a reference number. According to the exemplary embodiment of the present disclosure, therefore, the first driveshaft and the second driveshaft are allowed to rotate in opposite directions without employing a complex mechanism.

Thus, according to the exemplary embodiment of the present disclosure, the gear ratio of the first gear train of the first control gear set and the gear ratio of the second gear train of the second control gear set are differentiated from each other. Therefore, when the first driveshaft and the second driveshaft are rotated at a same speed, torques are applied to an engagement site of the first gear train and to an engagement site of the second gear train in opposite directions thereby causing interference between the first gear train and the second gear train. Consequently, the reversing mechanism is substantially brought into engagement to rotate integrally so that the first driveshaft and the second driveshaft are rotated integrally without rotating relatively to each other. By contrast, when the first driveshaft and the second driveshaft are rotated at different speeds, the reversing mechanism will not be brought into engagement due to interference between the first gear train and the second gear train. In this case, the first control gear set transmits the torque in accordance with the gear ratio of the first gear train, and the second control gear set transmits the torque in accordance with the gear ratio of the second gear train. Consequently, a rotational direction of one of the first driveshaft and the second driveshaft is reversed to a direction opposite to a rotational direction of the other one of the first driveshaft and the second driveshaft. Thus, the torque vectoring device according to the exemplary embodiment of the present disclosure not only distributes the torque of the prime mover to the first driveshaft and the second driveshaft, but also absorbs the speed difference between the first driveshaft and the second driveshaft. In addition, the torque distribution ratio between the first driveshaft and the second driveshaft may be changed by changing the control torque generated by the actuator.

Moreover, according to the exemplary embodiment of the present disclosure, a speed reducing ratio of the first control gear set and a speed reducing ratio of the second control gear set are greater than 1, respectively. That is, the reversing mechanism serves as a speed reducing gear set that multiplies the control torque of the actuator. According to the exemplary embodiment of the present disclosure, therefore, the reversing mechanism may be downsized thereby reducing the size of the torque vectoring device.

Thus, according to the exemplary embodiment of the present disclosure, the reversing mechanism having a uniaxial structure may be formed easily without employing a complex mechanism. Since the reversing mechanism is arranged coaxially with the first driveshaft and the second driveshaft, the size of the torque vectoring device will not be increased in the radial direction. In addition, since the reversing mechanism has a torque multiplying function, the actuator may be downsized. According to the exemplary embodiment of the present disclosure, therefore, the torque vectoring device may be downsized to be fitted easily in a vehicle.

According to the exemplary embodiment of the present disclosure, an electric motor or a brake mechanism may be adopted as the actuator. In a case of using the electric motor as the actuator, a speed difference between the first driveshaft and the second driveshaft is controlled by controlling the control torque generated by the electric motor. Otherwise, in a case of using the brake mechanism as the actuator, a speed difference between the first driveshaft and the second driveshaft is controlled by changing the control torque generated by the brake mechanism. By contrast, a differential rotation between the first driveshaft and the second driveshaft may be restricted by a regenerating torque of the electric motor or a brake torque of the brake mechanism.

According to the exemplary embodiment of the present disclosure, an electric motor, a brake mechanism, or an electric motor having a brake function may be adopted as the prime mover. In a case of using the electric motor as the prime mover, the electric motor generates not only a drive torque but also a regenerative torque to control a power distribution ratio between the first driveshaft and the second driveshaft. In this case, the power distribution ratio between the first driveshaft and the second driveshaft may be controlled highly accurately in a good response. Therefore, such control of the power distribution ratio by the electric motor may be utilized in an anti-lock braking system of a vehicle. By thus combining the electric motor with the torque vectoring device according to the exemplary embodiment of the present disclosure, a motor drive unit having a torque vectoring function may be formed. Otherwise, by combining the brake mechanism with the torque vectoring device according to the exemplary embodiment of the present disclosure, a brake unit having a torque vectoring function may be formed. Instead, by combining the electric motor having a brake function with the torque vectoring device according to the exemplary embodiment of the present disclosure, a power unit having a torque vectoring function may be formed.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present invention will now be explained with reference to the accompanying drawings. Note that the embodiments shown below are merely examples of the present invention which should not limit a scope of the present invention.

First Example

Figure 1:
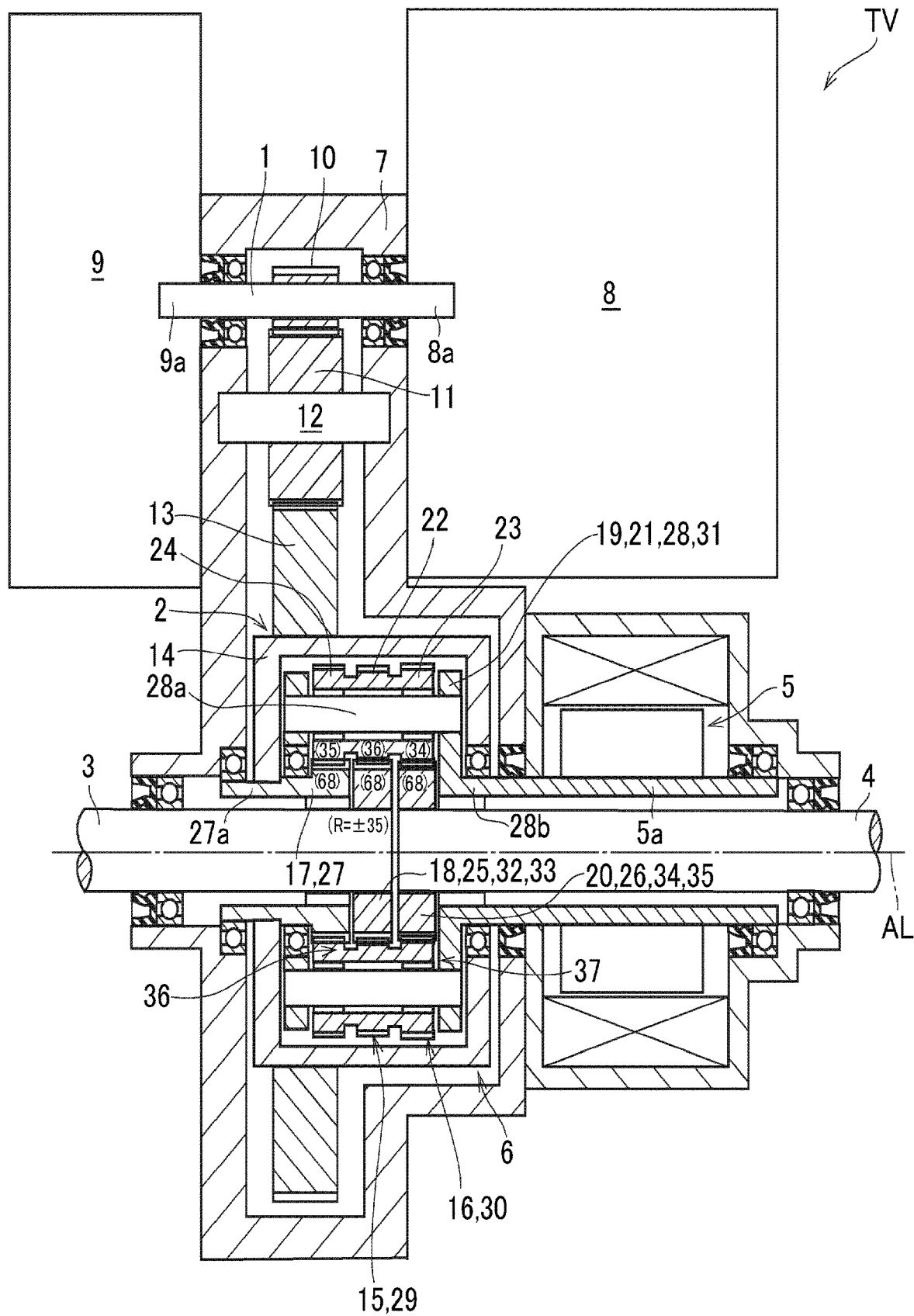
FIG. 1 is a cross-sectional view showing a structure of the torque vectoring device according to the first example of the present disclosure.

Referring now to FIG. 1, there is shown a structure of a torque vectoring device TV according to the first example of the present invention. As shown in FIG. 1, the torque vectoring device TV comprises an input member 1, a differential mechanism 2, a first driveshaft 3, a second driveshaft 4, an actuator 5, and a reversing mechanism 6.

A drive torque generated by a prime mover is applied to the input member 1 as a rotary shaft. According to the first example, both ends of the input member 1 is supported by a case 7 of the torque vectoring device TV in a rotatable manner.

An output shaft 8a of a motor 8 as a prime mover is connected to one end of the input member 1, and a rotary shaft 9a of a brake device 9 is connected to the other end of the input member 1. The motor 8 generates a torque including a drive torque and a regenerative torque. For example, a permanent magnet type synchronous motor or an induction motor may be adopted as the motor 8. On the other hand, the brake device 9 generates a brake torque. For example, an electromagnetic brake that brakes a rotary member due to a magnetic attraction force generated by passage of an electric current, an electric brake that generates a frictional braking force using a feed screw mechanism driven by a motor, and a regenerative brake that brakes a rotary member utilizing a resistance force generated when generating electricity by a motor, may be adopted as the brake device 9.

Thus, the motor 8 and the brake device 9 are integrated with the torque vectoring device TV according to the first example to form a power unit having a torque vectoring function and a braking function. Here, the torque vectoring device TV according to the first example may be combined only with the motor 8 to form a motor drive unit having a torque vectoring function, or only with the brake device 9 to form a brake unit having a torque vectoring function.

A pinion 10 as an input gear is mounted on an intermediate portion of the input member 1 to rotate integrally with the input member 1, and torques of the motor 8 and the brake device 9 are delivered to the pinion 10. Specifically, the pinion 10 engages with a counter gear 11 supported by a counter gear shaft 12 in a rotatable manner, and both ends of the counter gear shaft 12 are fixed to the case 7. The counter gear 11 also engages with a differential ring gear 13 as an external gear formed around a differential case 14 in such a manner as to rotate integrally with the differential case 14, and a later-mentioned third sun gear shaft 27a is joined to the differential case 14. In the torque vectoring device TV according to the first example, therefore, the differential ring gear 13, the differential case 14, and the third sun gear shaft 27a are rotated integrally with one another. The differential mechanism 2, the reversing mechanism 6 and so on are held in the differential case 14, and according to the first example, the differential case 14 is supported in the case 7 while being allowed to rotate relatively with the case 7 and a later-mentioned carrier shaft 28b.

The counter gear 11 and the differential ring gear 13 are diametrically larger than the pinion 10 respectively, and teeth numbers of the counter gear 11 and the differential ring gear 13 are larger than a teeth number of the pinion 10 respectively. That is, a gear train formed of the pinion 10, the counter gear 11, and the differential ring gear 13 serves as a reduction gear mechanism that reduces an output speed from the differential ring gear 13 lower than an input speed to the pinion 10. In other words, the torque of the prime mover delivered to the input member 1 is further delivered to a power input element 17 of the differential mechanism 2 through the pinion 10, the counter gear 11, and the differential ring gear 13 while being multiplied.

The differential mechanism 2 comprises a first power transmission gear set 15 as a planetary gear set, and a second power transmission gear set 16 as a planetary gear set arranged coaxially with the first power transmission gear set 15. The first power transmission gear set 15 comprises: the power input element 17 to which the torque is delivered from the input member 1; a first power output element 18 which delivers the torque to the first driveshaft 3; and a first differential reaction element 19 to which a later-mentioned control torque is applied as a reaction force against the torque delivered from the power input element 17 to the first power output element 18. On the other hand, the second power transmission gear set 16 comprises: the power input element 17 which is also used in the first power transmission gear set 15; a second power output element 20 which delivers the torque to the second driveshaft 4; and a second differential reaction element 21 to which the control torque is applied as a reaction force against the torque delivered from the power input element 17 to the second power output element 20. According to the first example, a later-mentioned carrier 28 serves not only as the first differential reaction element 19 but also as the second differential reaction element 21.

Specifically, the differential mechanism 2 comprises: a set of first planetary gears 22, a set of second planetary gears 23, and a set of third planetary gears 24; a first sun gear 25, a second sun gear 26, and a third sun gear 27; and the carrier 28. Specifically, the first planetary gear 22, the second planetary gear 23, and the third planetary gear 24 are formed integrally and coaxially on a planetary pinion, and a plurality of the planetary pinions are arranged around the first sun gear 25, the second sun gear 26, and the third sun gear 27 also arranged coaxially to one another. Those planetary pinions on which the first planetary gear 22, the second planetary gear 23, and the third planetary gear 24 are formed respectively, are supported by the carrier 28 in a rotatable manner. Therefore, the first planetary gears 22, the second planetary gears 23, and the third planetary gears 24 are allowed to revolve around the first sun gear 25, the second sun gear 26, and the third sun gear 27, respectively.

Specifically, each of the planetary pinions on which the first planetary gear 22, the second planetary gear 23, and the third planetary gear 24 are formed is individually supported by a planetary gear shaft 28a so that the first planetary gear 22, the second planetary gear 23, and the third planetary gear 24 rotate integrally around the planetary gear shaft 28a. That is, on the planetary pinion, the first planetary gear 22, the second planetary gear 23, and the third planetary gear 24 are not allowed to rotate relatively to one another. The first sun gear 25, the second sun gear 26, and the third sun gear 27 are supported by the case 7 while being allowed to rotate relatively to one another, and the first planetary gears 22 engage with the first sun gear 25, the second planetary gears 23 engage with the second sun gear 26, and the third planetary gears 24 engage with the third sun gear 27, respectively.

The third sun gear shaft 27a rotated integrally with the third sun gear 27 is attached to the differential case 14 so that the differential case 14 is rotated integrally with the third sun gear shaft 27a. That is, the third sun gear 27 is rotated integrally with the differential ring gear 13. In the torque vectoring device TV according to the first example, therefore, the torque of the prime mover is delivered to the third sun gear 27 through the gear train formed of the input member 1, the pinion 10, the counter gear 11, and the differential ring gear 13. Accordingly, the third sun gear 27 serves as the power input element 17 of the differential mechanism 2.

The first sun gear 25 is fitted onto the first driveshaft 3 to rotate integrally with the first driveshaft 3. That is, the torque delivered to the differential mechanism 2 is partially delivered from the first sun gear 25 to the first driveshaft 3. Accordingly, the first sun gear 25 serves as the first power output element 18 of the differential mechanism 2.

The second sun gear 26 is fitted onto the second driveshaft 4 to rotate integrally with the second driveshaft 4. That is, the torque delivered to the differential mechanism 2 is partially delivered from the second sun gear 26 to the second driveshaft 4. Accordingly, the second sun gear 26 serves as the second power output element 20 of the differential mechanism 2.

The carrier shaft 28b rotated integrally with the carrier 28 is joined to an output shaft 5a of the actuator 5 so that the carrier 28 is rotated integrally with the output shaft 5a of the actuator 5. As explained later, the control torque delivered from the actuator 5 to the carrier 28 acts as a reaction force against the torque delivered from the power input element 17 to the first power output element 18 and the second power output element 20. In the differential mechanism 2, accordingly, the carrier 28 serves not only as the first differential reaction element 19 but also as the second differential reaction element 21.

Thus, in the first power transmission gear set 15 of the differential mechanism 2, the third sun gear 27 serves as the power input element 17, the first sun gear 25 serves as the first power output element 18, and the carrier 28 serves as the first differential reaction element 19. On the other hand, in the second power transmission gear set 16 of the differential mechanism 2, the third sun gear 27 serves as the power input element 17, the second sun gear 26 serves as the second power output element 20, and the carrier 28 serves as the second differential reaction element 21.

As described, the control torque delivered from the actuator 5 to the carrier 28 serving as the first differential reaction element 19 and the second differential reaction element 21 acts as the reaction force against the torque delivered from the power input element 17 to the first power output element 18 and the second power output element 20. Therefore, the first power output element 18 and the second power output element 20 are allowed to rotate at different speeds.

The first driveshaft 3 of the first power transmission gear set 15 and the second driveshaft 4 of the second power transmission gear set 16 are arranged coaxially along a rotational center axis AL while being allowed to rotate relatively to each other. An axially outer end (i.e., the left end in FIG. 1) of the first driveshaft 3 protrudes from the case 7 while being supported in a rotatable manner, and an axially outer end (i.e., the right end in FIG. 1) of the second driveshaft 4 protrudes from the case 7 while being supported in a rotatable manner. Given that the torque vectoring device TV is mounted on a vehicle, a drive wheel (not shown) is attached to the axially outer ends of the first driveshaft 3 and the second driveshaft 4 respectively.

An axially inner end of the first driveshaft 3 is attached to the first power output element 18, and an axially inner end of the second driveshaft 4 is attached to the second power output element 20. That is, a differential rotation between the first driveshaft 3 and the second driveshaft 4 is allowed by the differential mechanism 2. Specifically, when the vehicle on which the torque vectoring device TV is mounted makes a turn, an inner wheel attached to one of the first driveshaft 3 and the second driveshaft 4 and an outer wheel attached to the other one of the first driveshaft 3 and the second driveshaft 4 are rotated at different speeds. In this situation, a torque distribution ratio to the inner wheel and to the outer wheel may be altered by changing the control torque of the actuator 5.

In order to rotate the first driveshaft 3 and the second driveshaft 4 at different speeds, the control torque generated by the actuator 5 is applied to the first differential reaction element 19 and the second differential reaction element 21 of the differential mechanism 2. In a case of using an electric motor as the actuator 5 to generate the control torque, the electric motor generates not only a drive torque to rotate the first differential reaction element 19 and the second differential reaction element 21 but also a regenerative torque to brake the first differential reaction element 19 and the second differential reaction element 21. Instead, a brake mechanism may also be adopted as the actuator 5 to generate the control torque. For example, an electromagnetic brake that generates a magnetic attraction force when energized, and an electric brake that generates a frictional braking force by actuating a feed screw mechanism by an electric motor may also be adopted as the actuator 5. In this case, the actuator 5 generates a brake torque applied to the first differential reaction element 19 and the second differential reaction element 21.

According to the first example, the electric motor is adopted as the actuator 5, and a rotor shaft of the electric motor serves as an output shaft 5a. The output shaft 5a of the actuator 5 is joined to the carrier shaft 28b to rotate integrally with the carrier shaft 28b.

In the case of using the electric motor as the actuator 5, a speed difference between the first driveshaft 3 and the second driveshaft 4 is controlled by controlling the control torque generated by the electric motor. Otherwise, in the case of using the brake mechanism as the actuator 5, a speed difference between the first driveshaft 3 and the second driveshaft 4 is controlled by changing the control torque generated by the brake mechanism. By contrast, the differential rotation between the first driveshaft 3 and the second driveshaft 4 may also be restricted by the regenerating torque of the electric motor or the brake torque of the brake mechanism.

In order to allow the first driveshaft 3 and the second driveshaft 4 to rotate in opposite directions when those shafts 3 and 4 are rotated at different speeds, the reversing mechanism 6 is formed coaxially with the first driveshaft 3 and the second driveshaft 4. The reversing mechanism 6 comprises a first control gear set 29 as a planetary gear set and a second control gear set 30 as a planetary gear set arranged coaxially around the first driveshaft 3 and the second driveshaft 4. The first control gear set 29 transmits the control torque of the actuator 5 to the first driveshaft 3 through the first differential reaction element 19 of the differential mechanism 2, and the second control gear set 30 transmits the control torque of the actuator 5 to the second driveshaft 4 through the second differential reaction element 21 of the differential mechanism 2.

When the first driveshaft 3 and the second driveshaft 4 rotates in the same direction at a same speed, the reversing mechanism 6 is rotated passively together with the power input element 17, the first power output element 18, and the second power output element 20.

The first control gear set 29 comprises a control input element 31, a first control output element 32, the set of the first planetary gears 22, and a first gear 33. Specifically, the control torque of the actuator 5 is applied to the control input element 31, and the control torque is delivered from the first control output element 32 to the first driveshaft 3. In the reversing mechanism 6, the control torque is delivered to the first planetary gears 22 from the control input element 31, and the first gear 33 engages with the first planetary gears 22 to serve as the control input element 31 or the first control output element 32. On the other hand, the second control gear set 30 comprises the control input element 31 which is also used in the first control gear set 29, a second control output element 34 which delivers the control torque to the second driveshaft 4, the set of the second planetary gears 23, and a second gear 35. In the reversing mechanism 6, the control torque is delivered to the second planetary gears 23 from the control input element 31, and the second gear 35 engages with the second planetary gears 23 to serve as the control input element 31 or the second control output element 34.

The reversing mechanism 6 comprises: the set of the first planetary gears 22, the set of the second planetary gears 23, and the set of the third planetary gears 24; the first sun gear 25, the second sun gear 26, and the third sun gear 27; and the carrier 28. In the reversing mechanism 6, the carrier 28 serves as the control input element 31 of the first control gear set 29, and the first sun gear 25 engaging with the first planetary gears 22 serves not only as the first control output element 32 but also as the first gear 33 of the first control gear set 29. The carrier 28 also serves as the control input element 31 of the second control gear set 30, and the second sun gear 26 engaging with the second planetary gears 23 serves not only as the second control output element 34 but also as the second gear 35 of the second control gear set 30.

A first gear train 36 includes the set of the first planetary gears 22 and the first gear 33, and a second gear train 37 includes the set of the second planetary gears 23 and the second gear 35. A gear ratio of the first gear train 36 and a gear ratio of the second gear train 37 are different from each other. Specifically, a gear ratio between each of the first planetary gears 22 and the first sun gear 25 in the first gear train 36 is different from a gear ratio between each of the second planetary gears 23 and the second sun gear 26 in the second gear train 37. According to the first example, a number of teeth of the first sun gear 25, a number of teeth of the second sun gear 26, and a number of teeth of the third sun gear 27 are identical to one another. On the other hand, a number of teeth of the first planetary gear 22, a number of teeth of the second planetary gear 23, and a number of teeth of the third planetary gear 24 are smaller, respectively, than the number of teeth of the first sun gear 25, the number of teeth of the second sun gear 26, and the number of teeth of the third sun gear 27. Specifically, the number of teeth of the first sun gear 25, the number of teeth of the second sun gear 26, and the number of teeth of the third sun gear 27 are 68, respectively. On the other hand, the number of teeth of each of the first planetary gears 22 is 36, the number of teeth of each of the second planetary gears 23 is 34, and the number of teeth of each of the third planetary gears 24 is 35. That is, the number of teeth of the first planetary gear 22 is larger than the number of teeth of the third planetary gear 24, and the number of teeth of the second planetary gear 23 is smaller than the number of teeth of the third planetary gear 24.

For example, given that the number of teeth of the first planetary gear 22 is $z_{P1}$ and that the number of teeth of the first sun gear 25 is $z_{S1}$, the gear ratio $u_1$ of the first gear train 36 may be expressed as:

$$u_1 = z_{P1}/z_{S1}.$$

Specifically, given that the number of teeth $z_{P1}$ of the first planetary gear 22 is 36 and that the number of teeth $z_{S1}$ of the first sun gear 25 is 68, the gear ratio $u_1$ of the first gear train 36 is:

$$u_1 = 0.53.$$

Likewise, given that the number of teeth of the second planetary gear 23 is $z_{P2}$ and that the number of teeth of the second sun gear 26 is $z_{S2}$, the gear ratio $u_2$ of the second gear train 37 may be expressed as:

$$u_2 = z_{P2}/z_{S2}.$$

Specifically, given that the number of teeth $z_{P2}$ of the second planetary gear 23 is 34 and that the number of teeth $z_{S2}$ of the second sun gear 26 is 68, the gear ratio $u_2$ of the second gear train 37 is:

$$u_2 = 0.50.$$

Thus, the number of teeth $z_{P1}$ of the first planetary gear 22 and the number of teeth $z_{P2}$ of the second planetary gear 23 are different from each other, and hence the gear ratio u 1 of the first gear train 36 and the gear ratio $u_2$ of the second gear train 37 are different from each other.

Therefore, given that the first driveshaft 3 and the second driveshaft 4 are rotated at the same speed to transmit torque, interference is caused between the first gear train 36 of the first control gear set 29 and the second gear train 37 of the second control gear set 30. Specifically, the number of teeth $z_{P1}$ of each of the first planetary gears 22 in the first gear train 36 is 36, and the number of teeth $z_{P3}$ of each of the third planetary gears 24 in the gear train including the third sun gear 27 and the third planetary gears 24 is 35. That is, the number of teeth $z_{P1}$ of the first planetary gear 22 is one more than the number of teeth $z_{P3}$ of the third planetary gear 24 so that a rotational speed of the first sun gear 25 in the first gear train 36 is increased higher than a rotational speed of the third sun gear 27 by the one more tooth of the first planetary gear 22. On the other hand, the number of teeth $z_{P2}$ of each of the second planetary gears 23 is 34, and the number of teeth $z_{P3}$ of each of the third planetary gears 24 in the gear train including the third sun gear 27 and the third planetary gears 24 is 35. That is, the number of teeth $z_{P2}$ of the second planetary gear 23 is one less than the number of teeth $z_{P3}$ of the third planetary gear 24 so that a rotational speed of the second sun gear 26 in the second gear train 37 is reduced lower than a rotational speed of the third sun gear 27 by the reduction in the number of teeth $z_{P2}$ of the second planetary gear 23. Consequently, the first sun gear 25 and the second sun gear 26 are rotated in opposite directions. In this situation, the first planetary gears 22 engaging with the first sun gear 25 and the second planetary gears 23 engaging with the second sun gear 26 rotate and revolve integrally. That is, the first planetary gears 22 and the second planetary gears 23 do not rotate relatively to each other. Therefore, torques are applied to an engagement site of the first gear train 36 and to an engagement site of the second gear train 37 in opposite directions thereby causing interference between the first gear train 36 and the second gear train 37. Consequently, the reversing mechanism 6 is substantially brought into engagement to rotate integrally so that the first driveshaft 3 and the second driveshaft 4 are rotated integrally without rotating relatively to each other.

By contrast, given that the first driveshaft 3 and the second driveshaft 4 are rotated at different speeds, the reversing mechanism 6 will not be brought into engagement due to interference between the first gear train 36 and the second gear train 37. In this case, the first control gear set 29 is allowed to transmit torque in accordance with the gear ratio $u_1$ of the first gear train 36, and the second control gear set 30 is allowed to transmit torque in accordance with the gear ratio $u_2$ of the second gear train 37. In the torque vectoring device TV shown in FIG. 1, the reversing mechanism 6 in engagement is released by rotating the first gear train 36 and the second gear train 37 at different speeds. In this situation, as described, torques are applied to the engagement site of the first gear train 36 and to the engagement site of the second gear train 37 in opposite directions so that the first sun gear 25 and the second sun gear 26 are rotated relatively in opposite directions. That is, the rotational direction of the second sun gear 26 is reversed to the opposite direction to the rotational direction of the first sun gear 25. Consequently, the first driveshaft 3 and the second driveshaft 4 are rotated differentially in opposite directions.

In the reversing mechanism 6, a first speed reducing ratio as a ratio of a speed of the first control output element 32 to a speed of the control input element 31 is greater than 1, and a second speed reducing ratio as a ratio of a speed of the second control output element 34 to the speed of the control input element 31 is also greater than 1. Specifically, the first speed reducing ratio between the carrier 28 and the first sun gear 25, and the second speed reducing ratio between the carrier 28 and the second sun gear 26 are greater than 1, respectively. That is, the first control gear set 29 serves as a speed reducing mechanism that reduces an output speed from the first sun gear 25 lower than an input speed to the carrier 28, and the second control gear set 30 also serves as a speed reducing mechanism that reduces an output speed from the second sun gear 26 lower than the input speed to the carrier 28. Therefore, the control torque of the actuator 5 applied to the carrier 28 is transmitted to the first driveshaft 3 and the second driveshaft 4 while being multiplied.

As described, according to the first example, the number of teeth $z_{P1}$ of the first planetary gear 22 is 36, the number of teeth $z_{S1}$ of the first sun gear 25 is 68, the number of teeth $z_{P2}$ of the second planetary gear 23 is 34, the number of teeth $z_{S2}$ of the second sun gear 26 is 68, the number of teeth $z_{P3}$ of the third planetary gear 24 is 35, and the number of teeth $z_{S3}$ of the third sun gear 27 is 68. According to the first example, therefore, the first speed reducing ratio $R_1$ of the first control gear set 29 may be expressed as:

$$R_1 = 1/\{1-(z_{S3}/z_{P3})\cdot(z_{P1}/z_{S1})\} \approx 35; \text{ and}$$

the second speed reducing ratio $R_2$ of the second control gear set 30 may be expressed as:

$$R_2 = 1/\{1-(z_{S3}/z_{P3})\cdot(z_{P2}/z_{S2})\} \approx -35.$$

In general, a speed reducing ratio achieved by the conventional planetary gear sets falls within a range of approximately 4 to 10. Thus, the speed reducing ratios of the first control gear set 29 and the second control gear set 30 are greater than the speed reducing ratio of the conventional planetary gear sets.

In the first control gear set 29, the first differential reaction element 19 of the differential mechanism 2 (i.e., the carrier 28) and the first power output element 18 of the differential mechanism 2 (i.e., the first sun gear 25) are rotated in the same direction to transmit the control torque therebetween. By contrast, in the second control gear set 30, the rotational direction of the second power output element 20 of the differential mechanism 2 (i.e., the second sun gear 26) is reversed to the opposite direction to the rotational direction of the second differential reaction element 21 of the differential mechanism 2 (i.e., the carrier 28) to transmit the control torque therebetween. That is, given that the rotational direction of the first power output element 18 of the first control gear set 29 is defined as the forward direction, the second power output element 20 of the second control gear set 30 is rotated in the reverse or counter direction. In the description of the present invention, therefore, the second speed reducing ratio $R_2$ of the second control gear set 30 is indicated as a negative value (e.g., −35) for the sake of convenience, and in the first example shown in FIG. 1, the speed reducing ratio R is indicated commonly as R=±35.

Thus, in the torque vectoring device TV according to the first example, each of the first control gear set 29 and the second control gear set 30 of the reversing mechanism 6 individually serves as a speed reducing gear set whose speed reducing ratio is greater than 1. That is, the reversing mechanism 6 has not only a reversing function to allow the first driveshaft 3 and the second driveshaft 4 to rotate in the opposite directions when the first driveshaft 3 and the second driveshaft 4 rotate at different speeds, but also a torque multiplying function (or speed reducing function) to multiply the control torque generated by the actuator 5. Specifically, according to the first example, the speed reducing ratio of the reversing mechanism 6 to multiply the control torque of the actuator 5 is 35. In the torque vectoring device TV according to the first example, therefore, the actuator 5 can be downsized to reduce the size of the torque vectoring device TV.

In addition, according to the first example, the reversing mechanism 6 has a simple uniaxial structure. According to the first example, therefore, the reversing mechanism 6 serving not only as a reversing mechanism but also as a speed reducing mechanism may be formed easily. Moreover, since the reversing mechanism 6 is formed coaxially around the first driveshaft 3 and the second driveshaft 4, the size of the torque vectoring device VT is not increased in the radial direction. Further, since the reversing mechanism 6 may serve as the speed reducing mechanism, the actuator 5 may be downsized. For these reasons, the torque vectoring device VT may be mounted on a vehicle easily.

Here, it is to be noted that an arrangement of the set of the first planetary gears 22, the set of the second planetary gears 23, and the set of the third planetary gears 24, and an arrangement of the first sun gear 25, the second sun gear 26, and the third sun gear 27 should not be limited to those shown in FIG. 1. For example, positions of the set of the first planetary gears 22 and the first sun gear 25 may be switched with positions of the set of the second planetary gears 23 and the second sun gear 26. Instead, the set of the third planetary gears 24 and the third sun gear 27 may also be arranged at the right side in FIG. 1.

Other examples of the torque vectoring device TV are shown in FIGS. 2 to 22. In the following explanations, common reference numerals are allotted to the elements in common with those of the torque vectoring device TV according to the first example.

Second Example

Figure 2:
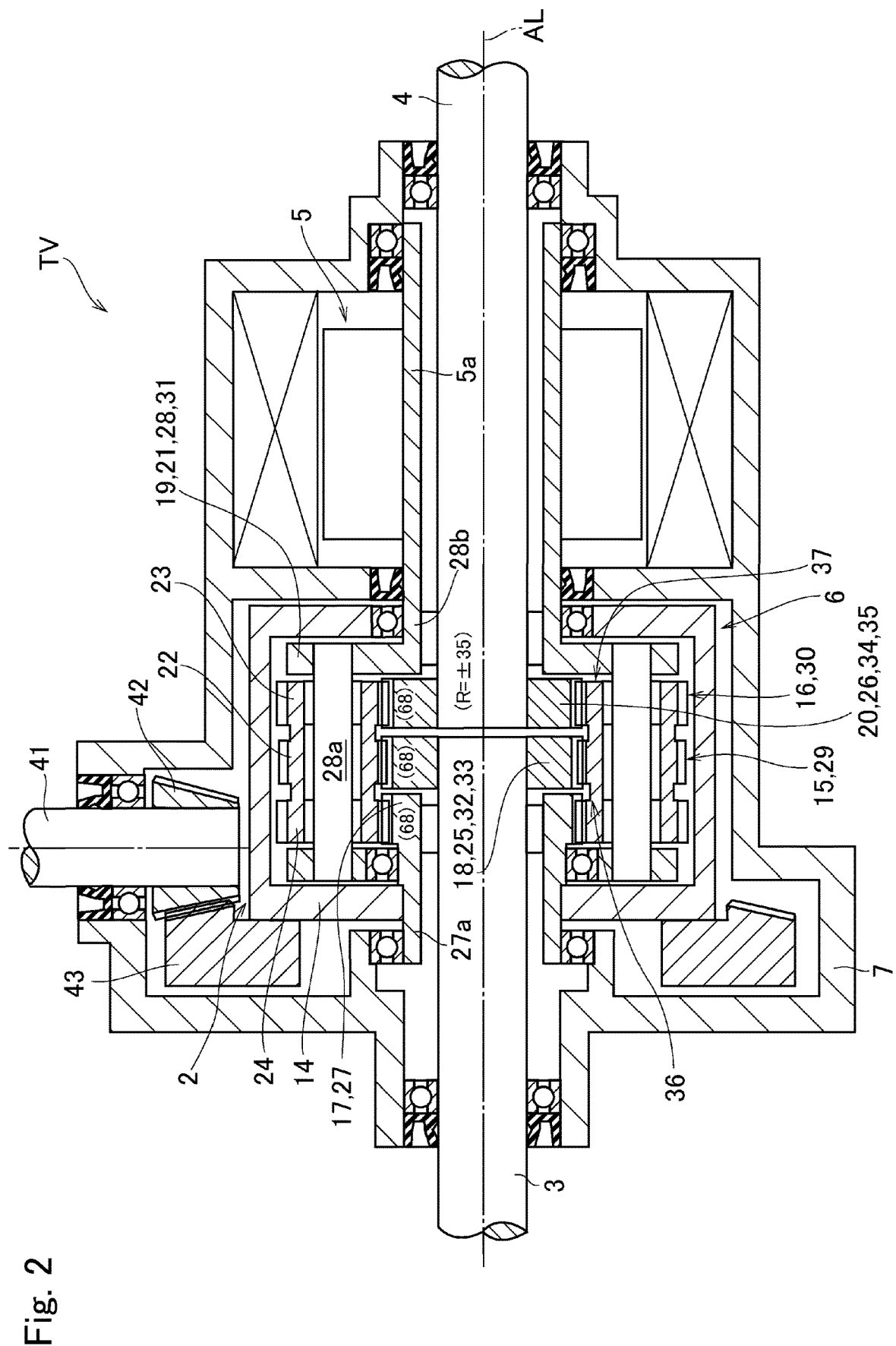
FIG. 2 is a cross-sectional view showing a structure of the torque vectoring device according to the second example of the present disclosure.

Turning to FIG. 2, there is shown a structure of the torque vectoring device TV according to the second example. According to the second example, an input member 41 is employed instead of the input member 1, and the torque of the prime mover is applied to the input member 41. Specifically, the input member 41 as a rotary shaft extends perpendicular to the rotational center axis AL while being supported rotatably by the case 7.

An input gear 42 is fitted onto one end (i.e., a lower end in FIG. 1) of the input member 41 to be rotated integrally with the input member 41. That is, the torque of the prime mover is transmitted to the input gear 42 through the input member 41. According to the second example, a diametrically-smaller bevel gear is adopted as the input gear 42, and the input gear 42 engages with a differential ring gear 43 as a diametrically-larger bevel gear. The differential ring gear 43 is arranged along an outer circumference of the differential case 14 to rotate integrally with the differential case 14. For example, a hypoid gear may also be adopted as the input gear 42 and the differential ring gear 43, respectively.

The other end (i.e., an upper end in FIG. 1) of the input member 41 is connected to the output shaft of the prime mover such as the motor 8 and the brake device 9. A structure of the torque vectoring device TV according to the second example from the differential case 14 to the first driveshaft 3 and the second driveshaft 4 through the differential mechanism 2 and the reversing mechanism 6 is similar to that of the first example.

Thus, according to the second example, the torque vectoring device TV as a differential mechanism having the torque vectoring function may be formed separately from the prime mover. According to the second example, therefore, the torque vectoring device TV may be fit easily into a vehicle instead of a conventional differential mechanism.

Third Example

Figure 3:
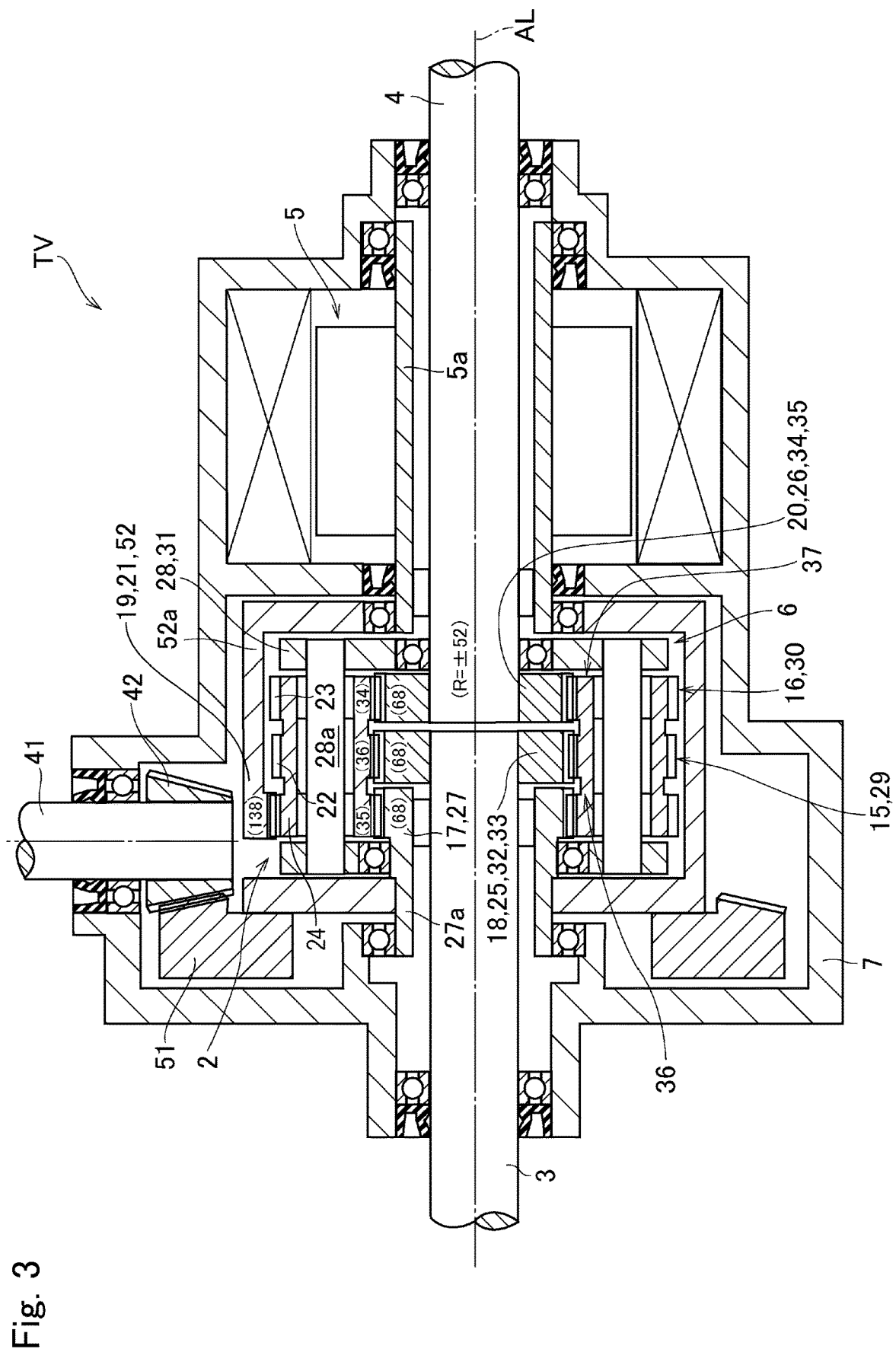
FIG. 3 is a cross-sectional view showing a structure of the torque vectoring device according to the third example of the present disclosure.

Turning to FIG. 3, there is shown a structure of the torque vectoring device TV according to the third example. According to the third example, the input gear 42 of the input member 41 engages with a differential ring gear 51 as a diametrically-larger bevel gear. Specifically, the differential ring gear 51 is attached to the third sun gear shaft 27a of the third sun gear 27 to rotate integrally with the third sun gear shaft 27a so that the torque of the prime mover is delivered to the third sun gear 27 through the input member 41, the input gear 42, and the differential ring gear 51. That is, in the torque vectoring device TV according to the third example, the third sun gear 27 also serves as the power input element 17 of the differential mechanism 2.

According to the third example, the carrier 28 of the differential mechanism 2 is joined to none of the rotary members. Specifically, the carrier 28 is supported by the third sun gear shaft 27a and the second driveshaft 4 while being allowed to rotate freely and relatively to the third sun gear shaft 27a and the second driveshaft 4.

The differential mechanism 2 comprises a ring gear 52 as an internal gear engaging with the third planetary gears 24. A ring gear shaft 52a formed integrally with the ring gear 52 is connected to the output shaft 5a of the actuator 5 so that the ring gear 52 is rotated integrally with the output shaft 5a of the actuator 5. Torque of the ring gear 52 is delivered to the first sun gear 25 and the second sun gear 26 through the third planetary gears 24, the first planetary gears 22, and the second planetary gears 23. According to the third example, therefore, the control torque of the actuator 5 is applied to the ring gear 52 to act as a reaction force against the torque delivered from the power input element 17 (i.e., the third sun gear 27) to the first power output element 18 (i.e., the first sun gear 25) and the second power output element 20 (i.e., the second sun gear 26). In the differential mechanism 2, accordingly, the ring gear 52 serves not only as the first differential reaction element 19 but also as the second differential reaction element 21.

Thus, the control torque of the actuator 5 is transmitted to the reversing mechanism 6 through the ring gear 52 while being reversed. According to the third example, therefore, the speed reducing ratio R between the actuator 5 and the first driveshaft 3 and the second driveshaft 4 of the reversing mechanism 6 can be increased compared to the first example.

As described, according to the first example, the number of teeth $z_{P1}$ of the first planetary gear 22 is set to 36, the number of teeth $z_{S1}$ of the first sun gear 25 is set to 68, the number of teeth $z_{P2}$ of the second planetary gear 23 is set to 34, the number of teeth $z_{S2}$ of the second sun gear 26 is set to 68, the number of teeth $z_{P3}$ of the third planetary gear 24 is set to 35, and the number of teeth $z_{S3}$ of the third sun gear 27 is set to 68. According to the first example, therefore, the speed reducing ratio R of the torque vectoring device TV is ±35. On the other hand, according to the third example, a number of teeth of the of the ring gear 52 is set to 138, and the numbers of teeth of the above-mentioned gears are identical to those as the first example. According to the third example, therefore, the speed reducing ratio R of the torque vectoring device TV is ±52 which is 1.5 times greater than that of the torque vectoring device TV according to the first example.

Thus, according to the third example, the speed reducing ratio of the torque vectoring device TV is increased compared to the first and second examples by the ring gear 52 serving not only as a reaction element of the differential mechanism 2 but also as an input element of the reversing mechanism 6. According to the third example, therefore, the control torque of the actuator 5 is further multiplied and hence the torque vectoring device TV can be further downsized.

Fourth Example

Figure 4:
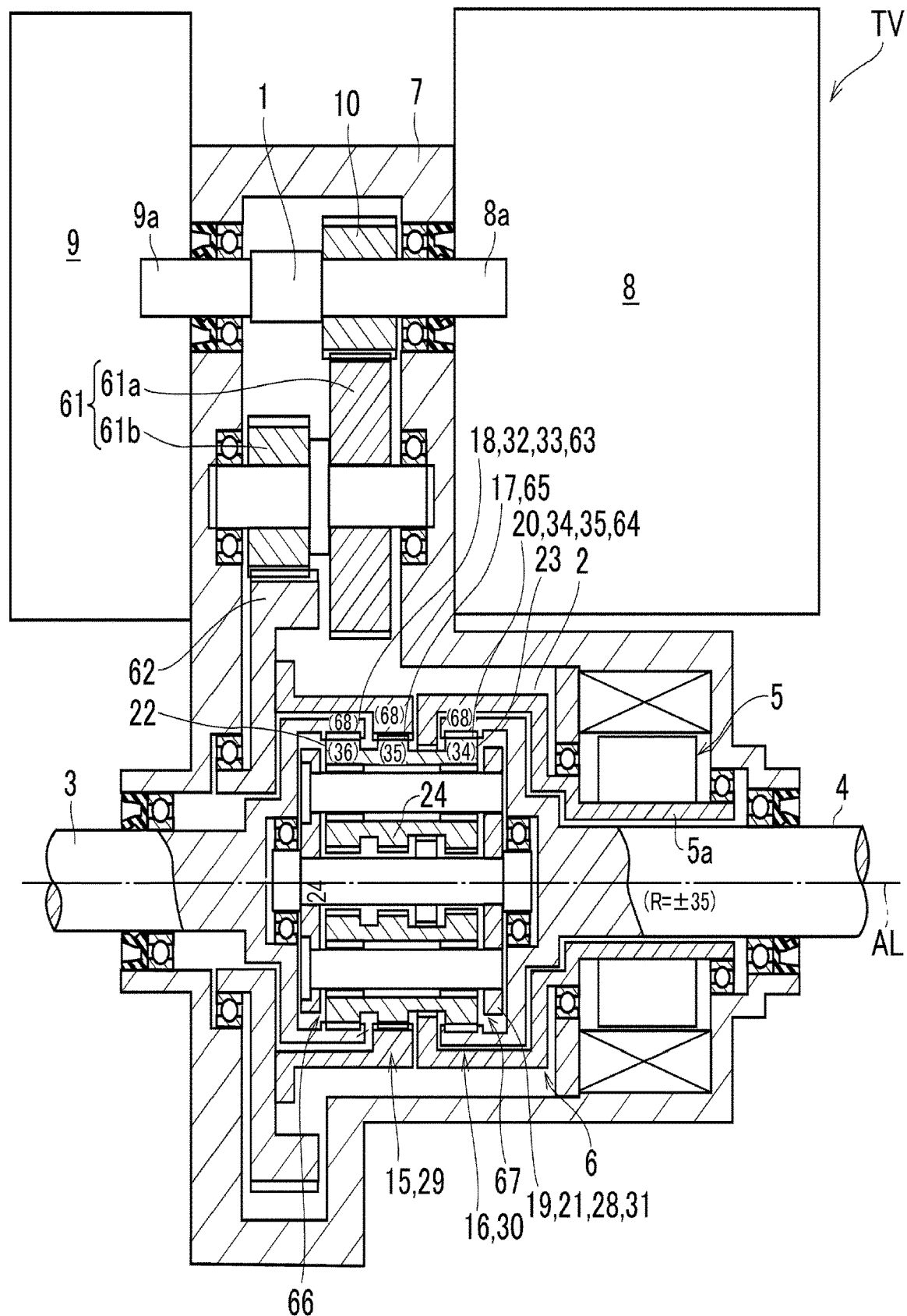
FIG. 4 is a cross-sectional view showing a structure of the torque vectoring device according to the fourth example of the present disclosure.

Turning to FIG. 4, there is shown a structure of the torque vectoring device TV according to the fourth example.

According to the fourth example, the pinion 10 mounted on the input member 1 engages with a diametrically-larger gear 61a of a reduction gear 61. As illustrated in FIG. 4, the reduction gear 61 comprises the diametrically-larger gear 61a and a diametrically-smaller gear 61b. The diametrically-larger gear 61a and the diametrically-smaller gear 61b are arranged coaxially with each other to be rotated integrally with each other. A diameter and a number of teeth of the diametrically-larger gear 61a are larger than a diameter and a number of teeth of the pinion 10, respectively. The diametrically-smaller gear 61b engages with a differential ring gear 62 as an external gear formed radially outer side of a later-mentioned third ring gear 65. A diameter and the number of teeth of the diametrically-smaller gear 61b are smaller than a diameter and a number of teeth of the differential ring gear 62, respectively. That is, a gear train formed of the pinion 10, the diametrically-larger gear 61a, the diametrically-smaller gear 61b, and the differential ring gear 62 serves as a reduction gear mechanism that reduces an output speed from the differential ring gear 62 lower than an input speed to the pinion 10. In other words, the torque of the prime mover (i.e., the motor 8 and the brake device 9) delivered to the input member 1 is further delivered to the third ring gear 65 of the differential mechanism 2 through the pinion 10, the reduction gear 61, and the differential ring gear 62 while being multiplied.

According to the fourth example, the differential mechanism 2 comprises: the set of the first planetary gears 22, the set of the second planetary gears 23, and the set of the third planetary gears 24; a first ring gear 63, a second ring gear 64, and a third ring gear 65; and the carrier 28. The first ring gear 63, the second ring gear 64, and the third ring gear 65 are arranged coaxially to one another while being allowed to rotate relatively to one another. Specifically, the first ring gear 63 engages with the first planetary gears 22, the second ring gear 64 engages with the second planetary gears 23, and the third ring gear 65 engages with the third planetary gears 24.

The first ring gear 63 is joined to the first driveshaft 3 to rotate integrally with the first driveshaft 3, the second ring gear 64 is joined to the second driveshaft 4 to rotate integrally with the second driveshaft 4, and the third ring gear 65 is joined to the differential ring gear 62 to rotate integrally with the differential ring gear 62.

The carrier 28 is joined to the output shaft 5a of the actuator 5 to rotate integrally with the output shaft 5a so that the control torque applied to the carrier 28 from the actuator 5 is transmitted to the first sun gear 25 through the first planetary gears 22 and to the second sun gear 26 through the second planetary gears 23. That is, the control torque applied to the carrier 28 acts as a reaction force against the torque delivered from the third ring gear 65 to the first ring gear 63 through the third planetary gears 24 and the first planetary gears 22, and against the torque delivered from the third ring gear 65 to the second ring gear 64 through the third planetary gears 24 and the second planetary gears 23.

Accordingly, in the first power transmission gear set 15 of the differential mechanism 2, the third ring gear 65 serves as the power input element 17, the first ring gear 63 serves as the first power output element 18, and the carrier 28 serves as the first differential reaction element 19. On the other hand, in the second power transmission gear set 16 of the differential mechanism 2, the third ring gear 65 also serves as the power input element 17, the second ring gear 64 serves as the second power output element 20, and the carrier 28 serves as the second differential reaction element 21.

The reversing mechanism 6 comprises: the set of the first planetary gears 22, the set of the second planetary gears 23, and the set of the third planetary gears 24; the first ring gear 63, the second ring gear 64, and the third ring gear 65; and the carrier 28. As described, the carrier 28 is connected to the output shaft 5a of the actuator 5. In the reversing mechanism 6, the first ring gear 63 is joined to the first driveshaft 3 as the first power output element 18 of the differential mechanism 2 while engaging with the first planetary gears 22, and the second ring gear 64 is joined to the second driveshaft 4 as the second power output element 20 while engaging with the second planetary gears 23.

In the reversing mechanism 6, accordingly, the carrier 28 serves as the control input element 31 of the first control gear set 29, and the first ring gear 63 serves not only as the first control output element 32 but also as the first gear 33 of the first control gear set 29. The carrier 28 also serves as the control input element 31 of the second control gear set 30, and the second ring gear 64 serves not only as the second control output element 34 but also as the second gear 35 of the second control gear set 30.

According to the fourth example, a first gear train 66 includes the set of the first planetary gears 22 and the first gear 33 (i.e., the first ring gear 63), and a second gear train 67 includes the set of the second planetary gears 23 and the second gear 35 (i.e., the second ring gear 64). A gear ratio of the first gear train 66 and a gear ratio of the second gear train 67 are different from each other. Specifically, a gear ratio between each of the first planetary gears 22 and the first ring gear 63 in the first gear train 66 is different from a gear ratio between each of the second planetary gears 23 and the second ring gear 64 in the second gear train 67.

According to the fourth example, a number of teeth of the first ring gear 63, a number of teeth of the second ring gear 64, and a number of teeth of the third ring gear 65 are identical to one another. On the other hand, the number of teeth of the first planetary gear 22, the number of teeth of the second planetary gear 23, and the number of teeth of the third planetary gear 24 are smaller, respectively, than the number of teeth of the first ring gear 63, the number of teeth of the second ring gear 64, and the number of teeth of the third ring gear 65. Specifically, the number of teeth of the first ring gear 63, the number of teeth of the second ring gear 64, and the number of teeth of the third ring gear 65 are set to 68, respectively. On the other hand, the number of teeth of each of the first planetary gears 22 is set to 36, the number of teeth of each of the second planetary gears 23 is set to 34, and the number of teeth of each of the third planetary gears 24 is set to 35. That is, the number of teeth of the first planetary gear 22 is larger than the number of teeth of the third planetary gear 24, and the number of teeth of the second planetary gear 23 is smaller than the number of teeth of the third planetary gear 24. According to the fourth example, therefore, the speed reducing ratio R of the torque vectoring device TV is ±35.

Thus, according to the fourth example, the control torque of the actuator 5 is also multiplied by the reversing mechanism 6, therefore, the actuator 5 may be downsized. Since the reversing mechanism 6 has a simple uniaxial structure, the reversing mechanism may be assembled easily. Moreover, since the reversing mechanism 6 is formed around the first driveshaft 3 and the second driveshaft 4, the size of the torque vectoring device VT is not increased in the radial direction. In addition, according to the fourth example, the first ring gear 63 engages with the first planetary gears 22, the second ring gear 64 engages with the second planetary gears 23, and the third ring gear 65 engages with the third planetary gears 24. According to the fourth example, therefore, a centrifugal force applied to the carrier 28 derived from rotation of the torque vectoring device TV can be damped by the first ring gear 63, the second ring gear 64, and third ring gear 65. For this reason, rigidity of the carrier 28 may be reduced and hence the differential mechanism 2 and the reversing mechanism 6 may be downsized. Further, according to the fourth example, the first power transmission gear set 15, the second power transmission gear set 16, the first control gear set 29, and the second control gear set 30 are formed without the sun gears. According to the fourth example, therefore, the torque vectoring device TV may be downsized in the radial direction.

Fifth to Eighth Examples

The torque vectoring devices TV according to the fifth to eighth examples are shown in FIGS. 5 to 8, respectively. The torque vectoring device TV shown in any of FIGS. 5 to 8 comprises: the set of the first planetary gears 22, the set of the second planetary gears 23, and the set of the third planetary gears 24; the first sun gear 25, the second sun gear 26, and the third sun gear 27; and the carrier 28.

The third sun gear 27 is connected to the differential ring gear 43 (or 51, 62) to rotate integrally with the differential ring gear 43 (or 62), the first sun gear 25 is connected to the first driveshaft 3 to rotate integrally with the first driveshaft 3, and the second sun gear 26 is connected to the second driveshaft 4 to rotate integrally with the second driveshaft 4.

Accordingly, in the first power transmission gear set 15 of the differential mechanism 2, the third sun gear 27 serves as the power input element 17, the first sun gear 25 serves as the first power output element 18, and the carrier 28 serves as the first differential reaction element 19. On the other hand, in the second power transmission gear set 16 of the differential mechanism 2, the third sun gear 27 also serves as the power input element 17, the second sun gear 26 serves as the second power output element 20, and the carrier 28 serves as the second differential reaction element 21.

The reversing mechanism 6 comprises: the set of the first planetary gears 22, the set of the second planetary gears 23, and the set of the third planetary gears 24; the first sun gear 25, the second sun gear 26, and the third sun gear 27; and the carrier 28. In the torque vectoring device TV shown in any of FIGS. 5 to 8, a speed reducing gear set 71 as a single-pinion planetary gear set is arranged coaxially with the reversing mechanism 6, the first driveshaft 3, and the second driveshaft 4.

The speed reducing gear set 71 comprises a sun gear 71a, a ring gear 71b, a carrier 71c, and a set of planetary gears 71d. Specifically, the sun gear 71a is joined to the output shaft 5a of the actuator 5 to rotate integrally with the output shaft 5a. The ring gear 71b is formed on an inner circumferential surface of the differential case 14 connected to the differential ring gear 43 (or 62) or connected the differential case 14 to rotate integrally with the differential case 14. The carrier 71c supports the planetary gears 71d in a rotatable and revolvable manner so that the carrier 71c and the carrier 28 are rotated integrally. That is, the speed reducing gear set 71 transmits the control torque of the actuator 5 to the carrier 28 while multiplying the control torque.

The sun gear 71a of the speed reducing gear set 71 serves as a fourth sun gear 71a of the reversing mechanism 6. Accordingly, the first control gear set 29 is formed compositely of the fourth sun gear 71a serving as the control input element 31, and the first sun gear 25 serving not only as the first control output element 32 but also as the first gear 33.

The second control gear set 30 is also formed compositely of the fourth sun gear 71a serving as the control input element 31, and the second sun gear 26 serving not only as the second control output element 34 but also as the second gear 35.

The planetary gears 71d engage with the fourth sun gear 71a and the ring gear 71b, and the planetary gears 71d serve as fourth planetary gears 71d of the reversing mechanism 6. Specifically, the fourth planetary gears 71d are arranged coaxially with the first planetary gears 22, the second planetary gears 23, and the third planetary gears 24, while being allowed to rotate relatively to the first planetary gears 22, the second planetary gears 23, and the third planetary gears 24. That is, the carrier 71c of the speed reducing gear set 71 serves as the carrier 28 of the reversing mechanism 6. Specifically, the carrier 28 supports the first planetary gears 22, the second planetary gears 23, the third planetary gears 24, and the fourth planetary gears 71d in a rotatable and revolvable manner.

In the reversing mechanism 6, the carrier 28 is connected to the output shaft 5a of the actuator 5 through the speed reducing gear set 71. The first sun gear 25 serving as the first power output element 18 of the differential mechanism 2 is connected to the first driveshaft 3 to rotate integrally with the first driveshaft 3 while being meshed with the first planetary gears 22, and the second sun gear 26 serving as the second power output element 20 of the differential mechanism 2 is connected to the second driveshaft 4 to rotate integrally with the second driveshaft 4 while being meshed with the second planetary gears 23.

Accordingly, in the first control gear set 29, the carrier 28 serves as the control input element 31, and the first sun gear 25 serves not only as the first control output element 32 but also as the first gear 33. On the other hand, in the second control gear set 30, the carrier 28 also serves as the control input element 31, and the second sun gear 26 serves not only as the second control output element 34 but also as the second gear 35.

In the torque vectoring device TV shown in any of FIGS. 5 to 8, a first gear train 72 includes the set of the first planetary gears 22 and the first gear 33 (i.e., the first sun gear 25), and a second gear train 73 includes the set of the second planetary gears 23 and the second gear 35 (i.e., the second sun gear 26). A gear ratio of the first gear train 72 and a gear ratio of the second gear train 73 are different from each other. Specifically, a gear ratio between each of the first planetary gears 22 and the first sun gear 25 in the first gear train 72 is different from a gear ratio between each of the second planetary gears 23 and the second sun gear 26 in the second gear train 73.

More specifically, the number of teeth of the first sun gear 25, the number of teeth of the second sun gear 26, and the number of teeth of the third sun gear 27 are identical to one another. On the other hand, the number of teeth of the first planetary gear 22, the number of teeth of the second planetary gear 23, and the number of teeth of the third planetary gear 24 are smaller, respectively, than the number of teeth of the first sun gear 25, the number of teeth of the second sun gear 26, and the number of teeth of the third sun gear 27. In addition, the number of teeth of the first planetary gear 22 is larger than the number of teeth of the third planetary gear 24, and the number of teeth of the second planetary gear 23 is smaller than the number of teeth of the third planetary gear 24.

Figure 5:
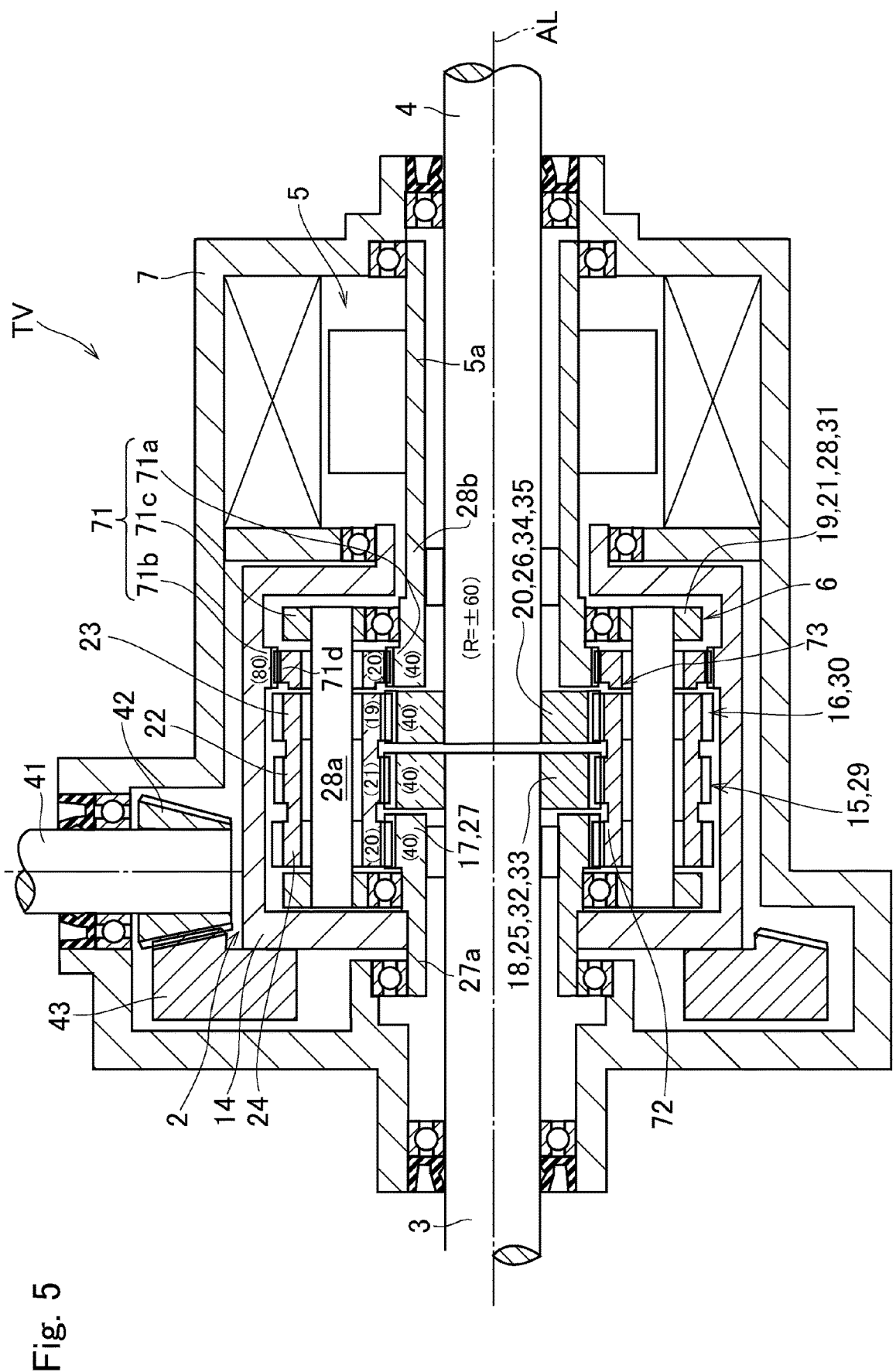
FIG. 5 is a cross-sectional view showing a structure of the torque vectoring device according to the fifth example of the present disclosure.

According to the fifth example shown in FIG. 5, the number of teeth of the first sun gear 25, the number of teeth of the second sun gear 26, and the number of teeth of the third sun gear 27 are set to 40, respectively. On the other hand, the number of teeth of each of the first planetary gears 22 is set to 21, the number of teeth of each of the second planetary gears 23 is set to 19, and the number of teeth of each of the third planetary gears 24 is set to 20. In the speed reducing gear set 71, a number of teeth of the sun gear 71a is set to 40, a number of teeth of the ring gear 71b is set to 80, and a number of teeth of each of the planetary gears 71d is set to 20. According to the fifth example, therefore, the speed reducing ratio R of the torque vectoring device TV is ±60. Thus, the speed reducing ratio R of the torque vectoring device TV is increased compared to the first example and the second example.

Figure 6:
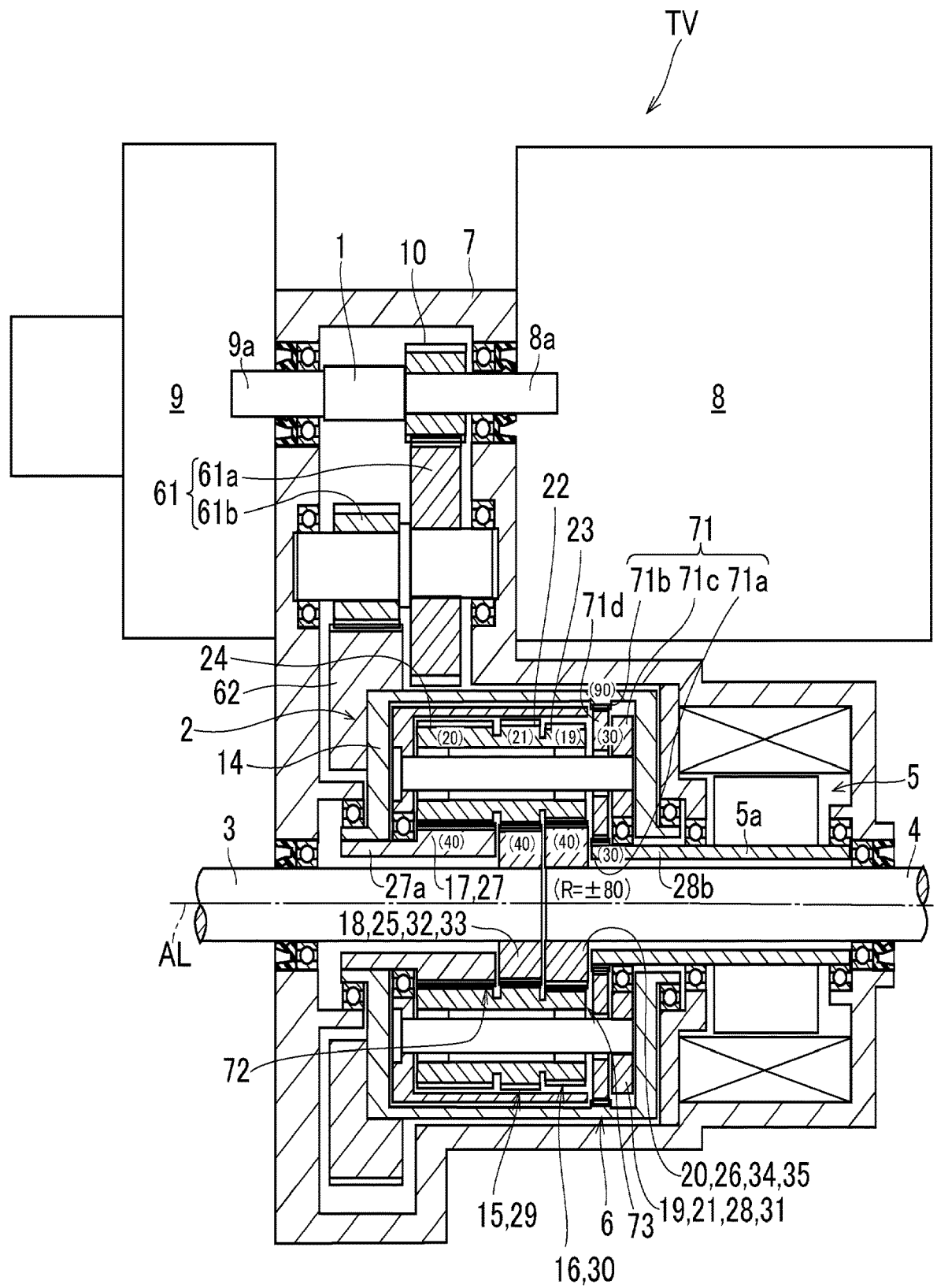
FIG. 6 is a cross-sectional view showing a structure of the torque vectoring device according to the sixth example of the present disclosure.
Figure 7:
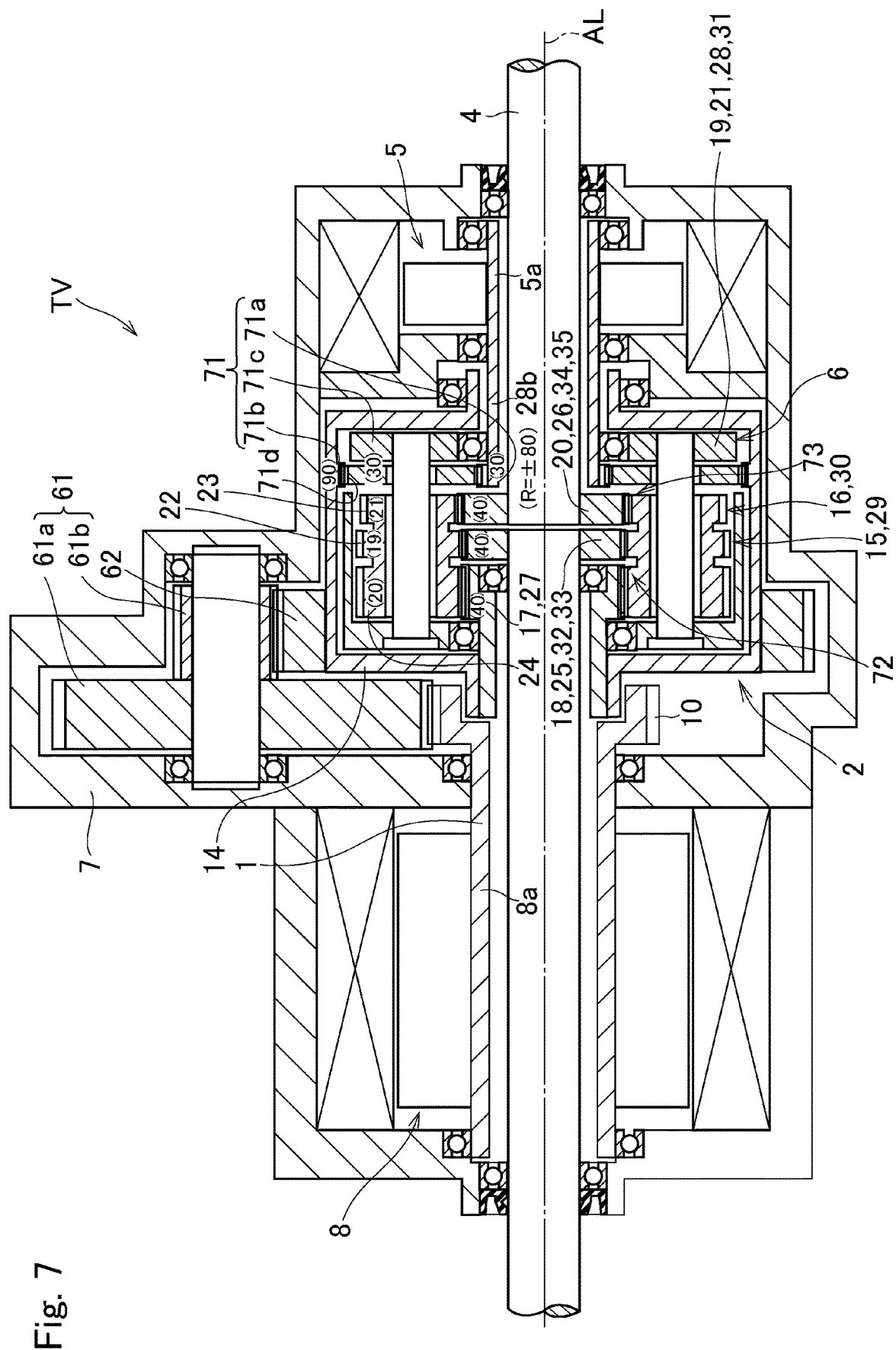
FIG. 7 is a cross-sectional view showing a structure of the torque vectoring device according to the seventh example of the present disclosure.

According to the sixth example shown in FIG. 6 and the seventh example shown in FIG. 7, in the speed reducing gear set 71, the number of teeth of the sun gear 71a is set to 30, the number of teeth of the ring gear 71b is set to 90, and the number of teeth of each of the planetary gears 71d is set to 30. According to the sixth and seventh examples, therefore, the speed reducing ratio R of the torque vectoring device TV is ±80. Thus, the speed reducing ratio R of the torque vectoring device TV is further increased compared to the fifth example.

Figure 8:
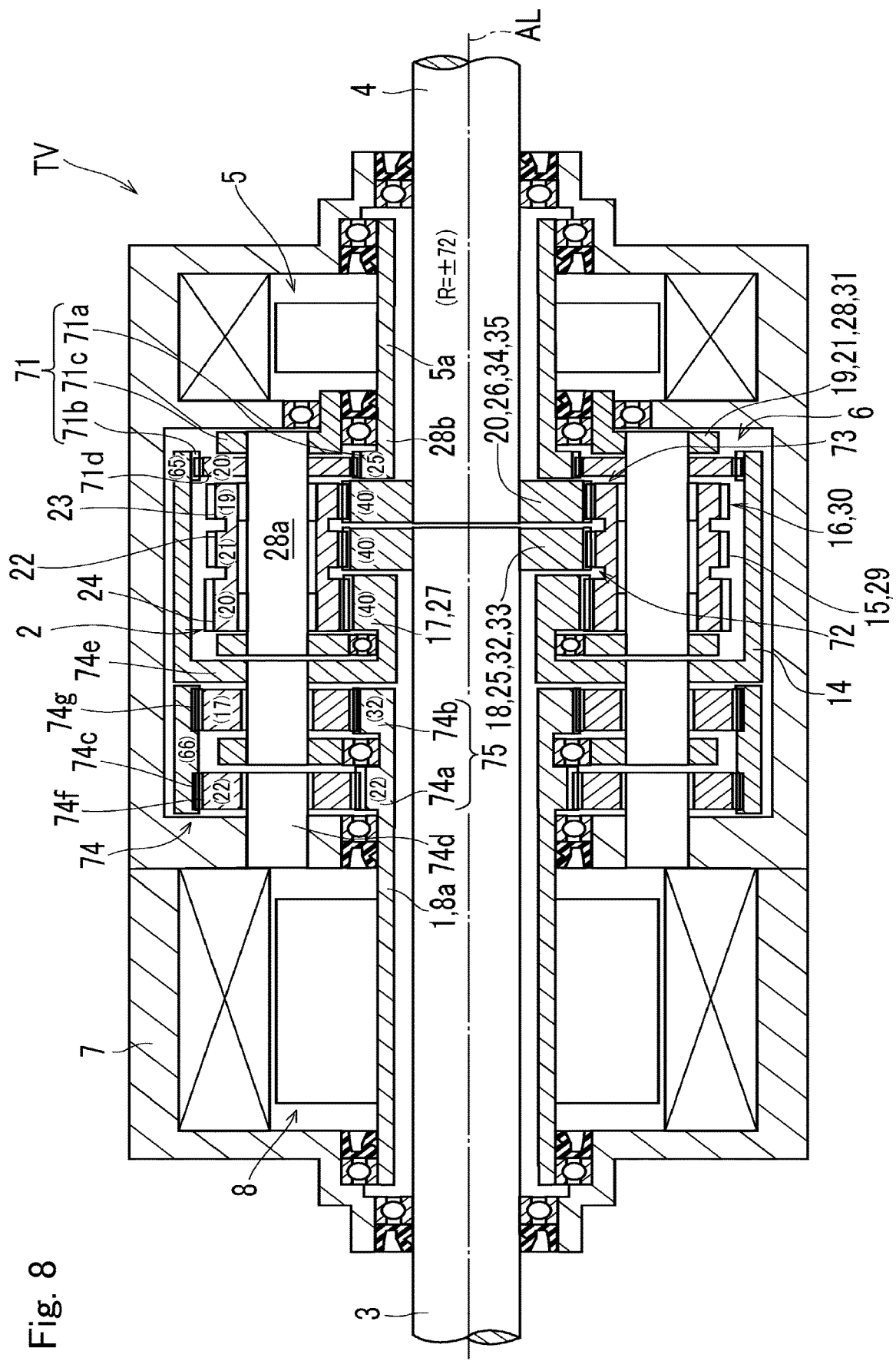
FIG. 8 is a cross-sectional view showing a structure of the torque vectoring device according to the eighth example of the present disclosure.

According to the eighth example shown in FIG. 8, in the speed reducing gear set 71, the number of teeth of the sun gear 71a is set to 25, the number of teeth of the ring gear 71b is set to 65, and the number of teeth of each of the planetary gears 71d is 20. According to the eighth examples, therefore, the speed reducing ratio R of the torque vectoring device TV is ±72. Thus, the speed reducing ratio R of the torque vectoring device TV is also increased compared to the fifth example.

In the torque vectoring device TV shown in any of FIGS. 5 to 8, the reversing mechanism 6 and the speed reducing gear set 71 are arranged coaxially with each other along the rotational center axis AL of the first driveshaft 3 and the second driveshaft 4. Therefore, the speed reducing gear set 71 may be arranged easily in the torque vectoring device TV utilizing common bearings.

According to the eighth example, the motor 8 as the prime mover is mounted on the first driveshaft 3 coaxially with the second driveshaft 4, and the reversing mechanism 6. In order to multiply the torque of the motor 8, a speed reducing mechanism 74 is arranged in the torque vectoring device TV according to the eighth example. Specifically, the speed reducing mechanism 74 is a complex planetary gear set formed by combining two sets of planetary gear sets.

The speed reducing mechanism 74 comprises a first sun gear 74a, a second sun gear 74b, a ring gear 74c, a first carrier 74d, a second carrier 74e, a set of first planetary gears 74f, and a set of second planetary gears 74g. In the speed reducing mechanism 74, the first sun gear 74a and the second sun gear 74b are arranged coaxially with each other to rotate integrally. The first planetary gears 74f engage with the first sun gear 74a and the ring gear 74c as an internal gear, and the second planetary gears 74g engage with the second sun gear 74b and the ring gear 74c. The first planetary gears 74f are supported rotatably by the first carrier 74d, and the second planetary gears 74g are supported rotatably by the second carrier 74e so that the second planetary gears 74g are allowed to revolve around the second sun gear 74b. The first carrier 74d and the second carrier 74e are arranged coaxially with each other, and the second carrier 74e is allowed to rotate relatively to the first carrier 74d.

The first sun gear 74a and the second sun gear 74b are connected to the output shaft 8a of the motor 8 so as to serve as an input member 75. The first carrier 74d is fixed to the case 7 to be prevented from rotating, and the second carrier 74e is connected to the differential case 14 and the third sun gear 27 of the differential mechanism 2. Therefore, by the speed reducing mechanism 74, a speed of the second carrier 74e and the third sun gear 27 serving as the power input element 17 of the differential mechanism 2 is reduced lower than an input speed to the first sun gear 74a and the second sun gear 74b serving as the input member 75. In other words, the torque of the prime mover is transmitted to the power input element 17 of the differential mechanism 2 while being multiplied by the speed reducing mechanism 74.

As described, according to the eighth example, the electric motor 8, the speed reducing mechanism 74, the reversing mechanism 6 are arranged coaxially around the first driveshaft 3 and the second driveshaft 4. That is, the torque vectoring device TV according to the eighth example has a cylindrical uniaxial structure. According to the eighth example, therefore, the torque vectoring device TV may be downsized in the radial direction to be fitted easily in the vehicle.

In the torque vectoring device TV according to any of the foregoing examples, the first planetary gears 22, the second planetary gears 23, and the third planetary gears 24 are arranged coaxially to one another to be used commonly in the differential mechanism 2 and the reversing mechanism 6. Specifically, the first planetary gears 22, the second planetary gears 23, and the third planetary gears 24 are supported by the common carrier 28 in such a manner as to rotate integrally. The third planetary gears 24 engage with the third sun gear 27 or the third ring gear 65 to serve as the power input element 17 so that the torque is delivered from the power input element 17 to the third planetary gears 24.

Ninth Example

Figure 9:
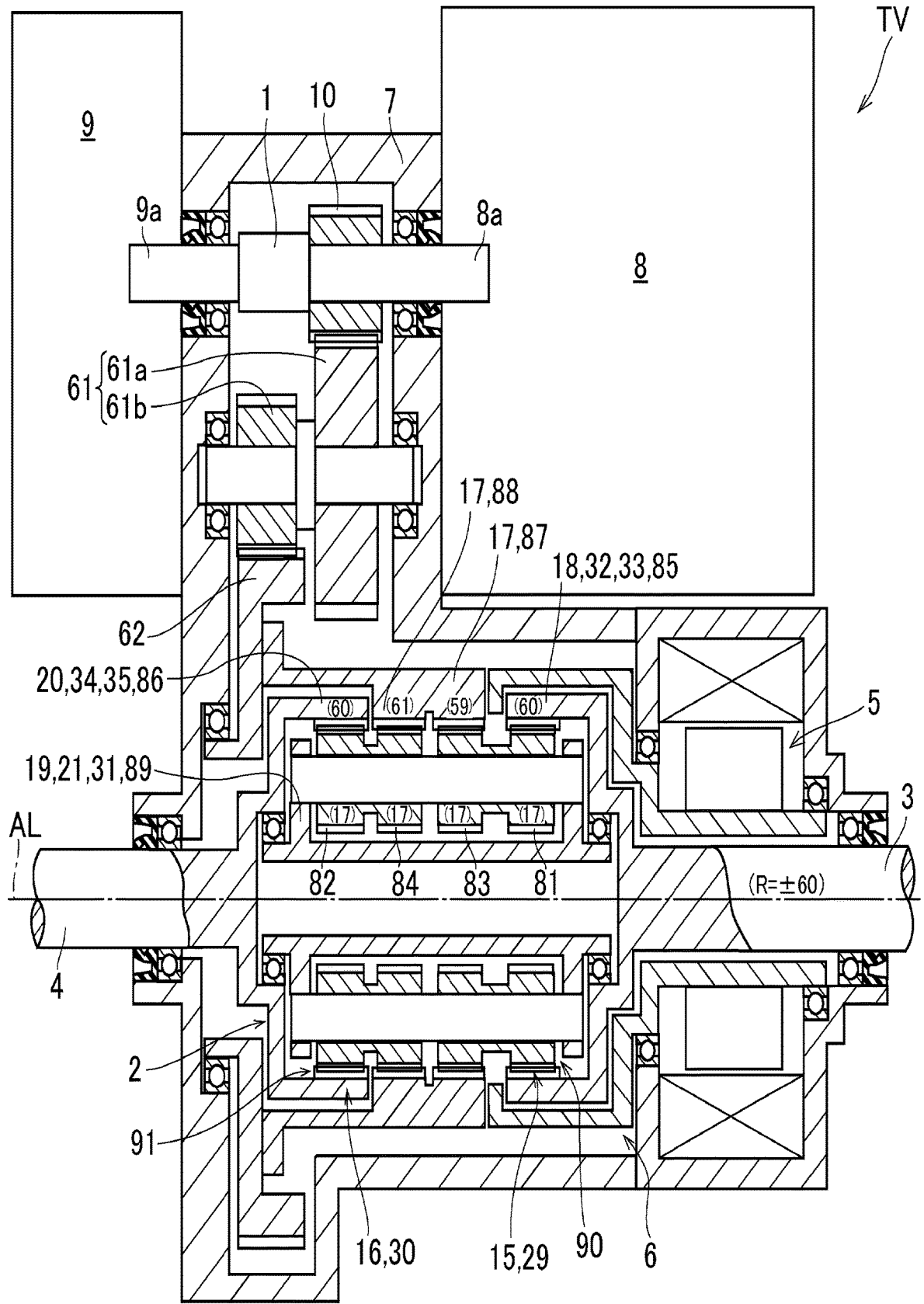
FIG. 9 is a cross-sectional view showing a structure of the torque vectoring device according to the ninth example of the present disclosure.

Turning to FIG. 9, there is shown a structure of the torque vectoring device TV according to the ninth example. According to the ninth example, the differential mechanism 2 comprises: a set of first planetary gears 81, a set of second planetary gears 82, a set of third planetary gears 83, and a set of fourth planetary gears 84; a first ring gear 85, a second ring gear 86, a third ring gear 87, and a fourth ring gear 88; and a carrier 89.

The first planetary gears 81, the second planetary gears 82, the third planetary gears 83, and the fourth planetary gears 84 are arranged coaxially to one another. Specifically, the first planetary gear 81 and the third planetary gear 83 are formed integrally on a planetary pinion, and the second planetary gear 82 and the fourth planetary gear 84 are formed integrally on another planetary pinion. Each of the planetary pinions on which the first planetary gear 81 and the third planetary gear 83 are formed is individually arranged coaxially with another planetary pinion on which the second planetary gear 82 and the fourth planetary gear 84 are formed, and a plurality of arrays of the planetary pinions and another planetary pinions are arranged around the rotational center axis AL while being supported by the carrier 89 in a rotatable and revolvable manner. That is, the first planetary gear 81 and the third planetary gear 83 rotate integrally, and the second planetary gear 82 and the fourth planetary gear 84 rotate integrally. Here, the planetary pinion on which the first planetary gear 81 and the third planetary gear 83 are formed and another planetary pinion on which the second planetary gear 82 and the fourth planetary gear 84 are formed are allowed to rotate relatively to each other.

The first ring gear 85 as an internal gear, the second ring gear 86 as an internal gear, the third ring gear 87 as an internal gear, and the fourth ring gear 88 as an internal gear are arranged coaxially with one another. The first planetary gears 81 engage with the first ring gear 85, the second planetary gears 82 engage with the second ring gear 86, the third planetary gears 83 engage with the third ring gear 87, and the fourth planetary gears 84 engage with the fourth ring gear 88. The third ring gear 87 and the fourth ring gear 88 are joined to each other to rotate integrally, and the first ring gear 85, the second ring gear 86, and a unit of the third ring gear 87 and the fourth ring gear 88 are allowed to rotate relatively to one another.

The unit of the third ring gear 87 and the fourth ring gear 88 is connected to the differential ring gear 62 to rotate integrally with the differential ring gear 62. The first ring gear 85 is connected to the first driveshaft 3 to rotate integrally with the first driveshaft 3, and the second ring gear 86 is connected to the second driveshaft 4 to rotate integrally with the second driveshaft 4.

Accordingly, in the first power transmission gear set 15 of the differential mechanism 2, the third ring gear 87 serves as the power input element 17, the first ring gear 85 serves as the first power output element 18, and the carrier 89 serves as the first differential reaction element 19. On the other hand, in the second power transmission gear set 16 of the differential mechanism 2, the fourth ring gear 88 serves as the power input element 17, the second ring gear 86 serves as the second power output element 20, and the carrier 89 serves as the second differential reaction element 21.

The reversing mechanism 6 comprises: the set of the first planetary gears 81, the set of the second planetary gears 82, the set of the third planetary gears 83, and the set of fourth planetary gears 84; the first ring gear 85, the second ring gear 86, the third ring gear 87, and the fourth ring gear 88; and the carrier 89. The carrier 89 is connected to the output shaft 5a of the actuator 5. In the reversing mechanism 6, the first ring gear 85 is joined to the first driveshaft 3 as the first power output element 18 of the differential mechanism 2 while engaging with the first planetary gears 81, and the second ring gear 86 is joined to the second driveshaft 4 as the second power output element 20 while engaging with the second planetary gears 82.

In the reversing mechanism 6, accordingly, the carrier 89 serves as the control input element 31 of the first control gear set 29, and the first ring gear 85 serves not only as the first control output element 32 but also as the first gear 33 of the first control gear set 29. The carrier 89 also serves as the control input element 31 of the second control gear set 30, and the second ring gear 86 serves not only as the second control output element 34 but also as the second gear 35 of the second control gear set 30.

According to the ninth example, a first gear train 90 includes the set of the first planetary gears 81 and the first gear 33 (i.e., the first ring gear 85), and a second gear train 91 includes the set of the second planetary gears 82 and the second gear 35 (i.e., the second ring gear 86). A gear ratio of the first gear train 90 and a gear ratio of the second gear train 91 are different from each other. Specifically, a gear ratio of a gear pair formed of the planetary pinion on which the first planetary gear 81 and the third planetary gear 83 are formed and the first ring gear 85 in the first gear train 90 is different from a gear ratio of a gear pair formed of another planetary pinion on which the second planetary gear 82 and the fourth planetary gear 84 are formed and the second ring gear 86 in the second gear train 91.

According to the ninth example, a number of teeth of the first planetary gear 81, a number of teeth of the second planetary gear 82, a number of teeth of the third planetary gear 83, and a number of teeth of the fourth planetary gear 84 are identical to one another. On the other hand, a number of teeth of the first ring gear 85, a number of teeth of the second ring gear 86, a number of teeth of the third ring gear 87, and a number of teeth of the fourth ring gear 88 are larger, respectively, than the number of teeth of first planetary gear 81, the number of teeth of the second planetary gear 82, the number of teeth of the third planetary gear 83, and the number of teeth of the fourth planetary gear 84. Specifically, the number of teeth of the first ring gear 85 and the number of teeth of the second ring gear 86 are identical to each other. The number of teeth of the third ring gear 87 is smaller than the number of teeth of the first ring gear 85 and the number of teeth of the second ring gear 86, the number of teeth of the fourth ring gear 88 is larger than the number of teeth of the first ring gear 85 and the number of teeth of the second ring gear 86.

More specifically, according to the ninth example, the number of teeth of each of the first planetary gears 81, the number of teeth of each of the second planetary gears 82, the number of teeth of each of the third planetary gears 83, and the number of teeth of each of the fourth planetary gears 84 are set to 17, respectively. On the other hand, the number of teeth of the first ring gear 85 and the number of teeth of the second ring gear 86 are set to 60, respectively, the number of teeth of the third ring gear 87 is set to 59, and the number of teeth of the fourth ring gear 88 is set to 61. According to the ninth example, therefore, the speed reducing ratio R of the torque vectoring device TV is ±60. Thus, according to the ninth example, the speed reducing ratio R of the torque vectoring device TV is increased compared to the first example and the second example, by the four sets of the planetary gears 81, 82, 83, 84 engaging individually with the ring gears 85, 86, 87, 88, respectively.

In the torque vectoring device TV according to the ninth example, the first planetary gears 81, the second planetary gears 82, the third planetary gears 83, and the fourth planetary gears 84 are arranged coaxially to one another to be used commonly in the differential mechanism 2 and the reversing mechanism 6. Specifically, the first planetary gears 81, the second planetary gears 82, the third planetary gears 83, and the fourth planetary gears 84 are supported by the common carrier 89 in a rotatable and revolvable manner. As described, the first planetary gear 81 and the third planetary gear 83 rotate integrally, and the second planetary gear 82 and the fourth planetary gear 84 rotate integrally. As also described, the planetary pinion on which the first planetary gear 81 and the third planetary gear 83 are formed and another planetary pinion on which the second planetary gear 82 and the fourth planetary gear 84 are formed are allowed to rotate relatively to each other. The third planetary gears 83 engage with the third ring gear 87, and the third planetary gears 83 engage with the fourth ring gear 88 formed integrally with the third ring gear 87 to serve as the power input element 17. That is, the torque is delivered to the third planetary gears 83 and the third planetary gears 83 from the power input element 17.

Here, it is to be noted that an arrangement of the set of the first planetary gears 81, the set of the second planetary gears 82, the set of the third planetary gears 83, and the set of the fourth planetary gears 84, and an arrangement of the first ring gear 85, the second ring gear 86, the third ring gear 87, and the fourth ring gear 88 should not be limited to those shown in FIG. 9. For example, positions of the planetary pinion on which the first planetary gear 81 and the third planetary gear 83 are formed and another planetary pinion on which the second planetary gear 82 and the fourth planetary gear 84 are formed may be switched, and positions of the second ring gear 86 and the fourth ring gear 88 may be switched.

In the torque vectoring device TV according to any of the foregoing examples, the input member 1 (or 41) is connected to the power input element 17, the first power output element 18 is connected to the first driveshaft 3, and the second power output element 20 is connected to the second driveshaft 4. In addition, in the reversing mechanism 6, the control input element 31 is connected to the actuator 5, the first gear 33 serves as the first control output element 32, and the second gear 35 serves as the second control output element 34 so that the control applied to the torque control input element 31 is delivered to the first driveshaft 3 and the second driveshaft 4 while being multiplied.

According to any of the foregoing examples, therefore, therefore, the actuator 5 may be downsized to reduce the size of the torque vectoring device TV. For this reason, the torque vectoring device VT may be mounted on a vehicle easily.

Tenth Example

Figure 10:
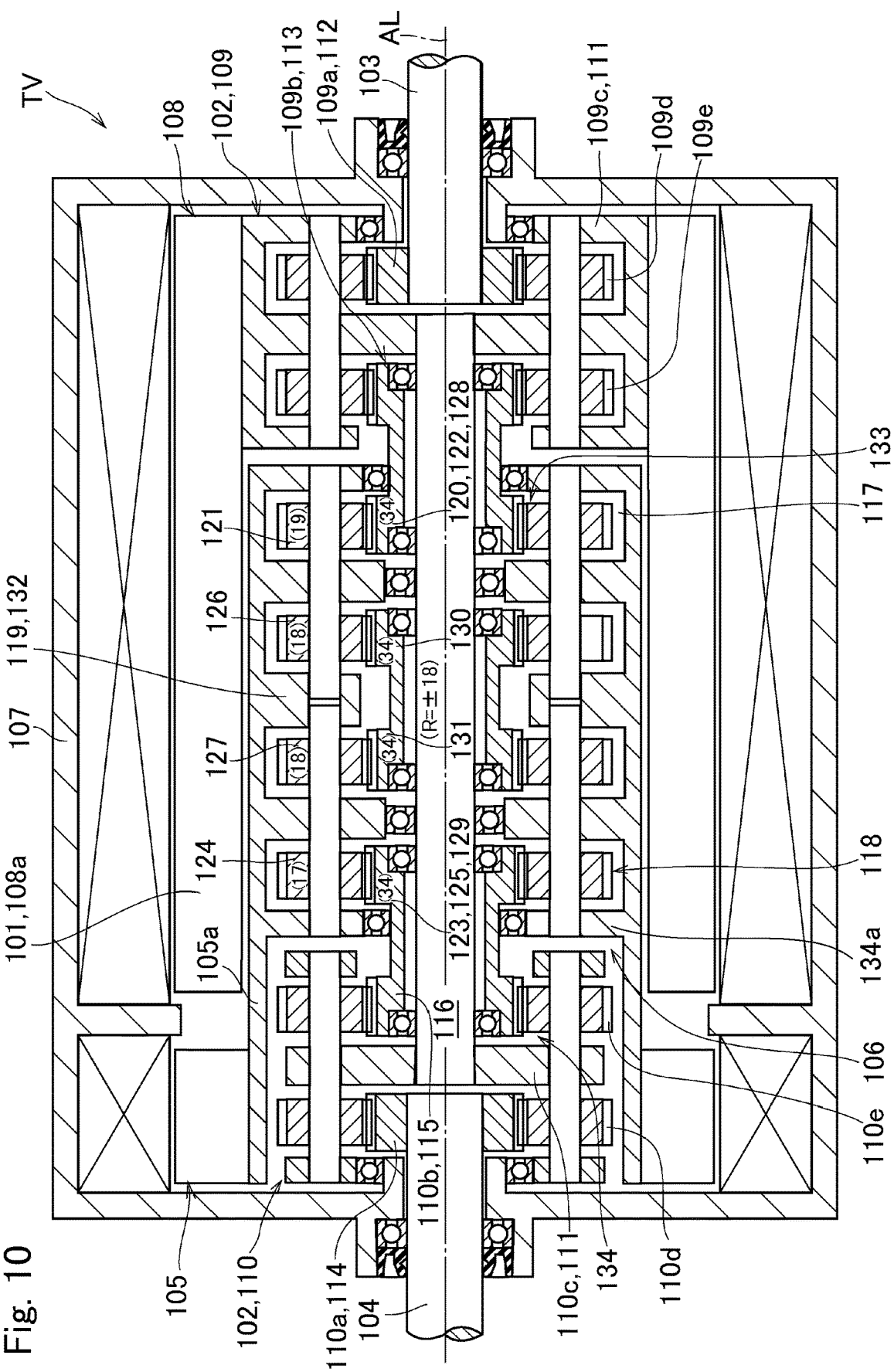
FIG. 10 is a cross-sectional view showing a structure of the torque vectoring device according to the tenth example of the present disclosure.

Turning to FIG. 10, there is shown a structure of the torque vectoring device TV according to the tenth example. According to the tenth example, the torque vectoring device TV comprises an input member 101, a differential mechanism 102, a first driveshaft 103, a second driveshaft 104, an actuator 105, and a reversing mechanism 106.

According to the tenth example, a motor 108 is held in a case 107 of the torque vectoring device TV to serve as the prime mover, and a drive torque generated by the motor 108 is applied to the input member 101. As the above-mentioned motor 8, the motor 108 generates not only a drive torque but also a regenerative torque. For example, a permanent magnet type synchronous motor or an induction motor may also be adopted as the motor 108. The motor 108 has an output shaft 108a as a hollow shaft, and the output shaft 108a serves as the input member 101. The output shaft 108a of the motor 108 is connected to a power input element 111 of the differential mechanism 102 so that the torque generated by the motor 108 is delivered to the power input element 111.

The differential mechanism 102 comprises a first power transmission gear set 109 as a planetary gear set, and a second power transmission gear set 110 as a planetary gear set arranged coaxially with the first power transmission gear set 109. Specifically, the first driveshaft 103 and the second driveshaft 104 are arranged coaxially with each other, and the first power transmission gear set 109 and the second power transmission gear set 110 are formed coaxially around the common rotational center axis AL of the first driveshaft 103 and the second driveshaft 104.

The first power transmission gear set 109 comprises: the power input element 111 to which the torque is delivered from the input member 101; a first power output element 112 which delivers the torque to the first driveshaft 103; and a first differential reaction element 113 to which a control torque generated by the actuator 105 is applied as a reaction force against the torque delivered from the power input element 111 to the first power output element 112. On the other hand, the second power transmission gear set 110 comprises: the power input element 111 which is also used in the first power transmission gear set 109; a second power output element 114 which delivers the torque to the second driveshaft 104; and a second differential reaction element 115 to which the control torque is applied as a reaction torque against the torque delivered from the power input element 111 to the second power output element 114. According to the tenth example, the first differential reaction element 113 and the second differential reaction element 115 are connected to each other through the reversing mechanism 106.

The first power transmission gear set 109 is a complex planetary gear set formed by combining two sets of planetary gear sets, and the second power transmission gear set 110 is also a complex planetary gear set formed by combining two sets of planetary gear sets.

Specifically, the first power transmission gear set 109 comprises a first sun gear 109a, a second sun gear 109b, a carrier 109c, a set of first planetary gears 109d, and a set of second planetary gears 109e. In the first power transmission gear set 109, the first sun gear 109a and the second sun gear 109b are arranged coaxially while being allowed to rotate relatively to each other. The first planetary gears 109d engaging with the first sun gear 109a and the second planetary gears 109e engaging with the second sun gear 109b are supported rotatably by the carrier 109c so that the first planetary gears 109d are allowed to revolve around the first sun gear 109a and the second planetary gears 109e are allowed to revolve around the second sun gear 109b. The first planetary gear 109d and the second planetary gear 109e rotates integrally. The first power transmission gear set 109 is held in a hollow space of the output shaft 108a.

On the other hand, the second power transmission gear set 110 comprises a first sun gear 110a, a second sun gear 110b, a carrier 110c, a set of first planetary gears 110d, and a set of second planetary gears 110e. In the second power transmission gear set 110, the first sun gear 110a and the second sun gear 110b are arranged coaxially while being allowed to rotate relatively to each other. The first planetary gears 110d engaging with the first sun gear 110a and the second planetary gears 110e engaging with the second sun gear 110b are supported rotatably by the carrier 109c so that the first planetary gears 110d are allowed to revolve around the first sun gear 110a and the second planetary gears 109e are allowed to revolve around the second sun gear 110b. The first planetary gear 110d and the second planetary gear 110e rotates integrally. The second power transmission gear set 110 is held in the hollow space of the output shaft 108a and a hollow space of a later-mentioned output shaft 105a of the actuator 105.

The carrier 109c of the first power transmission gear set 109 and the carrier 110c of the second power transmission gear set 110 are connected to the output shaft 108a of the motor 108 to serve as the input member 101. Specifically, the carrier 109c is connected to the output shaft 108a of the motor 108. A connection shaft 116 penetrate through hollow portions of the second sun gear 109b of the first power transmission gear set 109 and the second sun gear 110b of the second power transmission gear set 110, and the second sun gear 109b and the second sun gear 110b are allowed to rotate relatively to the connection shaft 116. One end of the connection shaft 116 is attached to the carrier 109c and the other end of the connection shaft 116 is attached to the carrier 110c so that the carrier 109c and the carrier 110c rotate integrally with the connection shaft 116. That is, the carrier 109c and the carrier 110c are rotated integrally with the output shaft 108a of the motor 108.

In the torque vectoring device TV according to the tenth example, therefore, the torque of the motor 108 is delivered to the carrier 109c through the output shaft 108a as the input member 101, and further delivered to the carrier 110c through the connection shaft 116. That is, the carrier 109c and the carrier 110c serve as the power input element 111 of the differential mechanism 102.

The first sun gear 109a of the first power transmission gear set 109 is connected to the first driveshaft 103 to rotate integrally with the first driveshaft 103 so that the torque delivered to the differential mechanism 102 is partially delivered to the first driveshaft 103 from the first sun gear 109a. That is, the first sun gear 109a serves as the first power output element 112 of the differential mechanism 102.

The first sun gear 110a of the second power transmission gear set 110 is connected to the second driveshaft 104 to rotate integrally with the second driveshaft 104 so that the torque delivered to the differential mechanism 102 is partially delivered to the second driveshaft 104 from the first sun gear 110a. That is, the first sun gear 110a serves as the second power output element 114 of the differential mechanism 102.

The second sun gear 109b of the first power transmission gear set 109 is connected to a first sun gear 128 of the reversing mechanism 106 to rotate integrally with the first sun gear 128 so that a part of the control torque delivered from the actuator 105 to the first sun gear 128 acts as a reaction force against the torque delivered from the power input element 111 to the first power output element 112. That is, the second sun gear 109b serves as the first differential reaction element 113 of the differential mechanism 102.

The second sun gear 110b of the second power transmission gear set 110 is connected to a second sun gear 129 of the reversing mechanism 106 to rotate integrally with the second sun gear 129 so that a part of the control torque delivered from the actuator 105 to the second sun gear 129 acts as a reaction force against the torque delivered from the power input element 111 to the second power output element 114. That is, the second sun gear 110b serves as the second differential reaction element 115 of the differential mechanism 102.

Thus, in the first power transmission gear set 109 of differential mechanism 102, the carrier 109c serves as the power input element 111, the first sun gear 109a serves as the first power output element 112, and the second sun gear 109b serves as the first differential reaction element 113. On the other hand, in the second power transmission gear set 110 of the differential mechanism 102, the carrier 110c serves as the power input element 111, the first sun gear 110a serves as the second power output element 114, and the second sun gear 110b serves as the second differential reaction element 115.

The first driveshaft 103 and the second driveshaft 104 are arranged coaxially along the rotational center axis AL while being allowed to rotate relatively to each other, and the first power transmission gear set 109 and the second power transmission gear set 110 are formed coaxially around the common rotational center axis AL of the first driveshaft 103 and the second driveshaft 104. An axially outer end (i.e., the right end in FIG. 10) of the first driveshaft 103 protrudes from the case 107 while being supported in a rotatable manner, and an axially outer end (i.e., the left end in FIG. 10) of the second driveshaft 104 protrudes from the case 107 while being supported in a rotatable manner. Given that the torque vectoring device TV according to the tenth example is mounted on a vehicle, a drive wheel (not shown) is attached to the axially outer ends of the first driveshaft 103 and the second driveshaft 104, respectively.

An axially inner end of the first driveshaft 103 is joined to the first power output element 112, and an axially inner end of the second driveshaft 104 is joined to the second power output element 114. That is, a differential rotation between the first driveshaft 103 and the second driveshaft 104 is allowed by the differential mechanism 102. Specifically, when the vehicle on which the torque vectoring device TV is mounted makes a turn, an inner wheel attached to one of the first driveshaft 103 and the second driveshaft 104 and an outer wheel attached to the other one of the first driveshaft 103 and the second driveshaft 104 are rotated at different speeds. In this situation, a torque distribution ratio to the inner wheel and to the outer wheel may be altered by changing the control torque of the actuator 5.

In order to rotate the first driveshaft 103 and the second driveshaft 104 at different speeds, the control torque generated by the actuator 105 is applied to the first differential reaction element 113 and the second differential reaction element 115 of the differential mechanism 102. In a case of using an electric motor as the actuator 105 to generate the control torque, the electric motor generates not only a drive torque to rotate the first differential reaction element 113 and the second differential reaction element 115 but also a regenerative torque to brake the first differential reaction element 113 and the second differential reaction element 115. Instead, a brake mechanism may also be adopted as the actuator 105 to generate the control torque. For example, an electromagnetic brake that generates a magnetic attraction force when energized, and an electric brake that generates a frictional braking force by actuating a feed screw mechanism by an electric motor may also be adopted as the actuator 105. In this case, the actuator 105 generates a brake torque applied to the first differential reaction element 113 and the second differential reaction element 115.

According to the tenth example, the electric motor is adopted as the actuator 105, and a hollow rotor shaft of the electric motor serves as the output shaft 105a. The output shaft 105a of the actuator 105 is joined to a carrier shaft 134a of a carrier 132 of the reversing mechanism 106. The reversing mechanism 106 and the second power transmission gear set 110 of the differential mechanism 102 are held in the hollow space of the output shaft 105a.

In the case of using the electric motor as the actuator 105, a speed difference between the first driveshaft 103 and the second driveshaft 104 is controlled by controlling the control torque generated by the electric motor. Otherwise, in the case of using the brake mechanism as the actuator 105, a speed difference between the first driveshaft 103 and the second driveshaft 104 is controlled by changing the control torque generated by the brake mechanism. By contrast, the differential rotation between the first driveshaft 103 and the second driveshaft 104 may also be restricted by the regenerating torque of the electric motor or the brake torque of the brake mechanism.

In order to allow the first driveshaft 103 and the second driveshaft 104 to rotate in opposite directions when those shafts 103 and 104 are rotated at different speeds, the reversing mechanism 106 is formed coaxially with the first driveshaft 103 and the second driveshaft 104. The reversing mechanism 106 comprises a first control gear set 117 as a planetary gear set and a second control gear set 118 as a planetary gear set arranged coaxially around the first driveshaft 103 and the second driveshaft 104. The first control gear set 117 transmits the control torque of the actuator 105 to the first differential reaction element 113 of the differential mechanism 102, and the second control gear set 118 transmits the control torque of the actuator 105 to the second differential reaction element 115 of the differential mechanism 102.

The first control gear set 117 comprises a control input element 119, a first control output element 120, a set of the first planetary gears 121, and a first gear 122. Specifically, the control torque of the actuator 105 is applied to the control input element 119, and the control torque is delivered from the first control output element 120 to the first differential reaction element 113 and the first driveshaft 103. In the first control gear set 117, the control torque is delivered to the first planetary gears 121 from the control input element 119, and the first gear 122 engages with the first planetary gears 121 to serve as the control input element 119 or the first control output element 120. On the other hand, the second control gear set 118 comprises the control input element 119 which is also used in the first control gear set 117, a second control output element 123, a set of second planetary gears 124, and a second gear 125. Specifically, the control torque is delivered from the second control output element 123 to the second differential reaction element 115 of the differential mechanism 102 and the second driveshaft 104, and the control torque is also delivered to the second planetary gears 124 from the control input element 119. In the second control gear set 118, the second gear 125 engages with the second planetary gears 124 to serve as the control input element 119 or the second control output element 123.

The reversing mechanism 106 comprises: the set of the first planetary gears 121, the set of the second planetary gears 124, a set of third planetary gears 126, and a set of fourth planetary gears 127; a first sun gear 128, a second sun gear 129, a third sun gear 130, and a fourth sun gear 131; and a carrier 132.

The first planetary gears 121, the second planetary gears 124, the third planetary gears 126, and the fourth planetary gears 127 are arranged coaxially to one another while being supported by the carrier 132 in a rotatable and revolvable manner. Specifically, the first planetary gear 121 and the third planetary gear 126 rotates integrally, and the second planetary gear 124 and the fourth planetary gear 127 rotates integrally. That is, a pair of the first planetary gear 121 and the third planetary gear 126 and a pair of the second planetary gear 124 and the fourth planetary gear 127 are allowed to rotate relatively to each other.

The first sun gear 128, the second sun gear 129, the third sun gear 130, and the fourth sun gear 131 are arranged coaxially with one another. Specifically, the first planetary gears 121 engage with the first sun gear 128, the second planetary gears 124 engage with the second sun gear 129, the third planetary gears 126 engage with the third sun gear 130, and the fourth planetary gears 127 engage with the fourth sun gear 131. The first sun gear 128 is joined to the first differential reaction element 113 (i.e., the second sun gear 109b) of the differential mechanism 102, the second sun gear 129 is joined to the second differential reaction element 115 (i.e., the second sun gear 110b) of the differential mechanism 102, and the third sun gear 130 and the fourth sun gear 131 are joined to each other. That is, the first sun gear 128, the second sun gear 129, and a unit of the third sun gear 130 and the fourth sun gear 131 are allowed to rotate relatively to one another.

The carrier 132 is connected to the output shaft 105a of the actuator 105. The first sun gear 128 is connected to the first driveshaft 103 through the second sun gear 109b and the first power transmission gear set 109 while engaging with the first planetary gears 121, and the second sun gear 129 is connected to the second driveshaft 104 through the second sun gear 110b and the second power transmission gear set 110 while engaging with the second planetary gears 124.

Accordingly, in the first control gear set 117, the carrier 132 serves as the control input element 119, and the first sun gear 128 serves not only as the first control output element 120 but also as the first gear 122. On the other hand, in the second control gear set 118, the carrier 132 also serves as the control input element 119, and the second sun gear 129 serves not only as the second control output element 123 but also as the second gear 125.

In the torque vectoring device TV according to the tenth example, a first gear train 133 includes the set of the first planetary gears 121 and the first gear 122 (i.e., the first sun gear 128), and a second gear train 134 includes the set of the second planetary gears 124 and the second gear 125 (i.e., the second sun gear 129). A gear ratio of the first gear train 133 and a gear ratio of the second gear train 134 are different from each other. Specifically, a gear ratio between each of the first planetary gears 121 and the first sun gear 128 in the first gear train 133 is different from a gear ratio between each of the second planetary gears 124 and the second sun gear 129 in the second gear train 134.

More specifically, a number of teeth of the first sun gear 128, a number of teeth of the second sun gear 129, a number of teeth of the third sun gear 130, and a number of teeth of the fourth sun gear 131 are identical to one another. On the other hand, a number of teeth of the first planetary gear 121, a number of teeth of the second planetary gear 124, a number of teeth of the third planetary gear 126, and a number of teeth of the fourth planetary gear 127 are smaller, respectively, than the number of teeth of the first sun gear 128, the number of teeth of the second sun gear 129, the number of teeth of the third sun gear 130, and the number of teeth of the fourth sun gear 131. In addition, the number of teeth of the third planetary gear 126 and the number of teeth of the fourth planetary gear 127 are identical to each other. Further, the number of teeth of the first planetary gear 121 is larger than the number of teeth of the third planetary gear 126 and the number of teeth of the fourth planetary gear 127, and the number of teeth of the second planetary gear 124 is smaller than the number of teeth of the third planetary gear 126 and the number of teeth of the fourth planetary gear 127. According to the tenth example shown in FIG. 10, specifically, the number of teeth of the first sun gear 128, the number of teeth of the second sun gear 129, the number of teeth of the third sun gear 130, and the number of teeth of the fourth sun gear 131 are set to 34, respectively. On the other hand, the number of teeth of each of the first planetary gears 121 is set to 19, the number of teeth of each of the second planetary gears 124 is set to 17, the number of teeth of each of the third planetary gears 126 is set to 18, and the number of teeth of each of the fourth planetary gears 127 is also set to 18.

Given that the number of teeth of the first planetary gear 121 is $z_{P1}$ and that the number of teeth of the first sun gear 128 is $z_{S1}$, the gear ratio $u_1$ of the first gear train 133 may be expressed as:

$$u_1 = z_{P1}/z_{S1}.$$

Specifically, given that the number of teeth $z_{P1}$ of the first planetary gear 121 is 19 and that the number of teeth $z_{S1}$ of the first sun gear 128 is 34, the gear ratio $u_1$ of the first gear train 133 is:

$$u_1 \approx 0.56.$$

Likewise, given that the number of teeth of the second planetary gear 124 is $z_{P2}$ and that the number of teeth of the second sun gear 129 is $z_{S2}$, the gear ratio $u_2$ of the second gear train 134 may be expressed as:

$$u_2 = z_{P2}/z_{S2}.$$

Specifically, given that the number of teeth $z_{P2}$ of the second planetary gear 124 is 17 and that the number of teeth $z_{S2}$ of the second sun gear 129 is 34, the gear ratio $u_2$ of the second gear train 134 is:

$$u_2 = 0.50.$$

Thus, the number of teeth $z_{P1}$ of the first planetary gear 121 and the number of teeth $z_{P2}$ of the second planetary gear 124 are different from each other, and hence the gear ratio $u_1$ of the first gear train 133 and the gear ratio $u_2$ of the second gear train 134 are different from each other.

Therefore, given that the first driveshaft 103 and the second driveshaft 104 are rotated at the same speed to transmit torque, interference is caused between the first gear train 133 of the first control gear set 117 and the second gear train 134 of the second control gear set 118. Specifically, the number of teeth $z_{P1}$ of each of the first planetary gears 121 in the first gear train 133 is 19, and the number of teeth $z_{P3}$ of each of the third planetary gears 126 in the gear train including the third sun gear 130 and the third planetary gears 126 is 18. That is, the number of teeth $z_{P1}$ of the first planetary gear 121 is one more than the number of teeth $z_{P3}$ of the third planetary gear 126 so that a rotational speed of the first sun gear 128 in the first gear train 133 is increased higher than a rotational speed of the third sun gear 130 by the one more tooth of the first planetary gear 121. On the other hand, the number of teeth $z_{P2}$ of each of the second planetary gears 124 is 17, and the number of teeth $z_{P4}$ of each of the fourth planetary gears 127 in the gear train including the fourth sun gear 131 and the fourth planetary gears 127 is 18. That is, the number of teeth $z_{P2}$ of the second planetary gear 124 is one less than the number of teeth $z_{P4}$ of the fourth planetary gear 127 so that a rotational speed of the second sun gear 129 in the second gear train 134 is reduced lower than a rotational speed of the fourth sun gear 131 by the reduction in the number of teeth $z_{P2}$ of the second planetary gear 124. Consequently, the first sun gear 128 and the second sun gear 129 are rotated in opposite directions. In this situation, the first planetary gear 121 engaging with the first sun gear 128 is rotated integrally with the third planetary gear 126, the second planetary gear 124 engaging with the second sun gear 129 is rotated integrally with the fourth planetary gear 127, and the third sun gear 130 engaging with the third planetary gear 126 and the fourth sun gear 131 engaging with the fourth planetary gear 127 are rotated integrally. That is, the first planetary gear 121 and the second planetary gear 124 rotate integrally to revolve around the first sun gear 128 and the second sun gear 129, but the first planetary gear 121 and the second planetary gear 124 do not rotate relatively to each other. Therefore, torques are applied to an engagement site of the first gear train 133 and to an engagement site of the second gear train 134 in opposite directions thereby causing interference between the first gear train 133 and the second gear train 134. Consequently, the reversing mechanism 106 is substantially brought into engagement to rotate integrally so that the first driveshaft 103 and the second driveshaft 104 are rotated integrally without rotating relatively to each other.

By contrast, given that the first driveshaft 103 and the second driveshaft 104 are rotated at different speeds, the reversing mechanism 106 will not be brought into engagement due to interference between the first gear train 133 and the second gear train 134. In this case, the first control gear set 117 is allowed to transmit torque in accordance with the gear ratio $u_1$ of the first gear train 133, and the second control gear set 118 is allowed to transmit torque in accordance with the gear ratio $u_2$ of the second gear train 134. In the torque vectoring device TV shown in FIG. 10, the reversing mechanism 106 in engagement is released by rotating the first gear train 133 and the second gear train 134 at different speeds. In this situation, as described, torques are applied to the engagement site of the first gear train 133 and to the engagement site of the second gear train 134 in opposite directions so that the first sun gear 128 and the second sun gear 129 are rotated relatively in opposite directions. That is, the rotational direction of the second sun gear 129 is reversed to the opposite direction to the rotational direction of the first sun gear 128. Consequently, the first driveshaft 103 and the second driveshaft 104 are rotated differentially in opposite directions.

In the reversing mechanism 106, a first speed reducing ratio as a ratio of a speed of the first control output element 120 to a speed of the control input element 119 is greater than 1, and a second speed reducing ratio as a ratio of a speed of the second control output element 123 to the speed of the control input element 119 is also greater than 1. Specifically, the first speed reducing ratio between the carrier 132 and the first sun gear 128, and the second speed reducing ratio between the carrier 132 and the second sun gear 129 are greater than 1, respectively. That is, the first control gear set 117 serves as a speed reducing mechanism that reduces an output speed from the first sun gear 128 lower than an input speed to the carrier 132, and the second control gear set 118 also serves as a speed reducing mechanism that reduces an output speed from the second sun gear 129 lower than the input speed to the carrier 132. Therefore, the control torque of the actuator 105 applied to the carrier 132 is transmitted to the first driveshaft 103 and the second driveshaft 104 while being multiplied.

As described, according to the tenth example, the number of teeth $z_{P1}$ of the first planetary gear 121 is 19, the number of teeth $z_{S1}$ of the first sun gear 128 is 34, the number of teeth $z_{P2}$ of the second planetary gear 124 is 17, the number of teeth $z_{S2}$ of the second sun gear 129 is 34, the number of teeth $z_{P3}$ of the third planetary gear 126 is 18, the number of teeth $z_{S3}$ of the third sun gear 130 is 34, the number of teeth $z_{P4}$ of the fourth planetary gear 127 is 18, and the number of teeth $z_{S4}$ of the fourth sun gear 131 is 34. According to the tenth example, therefore, the first speed reducing ratio $R_1$ of the first control gear set 117 may be expressed as:

$$R_1 = 1/\{1-(z_{S3}/z_{P3})\cdot(z_{P1}/z_{S1})\} \approx 18; \text{ and}$$

the second speed reducing ratio $R_2$ of the second control gear set 118 may be expressed as:

$$R_2 = 1/\{1-(z_{S4}/z_{P4})\cdot(z_{P2}/z_{S2})\} \approx -18.$$

In general, a speed reducing ratio achieved by the conventional planetary gear sets falls within a range of approximately 4 to 10. Thus, the speed reducing ratios of the first control gear set 117 and the second control gear set 118 are greater than the speed reducing ratio of the conventional planetary gear sets.

In the first control gear set 117, the first differential reaction element 113 of the differential mechanism 102 (i.e., the second sun gear 109b) and the first power output element 112 of the differential mechanism 102 (i.e., the first sun gear 109a) are rotated in the same direction to transmit the control torque therebetween. By contrast, in the second control gear set 118, the rotational direction of the second power output element 114 of the differential mechanism 102

(i.e., the first sun gear 110a) is reversed to the opposite direction to the rotational direction of the second differential reaction element 115 of the differential mechanism 102 (i.e., the second sun gear 110b) to transmit the control torque therebetween. That is, given that the rotational direction of the first power output element 112 of the first control gear set 117 is defined as the forward direction, the second power output element 114 of the second control gear set 118 is rotated in the reverse or counter direction. In the description of the present invention, therefore, the second speed reducing ratio $R_2$ of the second control gear set 118 is indicated as a negative value (e.g., −18) for the sake of convenience, and in the tenth example shown in FIG. 10, the speed reducing ratio R is indicated commonly as R=±18.

Thus, in the torque vectoring device TV according to the tenth example, each of the first control gear set 117 and the second control gear set 118 of the reversing mechanism 106 individually serves as a speed reducing gear set whose speed reducing ratio is greater than 1. That is, the reversing mechanism 106 has not only a reversing function to allow the first driveshaft 103 and the second driveshaft 104 to rotate in the opposite directions when the first driveshaft 103 and the second driveshaft 104 rotate at different speeds, but also a torque multiplying function (or speed reducing function) to multiply the control torque generated by the actuator 105. Specifically, according to the tenth example, the speed reducing ratio of the reversing mechanism 106 to multiply the control torque of the actuator 5 is 18. In the torque vectoring device TV according to the tenth example, therefore, the actuator 105 can be downsized to reduce the size of the torque vectoring device TV.

In addition, according to the tenth example, the reversing mechanism 106 has a simple uniaxial structure. According to the tenth example, therefore, the reversing mechanism 106 serving not only as a reversing mechanism but also as a speed reducing mechanism may be formed easily. Moreover, since the reversing mechanism 106 is formed coaxially around the first driveshaft 103 and the second driveshaft 104, the size of the torque vectoring device VT is not increased in the radial direction. Further, since the reversing mechanism 106 may serve as the speed reducing mechanism, the actuator 105 may be downsized. For these reasons, the torque vectoring device VT may be mounted on a vehicle easily.

Furthermore, in the torque vectoring device VT according to the tenth example, the differential mechanism 102 and the reversing mechanism 106 are held in the hollow spaces of the output shaft 108a of the motor 108 and the output shaft 105a of the actuator 105. According to the tenth example, therefore, the size of the torque vectoring device VT is not increased in the radial direction, and such cylindrical torque vectoring device TV may be fitted easily into a vehicle.

Here, it is to be noted that an arrangement of the set of the first planetary gears 121, the set of the second planetary gears 124, the set of the third planetary gears 126, and the set of the fourth planetary gears 127, and an arrangement of the first sun gear 128, the second sun gear 129, the third sun gear 130, and the fourth sun gear 131 should not be limited to those shown in FIG. 10. For example, positions of the set of the first planetary gears 121, the set of the third planetary gears 126, the first sun gear 128, and the third sun gear 130 may be switched with positions of the set of the second planetary gears 124, the set of the fourth planetary gears 127, the second sun gear 129, and the fourth sun gear 131.

Eleventh Example

Figure 11:
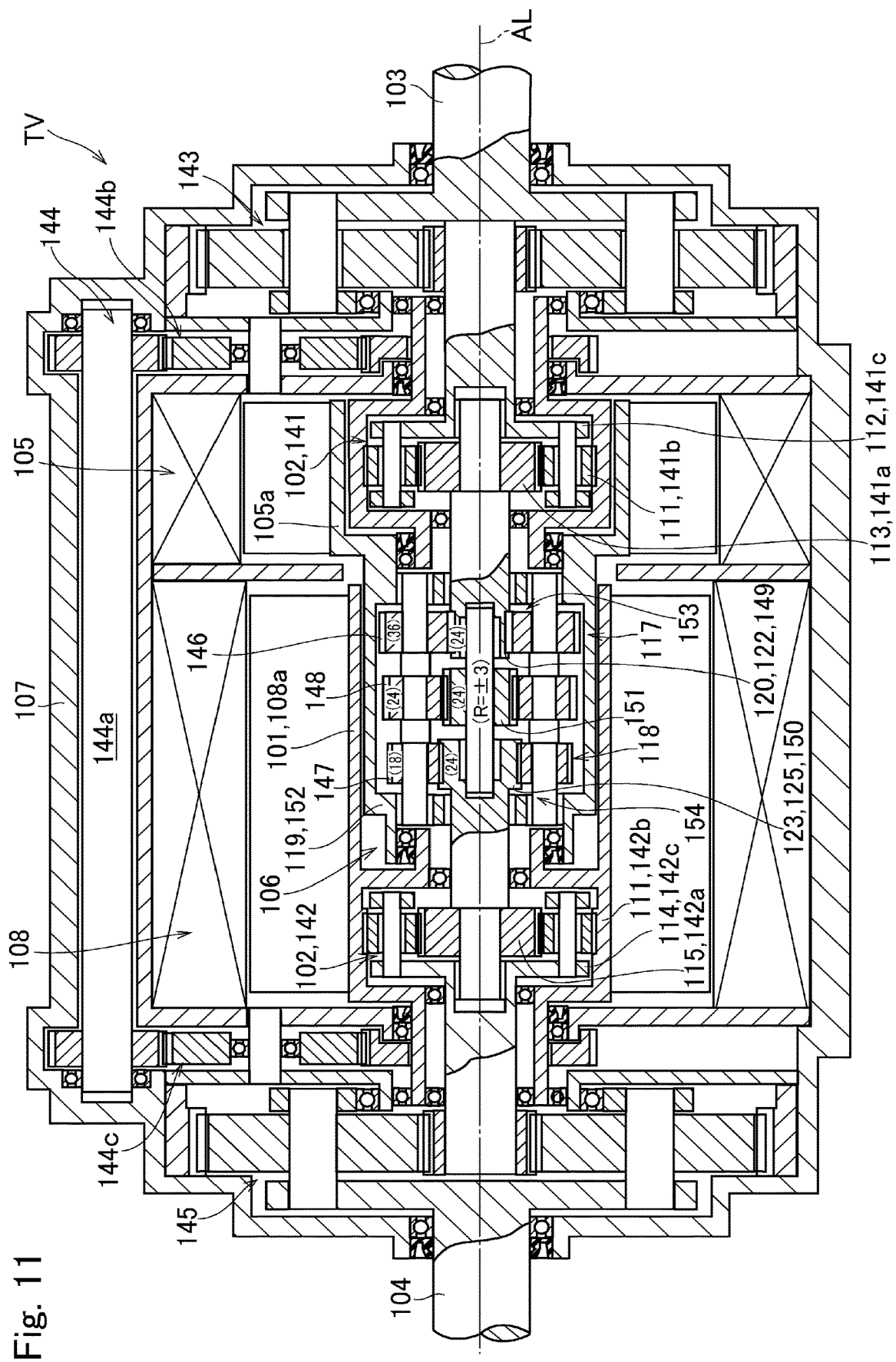
FIG. 11 is a cross-sectional view showing a structure of the torque vectoring device according to the eleventh example of the present disclosure.

Turning to FIG. 11, there is shown a structure of the torque vectoring device TV according to the eleventh example. According to the eleventh example, the differential mechanism 102 comprises a first power transmission gear set 141, and a second power transmission gear set 142. The first power transmission gear set 141 and the second power transmission gear set 142 are arranged coaxially with each other around the common rotational center axis AL of the first driveshaft 103 and the second driveshaft 104.

According to the eleventh example, a single-pinion planetary gear set is adopted as the first power transmission gear set 141 and the second power transmission gear set 142, respectively.

The first power transmission gear set 141 comprises a sun gear 141a, a ring gear 141b, and a carrier 141c. In the first power transmission gear set 141, the sun gear 141a is connected to a later-mentioned first sun gear 149 of the reversing mechanism 106 to rotate integrally with the first sun gear 149. The ring gear 141b is connected to the output shaft 108a of the motor 108 serving as a prime mover. In other words, the ring gear 141b is formed on an inner circumferential surface of the hollow portion of the output shaft 108a. The carrier 141c is connected to the first driveshaft 103 through a later-mentioned first speed reducing mechanism 143. The first power transmission gear set 141 is held in the hollow space of the output shaft 108a.

The first speed reducing mechanism 143 as a single-pinion planetary gear set transmits the output torque of the prime mover to the first driveshaft 103 while multiplying the output torque.

The second power transmission gear set 142 comprises a sun gear 142a, a ring gear 142b, and a carrier 142c. In the second power transmission gear set 142, the sun gear 142a is connected to a later-mentioned second sun gear 150 of the reversing mechanism 106 to rotate integrally with the second sun gear 150. The ring gear 142b is connected to the output shaft 108a of the motor 108 through a connection mechanism 144. The connection mechanism 144 comprises a connection shaft 144a, a gear pair 144b connected to one end of the connection shaft 144a, and a gear pair 144c connected to the other end of the connection shaft 144a. That is, the connection mechanism 144 transmits the torque of the prime mover between the output shaft 108a and the ring gear 142b. The carrier 142c is connected to the second driveshaft 104 through a later-mentioned second speed reducing mechanism 145. The second power transmission gear set 142 is held in the hollow space of the output shaft 105a.

The second speed reducing mechanism 145 as a single-pinion planetary gear set transmits the output torque of the prime mover to the second driveshaft 104 while multiplying the output torque.

The ring gear 141b of the first power transmission gear set 141 is connected to the output shaft 108a of the motor 108 so that the torque generated by the prime mover is delivered to the ring gear 141b through the output shaft 108a serving as the input member 101, and to the ring gear 142b through the output shaft 108a and the connection mechanism 144. That is, the ring gear 141b and the ring gear 142b serve as the power input element 111 of the differential mechanism 102.

The carrier 141c of the first power transmission gear set 141 is connected to the first driveshaft 103 through the first speed reducing mechanism 143 so that the torque delivered to the differential mechanism 102 is partially delivered from the carrier 141c to the first speed reducing mechanism 143, and further delivered to the first driveshaft 103 while being multiplied by the first speed reducing mechanism 143. That is, the carrier 141c serves as the first power output element 112 of the differential mechanism 102.

The sun gear 141a of the first power transmission gear set 141 is connected to the first sun gear 149 of the reversing mechanism 106 so that a part of the control torque delivered from the actuator 105 to the first sun gear 149 acts as a reaction force against the torque delivered from the power input element 111 to the first power output element 112. That is, the sun gear 141a serves as the first differential reaction element 113 of the differential mechanism 102.

The carrier 142c of the second power transmission gear set 142 is connected to the second driveshaft 104 through the second speed reducing mechanism 145 so that the torque delivered to the differential mechanism 102 is partially delivered from the carrier 142c to the second speed reducing mechanism 145, and further delivered to the second driveshaft 104 while being multiplied by the second speed reducing mechanism 145. That is, the carrier 142c serves as the second power output element 114 of the differential mechanism 102.

The sun gear 142a of the second power transmission gear set 142 is connected to a second sun gear 150 of the reversing mechanism 106 so that a part of the control torque delivered from the actuator 105 to the second sun gear 150 acts as a reaction force against the torque delivered from the power input element 111 to the second power output element 114. That is, the sun gear 142a serves as the second differential reaction element 115 of the differential mechanism 102.

The reversing mechanism 106 comprises: a set of first planetary gears 146, a set of second planetary gears 147, and a set of third planetary gears 148; the first sun gear 149, the second sun gear 150, and a third sun gear 151; and a carrier 152. The reversing mechanism 106 is held in the hollow space of the output shaft 108a.

The first planetary gears 146, the second planetary gears 147, and the third planetary gears 148 are arranged coaxially to one another. The first planetary gear 146, the second planetary gear 147, and the third planetary gear 148 rotate integrally.

The first sun gear 149, the second sun gear 150, and the third sun gear 151 are arranged coaxially with one another while being allowed to rotate relatively to one another. Specifically, the first planetary gears 146 engage with the first sun gear 149, the second planetary gears 147 engage with the second sun gear 150, and the third planetary gears 148 engage with the third sun gear 151.

The carrier 152 supports the first planetary gears 146, the second planetary gears 147, and the third planetary gears 148 in a rotatable and revolvable manner.

Specifically, the carrier 152 is connected to the output shaft 105a of the actuator 105. The first sun gear 149 is connected to the sun gear 141a serving as the first differential reaction element 113 of the differential mechanism 102, and the second sun gear 150 is connected to the sun gear 142a serving as the second differential reaction element 115 of the differential mechanism 102.

Accordingly, in the first control gear set 117, the carrier 152 serves as the control input element 119, and the first sun gear 149 serves not only as the first control output element 120 but also as the first gear 122. On the other hand, in the second control gear set 118, the carrier 152 also serves as the control input element 119, and the second sun gear 150 serves not only as the second control output element 123 but also as the second gear 125.

In the torque vectoring device TV according to the eleventh example, a first gear train 153 includes the set of the first planetary gears 146 and the first gear 122 (i.e., the first sun gear 149), and a second gear train 154 includes the set of the second planetary gears 147 and the second gear 125 (i.e., the second sun gear 150). A gear ratio of the first gear train 153 and a gear ratio of the second gear train 154 are different from each other. Specifically, a gear ratio between each of the first planetary gears 146 and the first sun gear 149 in the first gear train 153 is different from a gear ratio between each of the second planetary gears 147 and the second sun gear 150 in the second gear train 154.

More specifically, a number of teeth of the first sun gear 149, a number of teeth of the second sun gear 150, and a number of teeth of the third sun gear 151 are identical to one another. On the other hand, a number of teeth of the first planetary gear 146 is smaller than a number of teeth of the third planetary gear 148, and a number of teeth of the second planetary gear 147 is larger than the number of teeth of the third planetary gear 148.

According to the eleventh example shown in FIG. 11, specifically, the number of teeth of the first sun gear 149, the number of teeth of the second sun gear 150, and the number of teeth of the third sun gear 151 are set to 24, respectively. On the other hand, the number of teeth of each of the first planetary gears 146 is set to 18, the number of teeth of each of the second planetary gears 147 is set to 24, and the number of teeth of each of the third planetary gears 148 is set to 30. According to the eleventh example shown in FIG. 11, therefore, the speed reducing ratio R of the torque vectoring device TV is ±4 which is smaller than that of the tenth example. However, according to the eleventh example, a load applied to the reversing mechanism 106 can be reduced. For this reason, the torque vectoring device TV may also be downsized.

Here, it is to be noted that an arrangement of the set of the first planetary gears 146, the set of the second planetary gears 147, and the set of the third planetary gears 148, and an arrangement of the first sun gear 149, the second sun gear 150, and the third sun gear 151, should not be limited to those shown in FIG. 11. For example, positions of the set of the first planetary gears 146 and the first sun gear 149 may be switched with positions of the set of the second planetary gears 147 and the second sun gear 150.

Twelfth Example

Figure 12:
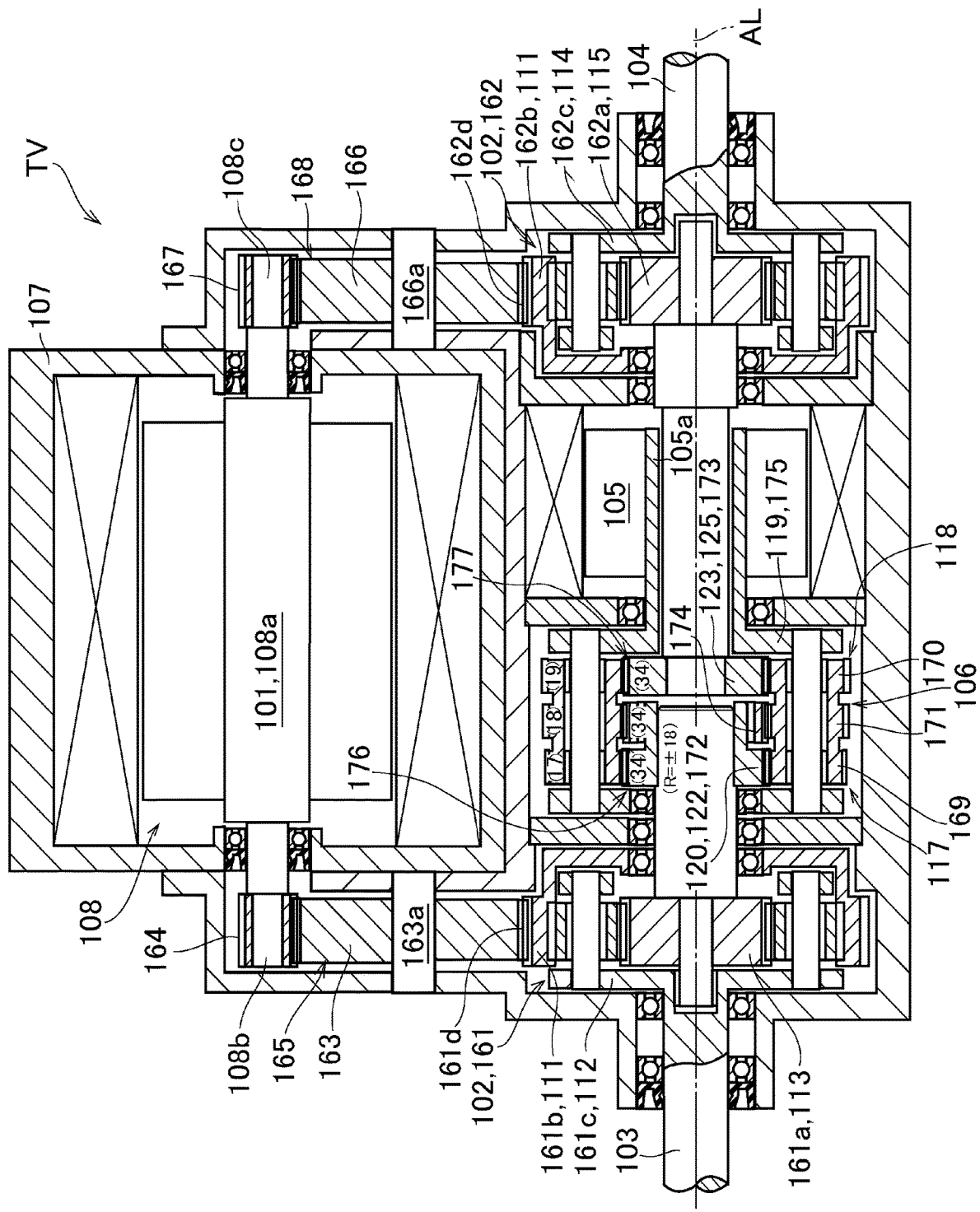
FIG. 12 is a cross-sectional view showing a structure of the torque vectoring device according to the twelfth example of the present disclosure.

Turning to FIG. 12, there is shown a structure of the torque vectoring device TV according to the twelfth example. According to the twelfth example, the differential mechanism 102 comprises a first power transmission gear set 161, and a second power transmission gear set 162. The first power transmission gear set 161 and the second power transmission gear set 162 are arranged coaxially with each other around the common rotational center axis AL of the first driveshaft 103 and the second driveshaft 104.

According to the twelfth example, a single-pinion planetary gear set is adopted as the first power transmission gear set 161 and the second power transmission gear set 162, respectively.

The first power transmission gear set 161 comprises a sun gear 161a, a ring gear 161b, and a carrier 161c. In the first power transmission gear set 161, the sun gear 161a is connected to a later-mentioned first sun gear 172 of the reversing mechanism 106 to rotate integrally with the first sun gear 172. An input gear 161d as an external gear is formed on an outer circumferential surface of the ring gear 161b to engage with a counter gear 163. The counter gear 163 is supported by a counter gear shaft 163a, and both ends of the counter gear shaft 163a are fixed to the case 107. The counter gear 163 also engages with a first pinion 164 mounted on a later-mentioned first output shaft 108b. Thus, the ring gear 161b is connected to the first output shaft 108b through a gear train 165 including the input gear 161d, the counter gear 163, and the first pinion 164. The carrier 161c is connected to the first driveshaft 103.

The second power transmission gear set 162 comprises a sun gear 162a, a ring gear 162b, and a carrier 162c. In the second power transmission gear set 162, the sun gear 142a is connected to a later-mentioned second sun gear 173 of the reversing mechanism 106 to rotate integrally with the second sun gear 173. An input gear 162d as an external gear is formed on an outer circumferential surface of the ring gear 162b to engage with a counter gear 166. The counter gear 166 is supported by a counter gear shaft 166a, and both ends of the counter gear shaft 166a are fixed to the case 107. The counter gear 166 also engages with a second pinion 167 mounted on a later-mentioned second output shaft 108c. Thus, the ring gear 162b is connected to the second output shaft 108c through a gear train 168 including the input gear 162d, the counter gear 166, and the second pinion 167. The carrier 162c is connected to the second driveshaft 104.

According to the twelfth example, the output shaft 108a of the motor 108 serving as a prime mover includes the first output shaft 108b and the second output shaft 108c extending coaxially. Specifically, the first output shaft 108b protrudes toward the first driveshaft 103 side (i.e., toward the left side in FIG. 12), and the first pinion 164 is mounted on a leading end of the first output shaft 108b. On the other hand, the second output shaft 108c protrudes toward the second driveshaft 104 side (i.e., toward the right side in FIG. 12), and the second pinion 167 is mounted on a leading end of the second output shaft 108c.

The ring gear 161b of the first power transmission gear set 161 is connected to the first output shaft 108b of the motor 108 through the gear train 165 so that the torque generated by the prime mover is delivered to the ring gear 161b through the output shaft 108b serving as the input member 101 and the gear train 165. On the other hand, the ring gear 162b of the second power transmission gear set 162 is connected to the second output shaft 108c of the motor 108 through the gear train 168 so that the torque generated by the prime mover is delivered to the ring gear 162b through the output shaft 108c serving as the input member 101 and the gear train 168. That is, the ring gear 161b and the ring gear 162b serve as the power input element 111 of the differential mechanism 102.

The carrier 161c of the first power transmission gear set 161 is connected to the first driveshaft 103 so that the torque delivered to the differential mechanism 102 is partially delivered from the carrier 161c to the first driveshaft 103. That is, the carrier 161c serves as the first power output element 112 of the differential mechanism 102.

The sun gear 161a of the first power transmission gear set 161 is connected to a later-mentioned first sun gear 172 of the reversing mechanism 106 so that a part of the control torque delivered from the actuator 105 to the first sun gear 172 acts as a reaction force against the torque delivered from the power input element 111 to the first power output element 112. That is, the sun gear 161a serves as the first differential reaction element 113 of the differential mechanism 102.

The carrier 162c of the second power transmission gear set 162 is connected to the second driveshaft 104 so that the torque delivered to the differential mechanism 102 is partially delivered from the carrier 162c to the second driveshaft 104. That is, the carrier 162c serves as the second power output element 114 of the differential mechanism 102.

The sun gear 162a of the second power transmission gear set 162 is connected to a later-mentioned second sun gear 173 of the reversing mechanism 106 so that a part of the control torque delivered from the actuator 105 to the second sun gear 173 acts as a reaction force against the torque delivered from the power input element 111 to the second power output element 114. That is, the sun gear 162a serves as the second differential reaction element 115 of the differential mechanism 102.

The reversing mechanism 106 comprises: a set of first planetary gears 169, a set of second planetary gears 170, and a set of third planetary gears 171; the first sun gear 172, the second sun gear 173, and a third sun gear 174; and a carrier 175.

The first planetary gears 169, the second planetary gears 170, and the third planetary gears 171 are arranged coaxially to one another. The first planetary gear 169, the second planetary gear 170, and the third planetary gear 171 rotate integrally.

The first sun gear 172, the second sun gear 173, and the third sun gear 174 are arranged coaxially with one another while being allowed to rotate relatively to one another. Specifically, the first planetary gears 169 engage with the first sun gear 172, the second planetary gears 170 engage with the second sun gear 173, and the third planetary gears 171 engage with the third sun gear 174.

The carrier 175 supports the first planetary gears 169, the second planetary gears 170, and the third planetary gears 171 in a rotatable and revolvable manner. The reversing mechanism 106 is formed coaxially with the actuator 105 around the common rotational center axis AL of the first driveshaft 103 and the second driveshaft 104, between the first power transmission gear set 161 and the second power transmission gear set 162.

Specifically, the carrier 175 is connected to the output shaft 105a of the actuator 105. The first sun gear 172 is connected to the sun gear 161a serving as the first differential reaction element 113 of the differential mechanism 102, and the second sun gear 173 is connected to the sun gear 162a serving as the second differential reaction element 115 of the differential mechanism 102.

Accordingly, in the first control gear set 117, the carrier 175 serves as the control input element 119, and the first sun gear 172 serves not only as the first control output element 120 but also as the first gear 122. On the other hand, in the second control gear set 118, the carrier 175 also serves as the control input element 119, and the second sun gear 173 serves not only as the second control output element 123 but also as the second gear 125.

In the torque vectoring device TV according to the twelfth example, a first gear train 176 includes the set of the first planetary gears 169 and the first gear 122 (i.e., the first sun gear 172), and a second gear train 177 includes the set of the second planetary gears 170 and the second gear 125 (i.e., the second sun gear 173). A gear ratio of the first gear train 176 and a gear ratio of the second gear train 177 are different from each other. Specifically, a gear ratio between each of the first planetary gears 169 and the first sun gear 172 in the first gear train 176 is different from a gear ratio between each of the second planetary gears 170 and the second sun gear 173 in the second gear train 177.

More specifically, a number of teeth of the first sun gear 172, a number of teeth of the second sun gear 173, and a number of teeth of the third sun gear 174 are identical to one another. On the other hand, a number of teeth of the first planetary gear 169 is smaller than a number of teeth of the third planetary gear 171, and a number of teeth of the second planetary gear 170 is larger than the number of teeth of the third planetary gear 171.

According to the twelfth example shown in FIG. 12, specifically, the number of teeth of the first sun gear 172, the number of teeth of the second sun gear 173, and the number of teeth of the third sun gear 174 are set to 34, respectively. On the other hand, the number of teeth of each of the first planetary gears 169 is set to 17, the number of teeth of each of the second planetary gears 170 is set to 19, and the number of teeth of each of the third planetary gears 171 is set to 18. According to the twelfth example, therefore, the speed reducing ratio R of the torque vectoring device TV is ±18. As described, in general, a speed reducing ratio achieved by the conventional planetary gear sets falls within a range of approximately 4 to 10. Thus, according to the twelfth example, the speed reducing ratio R is also greater than those of the conventional planetary gear sets.

Here, it is to be noted that an arrangement of the set of the first planetary gears 169, the set of the second planetary gears 170, and the set of the third planetary gears 171, and an arrangement of the first sun gear 172, the second sun gear 173, and the third sun gear 174, should not be limited to those shown in FIG. 12. For example, positions of the set of the first planetary gears 169 and the first sun gear 172 may be switched with positions of the set of the second planetary gears 170 and the second sun gear 173.

Thirteenth Example

Figure 13:
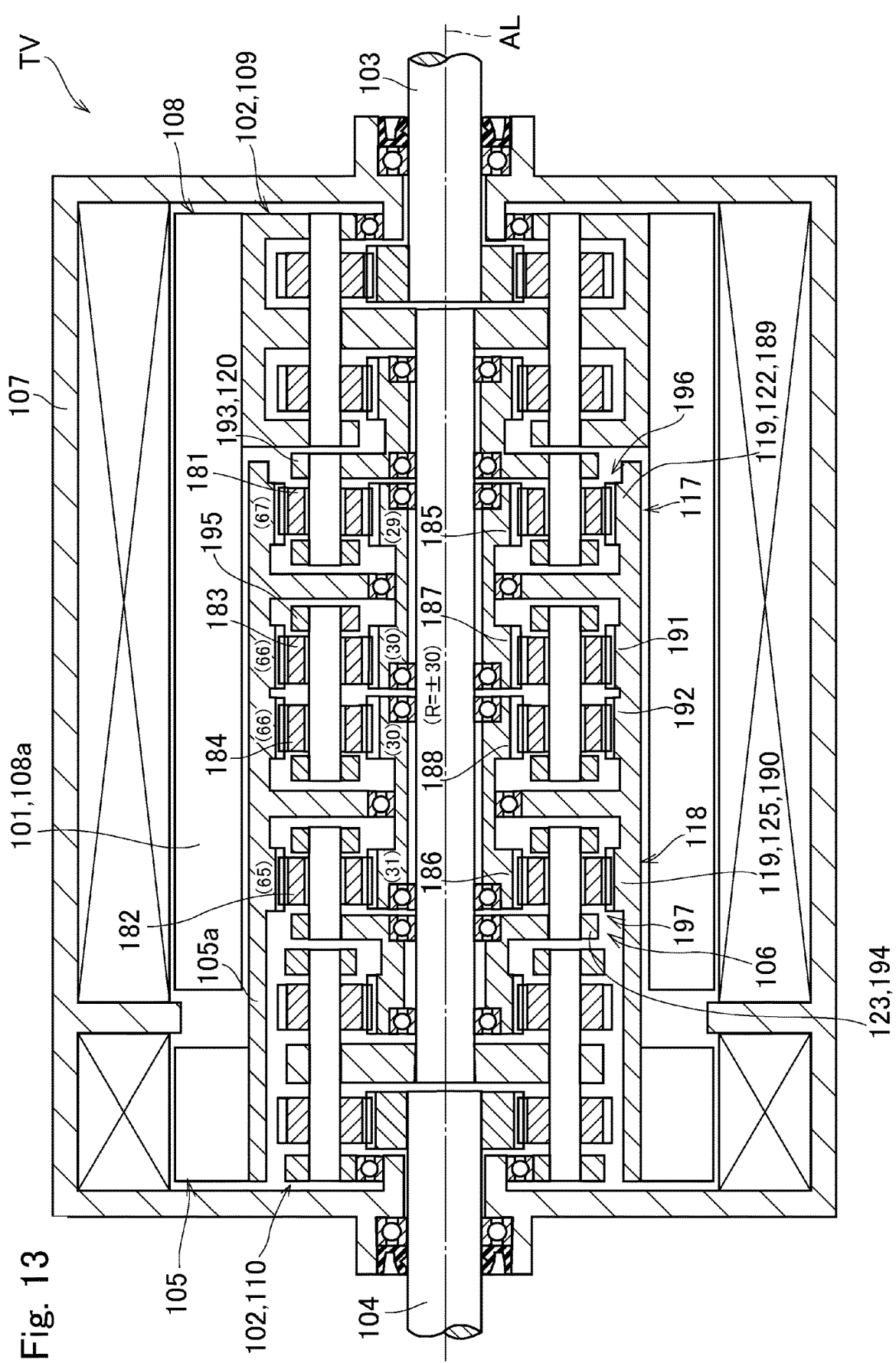
FIG. 13 is a cross-sectional view showing a structure of the torque vectoring device according to the thirteenth example of the present disclosure.

Turning to FIG. 13, there is shown a structure of the torque vectoring device TV according to the thirteenth example. According to the thirteenth example, as the tenth example, the differential mechanism 102 comprises the first power transmission gear set 109, and the second power transmission gear set 110. The first power transmission gear set 109 and the second power transmission gear set 110 are arranged coaxially with each other around the common rotational center axis AL of the first driveshaft 103 and the second driveshaft 104.

The reversing mechanism 106 comprises: a set of first planetary gears 181, a set of second planetary gears 182, a set of third planetary gears 183, and a set of fourth planetary gears 184; a first sun gear 185, a second sun gear 186, a third sun gear 187, and a fourth sun gear 188; a first ring gear 189, a second ring gear 190, a third ring gear 191, and a fourth ring gear 192; and a first carrier 193, a second carrier 194, and a third carrier 195. The reversing mechanism 106 is held in the hollow space of the output shaft 108a.

The first planetary gears 181, the second planetary gears 182, the third planetary gears 183, and the fourth planetary gears 184 are arranged coaxially with one another while being allowed to rotate relatively to one another.

The first sun gear 185, the second sun gear 186, the third sun gear 187, and the fourth sun gear 188 are arranged coaxially with one another. The first planetary gears 181 engage with the first sun gear 185, the second planetary gears 182 engage with the second sun gear 186, the third planetary gears 183 engage with the third sun gear 187, and the fourth planetary gears 184 engage with the fourth sun gear 188. Specifically, the first sun gear 185 and the third sun gear 187 are joined to each other to rotate integrally, and the second sun gear 186 and the fourth sun gear 188 are joined to each other to rotate integrally. A unit of the first sun gear 185 and the third sun gear 187 and a unit of the second sun gear 186 and the fourth sun gear 188 are allowed to rotate relatively to each other.

The first ring gear 189, the second ring gear 190, the third ring gear 191, and the fourth ring gear 192 are arranged coaxially with one another. Specifically, the first ring gear 189, the second ring gear 190, the third ring gear 191, and the fourth ring gear 192 are joined to one another to rotate integrally. The first planetary gears 181 also engage with the first ring gear 189, the second planetary gears 182 also engage with the second ring gear 190, the third planetary gears 183 also engage with the third ring gear 191, and the fourth planetary gears 184 also engage with the fourth ring gear 192.

The first carrier 193, the second carrier 194, and the third carrier 195 are arranged coaxially with one another while being allowed to rotate relatively to one another. Specifically, the first carrier 193 supports the first planetary gears 181 in a rotatable and revolvable manner, the second carrier 194 supports the second planetary gears 182 in a rotatable and revolvable manner, and the third carrier 195 supports the third planetary gears 183 and the fourth planetary gears 184 in a rotatable and revolvable manner.

The first ring gear 189, the second ring gear 190, the third ring gear 191, and the fourth ring gear 192 are joined to the output shaft 105a of the actuator 105. The first carrier 193 is connected to the second sun gear 109b serving as the first differential reaction element 113 of the differential mechanism 102. On the other hand, the second carrier 194 is connected to the second sun gear 110b serving as the second differential reaction element 115 of the differential mechanism 102. The first planetary gears 181 also engage with the first ring gear 189, and the second planetary gears 182 also engage with the second ring gear 190.

Accordingly, in the first control gear set 117, the first ring gear 189 serves not only as the control input element 119 but also as the first gear 122, and the first carrier 193 serves as the first control output element 120. On the other hand, in the second control gear set 118, the second ring gear 190 serves not only as the control input element 119 but also as the second gear 125, and the second carrier 194 serves as the second control output element 123.

In the torque vectoring device TV according to the thirteenth example, a first gear train 196 includes the set of the first planetary gears 181, the first gear 122 (i.e., the first ring gear 189), and the first sun gear 185. On the other hand, a second gear train 197 includes the set of the second planetary gears 182, the second gear 125 (i.e., the second ring gear 190), and the second sun gear 186. A gear ratio of the first gear train 196 and a gear ratio of the second gear train 197 are different from each other. Specifically, a gear ratio between the first ring gear 189 and the first sun gear 185 through the first planetary gears 181 in the first gear train 196 is different from a gear ratio between the second ring gear 190 and the second sun gear 186 through the second planetary gears 182 in the second gear train 154.

More specifically, a number of teeth of each of the first planetary gears 181, a number of teeth of each of the second planetary gears 182, a number of teeth of each of the third planetary gears 183, and a number of teeth of each of the fourth planetary gears 184 are identical to one another. On the other hand, a number of teeth of the third sun gear 187 and a number of teeth of the fourth sun gear 188 are identical to each other. A number of teeth of the first sun gear 185 is smaller than the number of teeth of the third sun gear 187 and the number of teeth of the fourth sun gear 188, but a number of teeth of the second sun gear 186 is larger than the number of teeth of the third sun gear 187 and the number of teeth of the fourth sun gear 188. Likewise, a number of teeth of the third ring gear 191 and a number of teeth of the fourth ring gear 192 are identical to each other. A number of teeth of the first ring gear 189 is larger than the number of teeth of the third ring gear 191 and the number of teeth of the fourth ring gear 192, but a number of teeth of the second ring gear 190 is smaller than the number of teeth of the third ring gear 191 and the number of teeth of the fourth ring gear 192.

According to the thirteenth example shown in FIG. 13, specifically, the number of teeth of the first sun gear 185 is set to 29, the number of teeth of the second sun gear 186 is set to 31, the number of teeth of the third sun gear 187 is set to 30, and the number of teeth of the fourth sun gear 188 is also set to 30. On the other hand, the number of teeth of the first ring gear 189 is set to 67, the number of teeth of the second ring gear 190 is set to 65, the number of teeth of the third ring gear 191 is set to 66, and the number of teeth of the fourth ring gear 192 is also set to 66. According to the thirteenth example, therefore, the speed reducing ratio R of the torque vectoring device TV is ±30. As described, in general, a speed reducing ratio achieved by the conventional planetary gear sets falls within a range of approximately 4 to 10. Thus, according to the thirteenth example, the speed reducing ratio R is also greater than those of the conventional planetary gear sets.

Here, it is to be noted that: an arrangement of the set of the first planetary gears 181, the set of the second planetary gears 182, the set of the third planetary gears 183, and the set of the fourth planetary gears 184; an arrangement of the first sun gear 185, the second sun gear 186, the third sun gear 187, and the fourth sun gear 188; and an arrangement of the first ring gear 189, the second ring gear 190, the third ring gear 191, and the fourth ring gear 192 should not be limited to those shown in FIG. 13. For example, positions of the set of the first planetary gears 181 and the set of the third planetary gears 183 may be switched with positions of the set of the second planetary gears 182 and the set of the fourth planetary gears 184. In this case, positions of the first sun gear 185 and the third sun gear 187 are switched with positions of the second sun gear 186 and the fourth sun gear 188, and positions of the first ring gear 189 and the third ring gear 191 are switched with positions of the second ring gear 190 and the fourth ring gear 192.

Fourteenth Example

Figure 14:
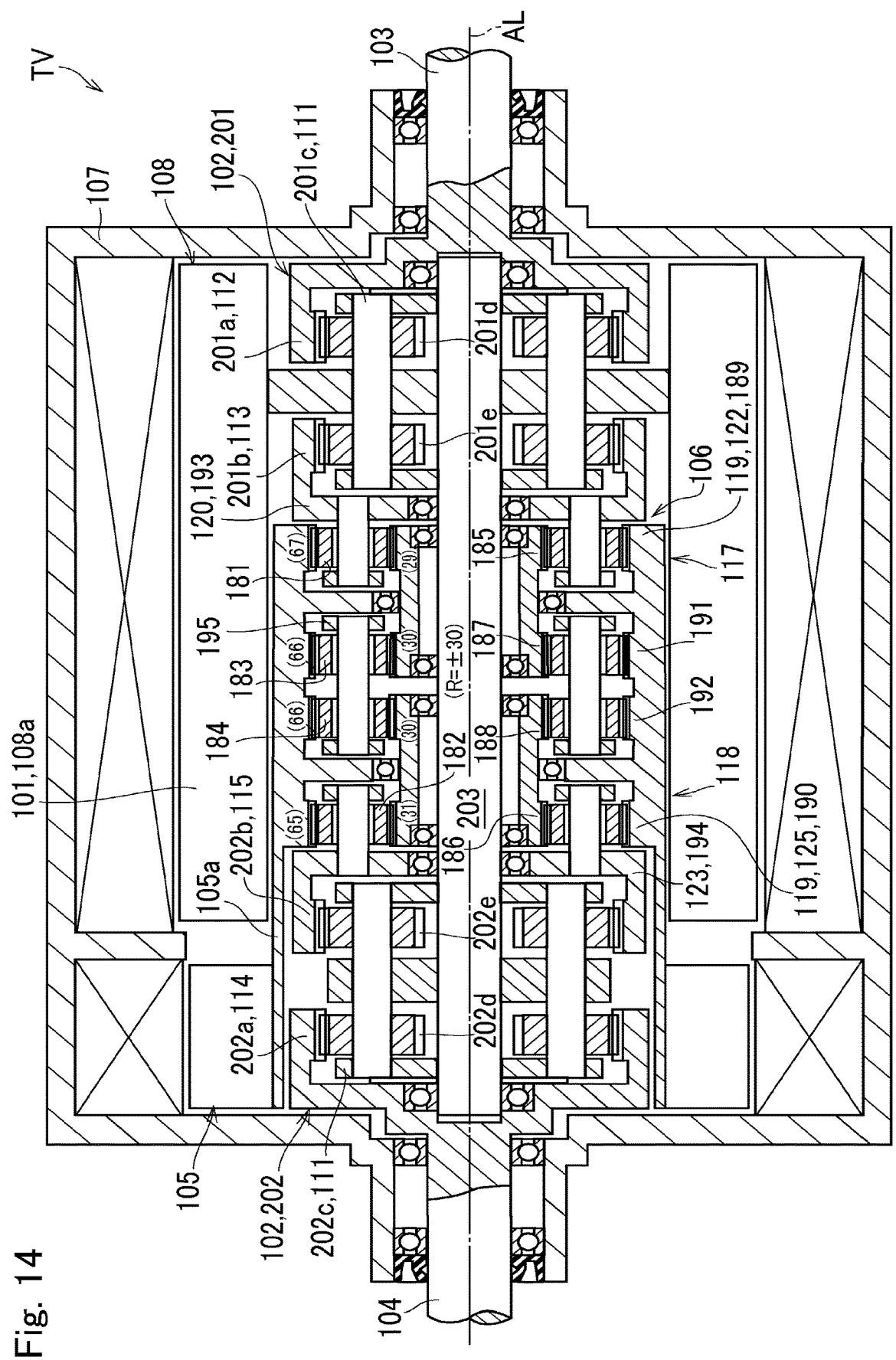
FIG. 14 is a cross-sectional view showing a structure of the torque vectoring device according to the fourteenth example of the present disclosure.

Turning to FIG. 14, there is shown a structure of the torque vectoring device TV according to the fourteenth example. According to the fourteenth example, the differential mechanism 102 comprises a first power transmission gear set 201, and a second power transmission gear set 202. The first power transmission gear set 201 and the second power transmission gear set 202 are arranged coaxially with each other around the common rotational center axis AL of the first driveshaft 103 and the second driveshaft 104.

The first power transmission gear set 201 is a complex planetary gear set formed by combining two sets of planetary gear sets, and the second power transmission gear set 202 is also a complex planetary gear set formed by combining two sets of planetary gear sets.

Specifically, the first power transmission gear set 201 comprises a first ring gear 201a, a second ring gear 201b, a carrier 201c, a set of first planetary gears 201d, and a set of second planetary gears 201e. In the first power transmission gear set 201, the first ring gear 201a and the second ring gear 201b are arranged coaxially while being allowed to rotate relatively to each other. The first planetary gears 201d engaging with the first ring gear 201a and the second planetary gears 201e engaging with the second ring gear 201b are supported rotatably by the carrier 201c so that the first planetary gears 201d and the second planetary gears 201e are allowed to revolve around the rotational center axis AL. The first planetary gear 201d and the second planetary gear 201e rotates integrally. The first power transmission gear set 201 is held in the hollow space of the output shaft 108a.

On the other hand, the second power transmission gear set 202 comprises a first ring gear 202a, a second ring gear 202b, a carrier 202c, a set of first planetary gears 202d, and a set of second planetary gears 202e. In the second power transmission gear set 202, the first ring gear 202a and the second ring gear 202b are arranged coaxially while being allowed to rotate relatively to each other. The first planetary gears 202d engaging with the first ring gear 202a and the second planetary gears 202e engaging with the second ring gear 202b are supported rotatably by the carrier 202c so that the first planetary gears 202d and the second planetary gears 201e are allowed to revolve around the rotational center axis AL. The first planetary gear 202d and the second planetary gear 202e rotates integrally. The carrier 201c of the first power transmission gear set 201 and the carrier 202c of the second power transmission gear set 202 are connected to each other through a connection shaft 203 in such a manner as to rotate integrally with the connection shaft 203. The second power transmission gear set 202 is held in the hollow space of the output shaft 108a and a hollow space of the output shaft 105a of the actuator 105.

The carrier 201c of the first power transmission gear set 201 is connected to the output shaft 108a of the motor 108. The first ring gear 201a and the second ring gear 201b of the first power transmission gear set 201, and the first ring gear 202a and the second ring gear 202b of the second power transmission gear set 202 are allowed to rotate relatively to the connection shaft 203. The torque generated by the prime mover is delivered to the carrier 201c through the output shaft 108a serving as the input member 101, and to the carrier 202c through the output shaft 108a and the connection shaft 203. That is, the carrier 201c and the carrier 202c serve as the power input element 111 of the differential mechanism 102.

The first ring gear 201a of the first power transmission gear set 201 is connected to the first driveshaft 103 so that the torque delivered to the differential mechanism 102 is partially delivered to the first driveshaft 103 from the first ring gear 201a. That is, the first ring gear 201a serves as the first power output element 112 of the differential mechanism 102.

The second ring gear 201b of the first power transmission gear set 201 is connected to the first carrier 193 of the reversing mechanism 106 so that a part of the control torque delivered from the actuator 105 to the first carrier 193 acts as a reaction force against the torque delivered from the power input element 111 to the first power output element 112. That is, the second ring gear 201b serves as the first differential reaction element 113 of the differential mechanism 102.

The first ring gear 202a of the second power transmission gear set 202 is connected to the second driveshaft 104 so that the torque delivered to the differential mechanism 102 is partially delivered to the second driveshaft 104 from the first ring gear 202a. That is, the first ring gear 202a serves as the second power output element 114 of the differential mechanism 102.

The second ring gear 202b of the second power transmission gear set 202 is connected to the second carrier 194 of the reversing mechanism 106 so that a part of the control torque delivered from the actuator 105 to the second carrier 194 acts as a reaction force against the torque delivered from the power input element 111 to the second power output element 114. That is, the second ring gear 202b serves as the second differential reaction element 115 of the differential mechanism 102.

As the thirteenth example, in the first control gear set 117, the first ring gear 189 serves not only as the control input element 119 but also as the first gear 122, and the first carrier 193 serves as the first control output element 120. On the other hand, in the second control gear set 118, the second ring gear 190 serves not only as the control input element 119 but also as the second gear 125, and the second carrier 194 serves as the second control output element 123. The reversing mechanism 106 is held in the hollow space of the output shaft 108a.

Thus, according to the fourteenth example, the first carrier 193 of the reversing mechanism 106 serving as the first control output element 120 is connected to the second ring gear 201b of the differential mechanism 102 serving as the first differential reaction element 113. On the other hand, the second carrier 194 of the reversing mechanism 106 serving as the second control output element 123 is connected to the second ring gear 202b of the differential mechanism 102 serving as the second differential reaction element 115. That is, according to the fourteenth example, the sun gears are omitted in the differential mechanism 102. Therefore, the torque vectoring device TV may be downsized in the redial direction.

Fifteenth Example

Figure 15:
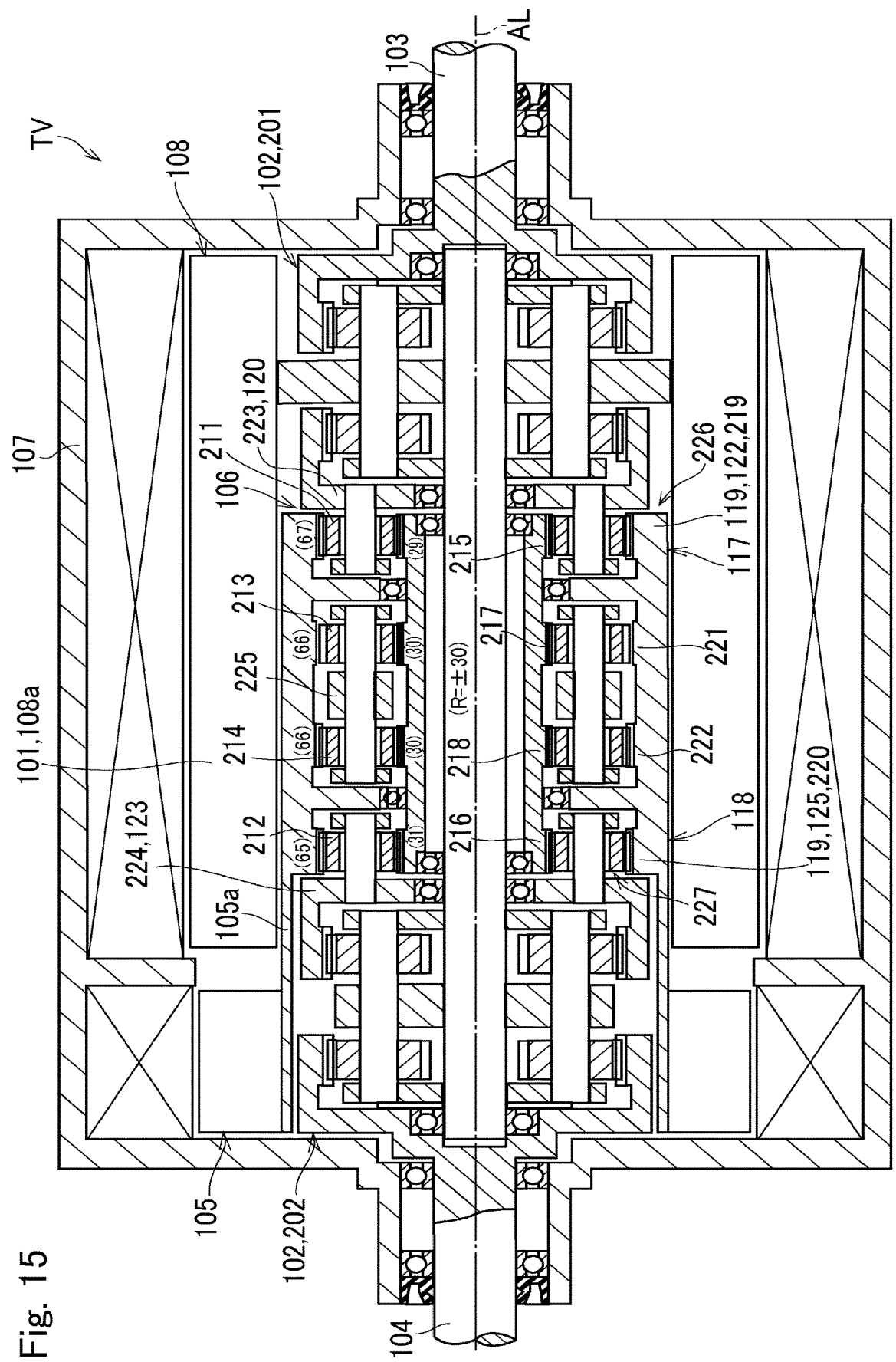
FIG. 15 is a cross-sectional view showing a structure of the torque vectoring device according to the fifteenth example of the present disclosure.

Turning to FIG. 15, there is shown a structure of the torque vectoring device TV according to the fifteenth example. According to the fifteenth example, as the fourteenth example, the differential mechanism 102 comprises the first power transmission gear set 201, and the second power transmission gear set 202. The first power transmission gear set 201 and the second power transmission gear set 202 are arranged coaxially with each other around the common rotational center axis AL of the first driveshaft 103 and the second driveshaft 104.

The reversing mechanism 106 comprises: a set of first planetary gears 211, a set of second planetary gears 212, a set of third planetary gears 213, and a set of fourth planetary gears 214; a first sun gear 215, a second sun gear 216, a third sun gear 217, and a fourth sun gear 218; a first ring gear 219, a second ring gear 220, a third ring gear 221, and a fourth ring gear 222; and a first carrier 223, a second carrier 224, and a third carrier 225. The reversing mechanism 106 is held in the hollow space of the output shaft 108a.

The first planetary gears 211, the second planetary gears 212, the third planetary gears 213, and the fourth planetary gears 214 are arranged coaxially with one another while being allowed to rotate relatively to one another.

The first sun gear 215, the second sun gear 216, the third sun gear 217, and the fourth sun gear 218 are arranged coaxially with one another. Specifically, the first sun gear 215, the second sun gear 216, the third sun gear 217, and the fourth sun gear 218 are joined to one another to rotate integrally. The first planetary gears 211 engage with the first sun gear 215, the second planetary gears 212 engage with the second sun gear 216, the third planetary gears 213 engage with the third sun gear 217, and the fourth planetary gears 214 engage with the fourth sun gear 218.

The first ring gear 219, the second ring gear 220, the third ring gear 221, and the fourth ring gear 222 are arranged coaxially with one another. Specifically, the first ring gear 219, the second ring gear 220, the third ring gear 221, and the fourth ring gear 222 are joined to one another to rotate integrally. The first planetary gears 211 also engage with the first ring gear 219, the second planetary gears 212 also engage with the second ring gear 220, the third planetary gears 213 also engage with the third ring gear 221, and the fourth planetary gears 214 engage with the fourth ring gear 222.

The first carrier 223, the second carrier 224, and the third carrier 225 are arranged coaxially with one another while being allowed to rotate relatively to one another. Specifically, the first carrier 223 supports the first planetary gears 211 in a rotatable and revolvable manner, the second carrier 224 supports the second planetary gears 212 in a rotatable and revolvable manner, and the third carrier 225 supports the third planetary gears 213 and the fourth planetary gears 214 in a rotatable and revolvable manner.

The first ring gear 219, the second ring gear 220, the third ring gear 221, and the fourth ring gear 222 are joined to the output shaft 105a of the actuator 105. The first carrier 223 of the reversing mechanism 106 is connected to the second ring gear 201b of the first power transmission gear set 201 serving as the first differential reaction element 113 of the differential mechanism 102. On the other hand, the second carrier 224 of the reversing mechanism 106 is connected to the second ring gear 202b of the second power transmission gear set 202 serving as the second differential reaction element 115 of the differential mechanism 102.

Accordingly, in the first control gear set 117, the first ring gear 219 serves not only as the control input element 119 but also as the first gear 122, and the first carrier 223 serves as the first control output element 120. On the other hand, in the second control gear set 118, the second ring gear 220 serves not only as the control input element 119 but also as the second gear 125, and the second carrier 224 serves as the second control output element 123.

In the torque vectoring device TV according to the fifteenth example, a first gear train 226 includes the set of the first planetary gears 211, the first gear 122 (i.e., the first ring gear 219), and the first sun gear 215. On the other hand, a second gear train 227 includes the set of the second planetary gears 212, the second gear 125 (i.e., the second ring gear 220), and the second sun gear 216. A gear ratio of the first gear train 226 and a gear ratio of the second gear train 227 are different from each other. Specifically, a gear ratio between the first ring gear 219 and the first sun gear 215 through the first planetary gears 211 in the first gear train 226 is different from a gear ratio between the second ring gear 220 and the second sun gear 216 through the second planetary gears 212 in the second gear train 227.

More specifically, a number of teeth of each of the first planetary gears 211, a number of teeth of each of the second planetary gears 212, a number of teeth of each of the third planetary gears 213, and a number of teeth of each of the fourth planetary gears 214 are identical to one another. On the other hand, a number of teeth of the third sun gear 217 and a number of teeth of the fourth sun gear 218 are identical to each other. A number of teeth of the first sun gear 215 is smaller than the number of teeth of the third sun gear 217 and the number of teeth of the fourth sun gear 218, but a number of teeth of the second sun gear 216 is larger than the number of teeth of the third sun gear 217 and the number of teeth of the fourth sun gear 218. Likewise, a number of teeth of the third ring gear 221 and a number of teeth of the fourth ring gear 222 are identical to each other. A number of teeth of the first ring gear 219 is larger than the number of teeth of the third ring gear 221 and the number of teeth of the fourth ring gear 222, but a number of teeth of the second ring gear 220 is smaller than the number of teeth of the third ring gear 221 and the number of teeth of the fourth ring gear 222.

According to the fifteenth example shown in FIG. 15, specifically, the number of teeth of the first sun gear 215 is set to 29, the number of teeth of the second sun gear 216 is set to 31, the number of teeth of the third sun gear 217 is set to 30, and the number of teeth of the fourth sun gear 218 is also set to 30. On the other hand, the number of teeth of the first ring gear 219 is set to 67, the number of teeth of the second ring gear 220 is set to 65, the number of teeth of the third ring gear 221 is set to 66, and the number of teeth of the fourth ring gear 222 is also set to 66. According to the fifteenth example, therefore, the speed reducing ratio R of the torque vectoring device TV is ±30. As described, in general, a speed reducing ratio achieved by the conventional planetary gear sets falls within the range of approximately 4 to 10. Thus, according to the fifteenth example, the speed reducing ratio R is also greater than those of the conventional planetary gear sets.

As described, according to the fifteenth example, the first carrier 223 of the reversing mechanism 106 serving as the first control output element 120 is connected to the second ring gear 201b of the differential mechanism 102 serving as the first differential reaction element 113. On the other hand, the second carrier 224 of the reversing mechanism 106 serving as the second control output element 123 is connected to the second ring gear 202b of the differential mechanism 102 serving as the second differential reaction element 115. That is, according to the fifteenth example, the sun gears are omitted in the differential mechanism 102. Therefore, the torque vectoring device TV may be downsized in the redial direction.

Here, it is to be noted that: an arrangement of the set of the first planetary gears 211, the set of the second planetary gears 212, the set of the third planetary gears 213, and the set of the fourth planetary gears 214; an arrangement of the first sun gear 215, the second sun gear 216, the third sun gear 217, and the fourth sun gear 218; and an arrangement of the first ring gear 219, the second ring gear 220, the third ring gear 221, and the fourth ring gear 222 should not be limited to those shown in FIG. 15. For example, positions of the set of the first planetary gears 211, the first sun gear 215, the first ring gear 219, and the first carrier 223 may be switched with positions of the set of the second planetary gears 212, the second sun gear 216, the second ring gear 220, and the second carrier 224.

Sixteenth Example

Figure 16:
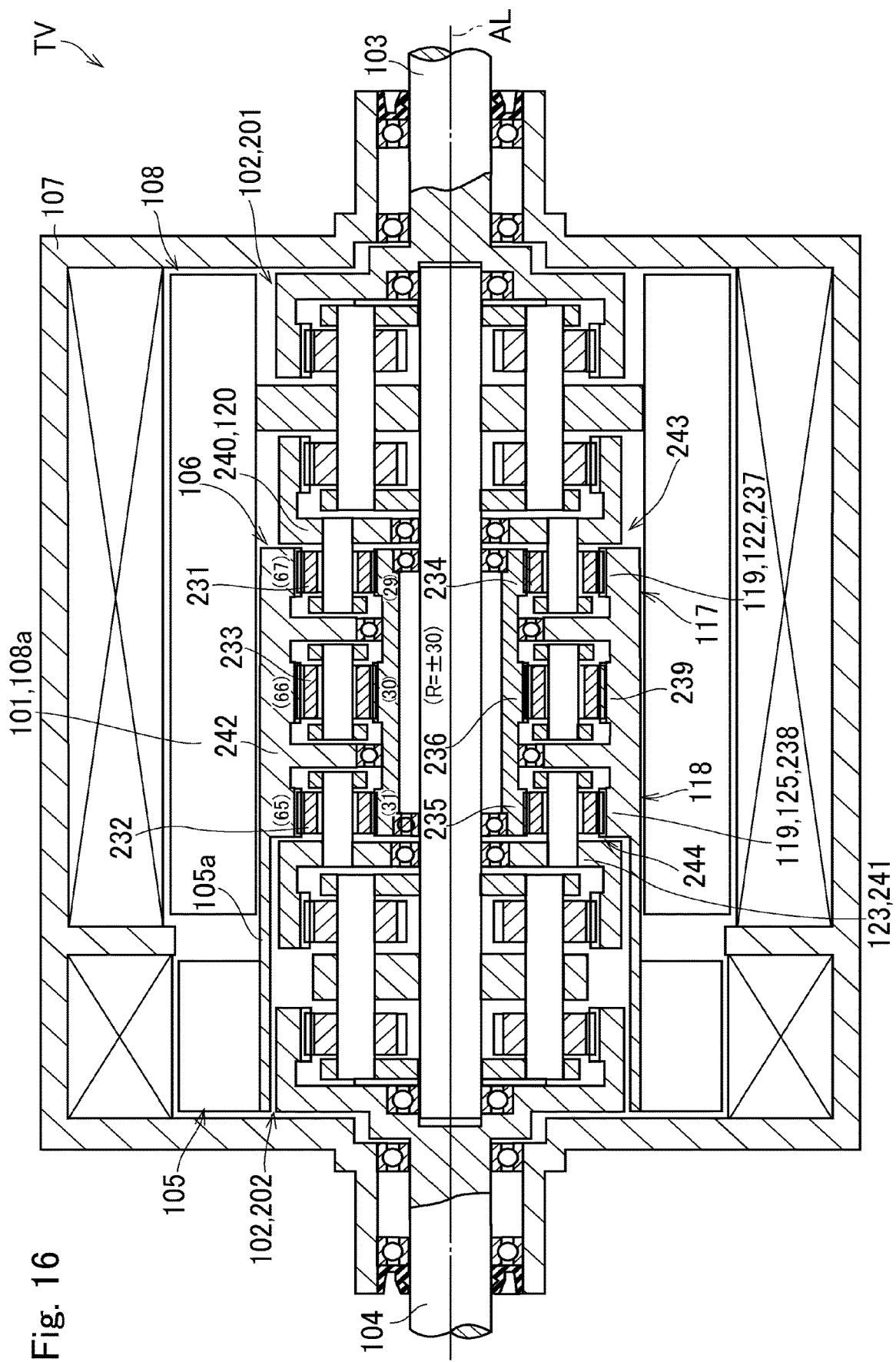
FIG. 16 is a cross-sectional view showing a structure of the torque vectoring device according to the sixteenth example of the present disclosure.

Turning to FIG. 16, there is shown a structure of the torque vectoring device TV according to the sixteenth example. According to the sixteenth example, as the fourteenth and fifteenth examples, the differential mechanism 102 comprises the first power transmission gear set 201, and the second power transmission gear set 202. The first power transmission gear set 201 and the second power transmission gear set 202 are arranged coaxially with each other around the common rotational center axis AL of the first driveshaft 103 and the second driveshaft 104.

The reversing mechanism 106 comprises: a set of first planetary gears 231, a set of second planetary gears 232, and a set of third planetary gears 233; a first sun gear 234, a second sun gear 235, and a third sun gear 236; a first ring gear 237, a second ring gear 238, and a third ring gear 239; and a first carrier 240, a second carrier 241, and a third carrier 242. The reversing mechanism 106 is held in the hollow space of the output shaft 108a.

The first planetary gears 231, the second planetary gears 232, and the third planetary gears 233 are arranged coaxially with one another while being allowed to rotate relatively to one another.

The first sun gear 234, the second sun gear 235, and the third sun gear 236, are arranged coaxially with one another. Specifically, the first sun gear 234, the second sun gear 235, and the third sun gear 236 are joined to one another to rotate integrally. The first planetary gears 231 engage with the first sun gear 234, the second planetary gears 232 engage with the second sun gear 235, and the third planetary gears 233 engage with the third sun gear 236.

The first ring gear 237, the second ring gear 238, and the third ring gear 239 are arranged coaxially with one another. Specifically, the first ring gear 237, the second ring gear 238, and the third ring gear 239 are joined to one another to rotate integrally. The first planetary gears 231 also engage with the first ring gear 237, the second planetary gears 232 also engage with the second ring gear 238, and the third planetary gears 233 also engage with the third ring gear 239.

The first carrier 240, the second carrier 241, and the third carrier 242 are arranged coaxially with one another while being allowed to rotate relatively to one another. Specifically, the first carrier 240 supports the first planetary gears 231 in a rotatable and revolvable manner, the second carrier 241 supports the second planetary gears 232 in a rotatable and revolvable manner, and the third carrier 242 supports the third planetary gears 233 in a rotatable and revolvable manner.

The first ring gear 237, the second ring gear 238, and the third ring gear 239 are joined to the output shaft 105a of the actuator 105. The first carrier 240 of the reversing mechanism 106 is connected to the second ring gear 201b of the first power transmission gear set 201 serving as the first differential reaction element 113 of the differential mechanism 102. On the other hand, the second carrier 241 of the reversing mechanism 106 is connected to the second ring gear 202b of the second power transmission gear set 202 serving as the second differential reaction element 115 of the differential mechanism 102.

Accordingly, in the first control gear set 117, the first ring gear 237 serves not only as the control input element 119 but also as the first gear 122, and the first carrier 240 serves as the first control output element 120. On the other hand, in the second control gear set 118, the second ring gear 238 serves not only as the control input element 119 but also as the second gear 125, and the second carrier 241 serves as the second control output element 123.

In the torque vectoring device TV according to the sixteenth example, a first gear train 243 includes the set of the first planetary gears 231, the first gear 122 (i.e., the first ring gear 237), and the first sun gear 234. On the other hand, a second gear train 244 includes the set of the second planetary gears 232, the second gear 125 (i.e., the second ring gear 238), and the second sun gear 235. A gear ratio of the first gear train 243 and a gear ratio of the second gear train 244 are different from each other. Specifically, a gear ratio between the first ring gear 237 and the first sun gear 234 through the first planetary gears 231 in the first gear train 243 is different from a gear ratio between the second ring gear 238 and the second sun gear 235 through the second planetary gears 232 in the second gear train 244.

More specifically, a number of teeth of each of the first planetary gears 231, a number of teeth of each of the second planetary gears 232, and a number of teeth of each of the third planetary gears 233 are identical to one another. A number of teeth of the first sun gear 234 is smaller than a number of teeth of the third sun gear 236, but a number of teeth of the second sun gear 235 is larger than the number of teeth of the third sun gear 236. A number of teeth of the first ring gear 237 is larger than a number of teeth of the third ring gear 239, but a number of teeth of the second ring gear 238 is smaller than the number of teeth of the third ring gear 239.

According to the sixteenth example shown in FIG. 16, specifically, the number of teeth of the first sun gear 234 is set to 29, the number of teeth of the second sun gear 235 is set to 31, and the number of teeth of the third sun gear 236 is set to 30. On the other hand, the number of teeth of the first ring gear 237 is set to 67, the number of teeth of the second ring gear 238 is set to 65, and the number of teeth of the third ring gear 239 is set to 66. According to the sixteenth example, therefore, the speed reducing ratio R of the torque vectoring device TV is ±30. As described, in general, a speed reducing ratio achieved by the conventional planetary gear sets falls within the range of approximately 4 to 10. Thus, according to the sixteenth example, the speed reducing ratio R is also greater than those of the conventional planetary gear sets.

As described, according to the sixteenth example, the first carrier 240 of the reversing mechanism 106 serving as the first control output element 120 is connected to the second ring gear 201b of the differential mechanism 102 serving as the first differential reaction element 113. On the other hand, the second carrier 241 of the reversing mechanism 106 serving as the second control output element 123 is connected to the second ring gear 202b of the differential mechanism 102 serving as the second differential reaction element 115. That is, according to the sixteenth example, the sun gears are also omitted in the differential mechanism 102. Therefore, the torque vectoring device TV may be downsized in the redial direction.

Here, it is to be noted that: an arrangement of the set of the first planetary gears 231, the set of the second planetary gears 232, and the set of the third planetary gears 233; an arrangement of the first sun gear 234, the second sun gear 235, and the third sun gear 236; an arrangement of the first ring gear 237, the second ring gear 238, and the third ring gear 239; and an arrangement of the first carrier 240, the second carrier 241, and the third carrier 242 should not be limited to those shown in FIG. 16. For example, positions of the set of the first planetary gears 231, the first sun gear 234, the first ring gear 237, and the first carrier 240 may be switched with positions of the set of the second planetary gears 232, the second sun gear 235, the second ring gear 238, and the second carrier 241.

Seventeenth Example

Figure 17:
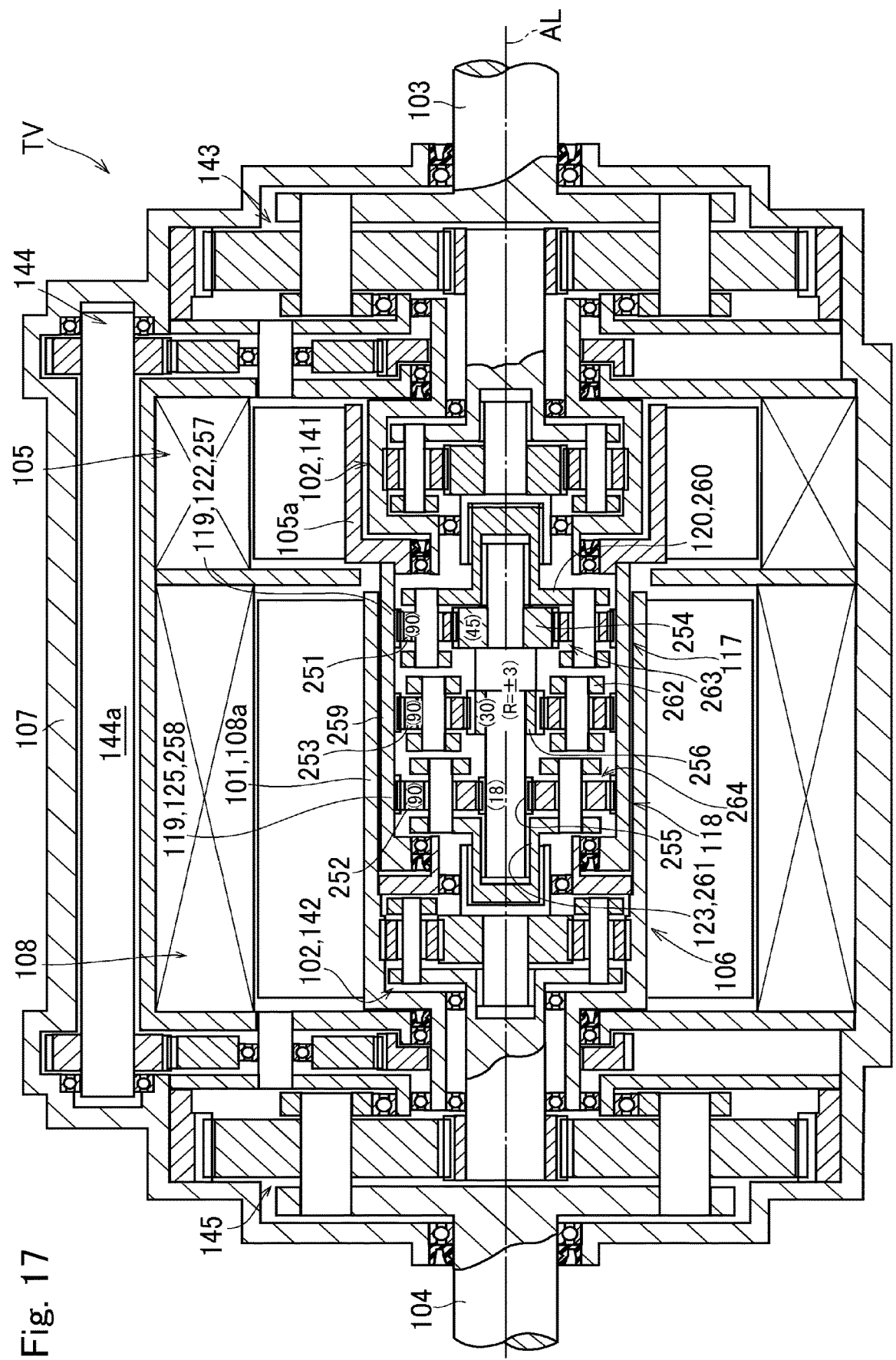
FIG. 17 is a cross-sectional view showing a structure of the torque vectoring device according to the seventeenth example of the present disclosure.

Turning to FIG. 17, there is shown a structure of the torque vectoring device TV according to the seventeenth example. According to the seventeenth example, as the eleventh example, the differential mechanism 102 comprises the first power transmission gear set 141, and the second power transmission gear set 142. The first power transmission gear set 141 and the second power transmission gear set 142 are arranged coaxially with each other around the common rotational center axis AL of the first driveshaft 103 and the second driveshaft 104. According to the seventeenth example, the torque vectoring device TV also comprises the first speed reducing mechanism 143, the second speed reducing mechanism 145, and the connection mechanism 144.

The reversing mechanism 106 comprises: a set of first planetary gears 251, a set of second planetary gears 252, and a set of third planetary gears 253; a first sun gear 254, a second sun gear 255, and a third sun gear 256; a first ring gear 257, a second ring gear 258, and a third ring gear 259; and a first carrier 260, a second carrier 261, and a third carrier 262. The reversing mechanism 106 is held in the hollow space of the output shaft 108a.

The first planetary gears 251, the second planetary gears 252, and the third planetary gears 253 are arranged coaxially with one another while being allowed to rotate relatively to one another.

The first sun gear 254, the second sun gear 255, and the third sun gear 256 are arranged coaxially with one another to rotate integrally. The first planetary gears 251 engage with the first sun gear 254, the second planetary gears 252 engage with the second sun gear 255, and the third planetary gears 253 engage with the third sun gear 256.

The first ring gear 257, the second ring gear 258, and the third ring gear 259 are arranged coaxially with one another. Specifically, the first ring gear 257, the second ring gear 258, and the third ring gear 259 are joined to one another to rotate integrally. The first planetary gears 251 also engage with the first ring gear 257, the second planetary gears 252 also engage with the second ring gear 258, and the third planetary gears 253 also engage with the third ring gear 259.

The first carrier 260, the second carrier 261, and the third carrier 262 are arranged coaxially with one another while being allowed to rotate relatively to one another. Specifically, the first carrier 260 supports the first planetary gears 251 in a rotatable and revolvable manner, the second carrier 261 supports the second planetary gears 252 in a rotatable and revolvable manner, and the third carrier 262 supports the third planetary gears 253 in a rotatable and revolvable manner.

The first ring gear 257, the second ring gear 258, and the third ring gear 259 are connected to the output shaft 105a of the actuator 105. The first carrier 260 is connected to the second sun gear 109b serving as the first differential reaction element 113 of the differential mechanism 102. On the other hand, the second carrier 261 is connected to the second sun gear 110b serving as the second differential reaction element 115 of the differential mechanism 102.

Accordingly, in the first control gear set 117, the first ring gear 257 serves not only as the control input element 119 but also as the first gear 122, and the first carrier 260 serves as the first control output element 120. On the other hand, in the second control gear set 118, the second ring gear 258 serves not only as the control input element 119 but also as the second gear 125, and the second carrier 261 serves as the second control output element 123.

In the torque vectoring device TV according to the seventeenth example, a first gear train 263 includes the set of the first planetary gears 251, and the first gear 122 (i.e., the first ring gear 257). On the other hand, a second gear train 264 includes the set of the second planetary gears 252, and the second gear 125 (i.e., the second ring gear 258). A gear ratio of the first gear train 263 and a gear ratio of the second gear train 264 are different from each other. Specifically, a gear ratio between the first ring gear 257 and the first sun gear 254 through the first planetary gears 251 in the first gear train 263 is different from a gear ratio between the second ring gear 258 and the second sun gear 255 through the second planetary gears 252 in the second gear train 264.

More specifically, a number of teeth of the first ring gear 257, a number of teeth of the second ring gear 258, and a number of teeth of the third ring gear 259 are identical to one another. A number of teeth of the first planetary gear 251 is smaller than a number of teeth of the third planetary gear 253, but a number of teeth of the second planetary gear 252 is larger than the number of teeth of the third planetary gear 253. A number of teeth of the first sun gear 254 is larger than a number of teeth of the third sun gear 256, but a number of teeth of the second sun gear 255 is larger than the number of teeth of the third sun gear 256.

According to the seventeenth example shown in FIG. 17, specifically, the number of teeth of the first ring gear 257 is set to 90, the number of teeth of the second ring gear 258 is set to 90, and the number of teeth of the third ring gear 259 is set to 90. On the other hand, the number of teeth of the first sun gear 254 is set to 45, the number of teeth of the second sun gear 255 is set to 30, and the number of teeth of the third sun gear 256 is set to 18. According to the seventeenth example, therefore, the speed reducing ratio R of the torque vectoring device TV is ±3. Thus, the speed reducing ratio R of the torque vectoring device TV according to the seventeenth example is smaller than that achieved by the tenth example. However, according to the seventeenth example, a load applied to the reversing mechanism 106 can be reduced. For this reason, the reversing mechanism 106 can be downsized thereby reducing the size of the torque vectoring device TV.

Here, it is to be noted that: an arrangement of the set of the first planetary gears 251, the set of the second planetary gears 252, and the set of the third planetary gears 253; an arrangement of the first sun gear 254, the second sun gear 255, and the third sun gear 256; an arrangement of the first ring gear 257, the second ring gear 258, and the third ring gear 259; and an arrangement of the first carrier 260, the second carrier 261, and the third carrier 262 should not be limited to those shown in FIG. 17. For example, positions of the set of the first planetary gears 251, the first sun gear 254, the first ring gear 257, and the first carrier 260 may be switched with positions of the set of the second planetary gears 252, the second sun gear 255, the second ring gear 258, and the second carrier 261.

Eighteenth Example

Figure 18:
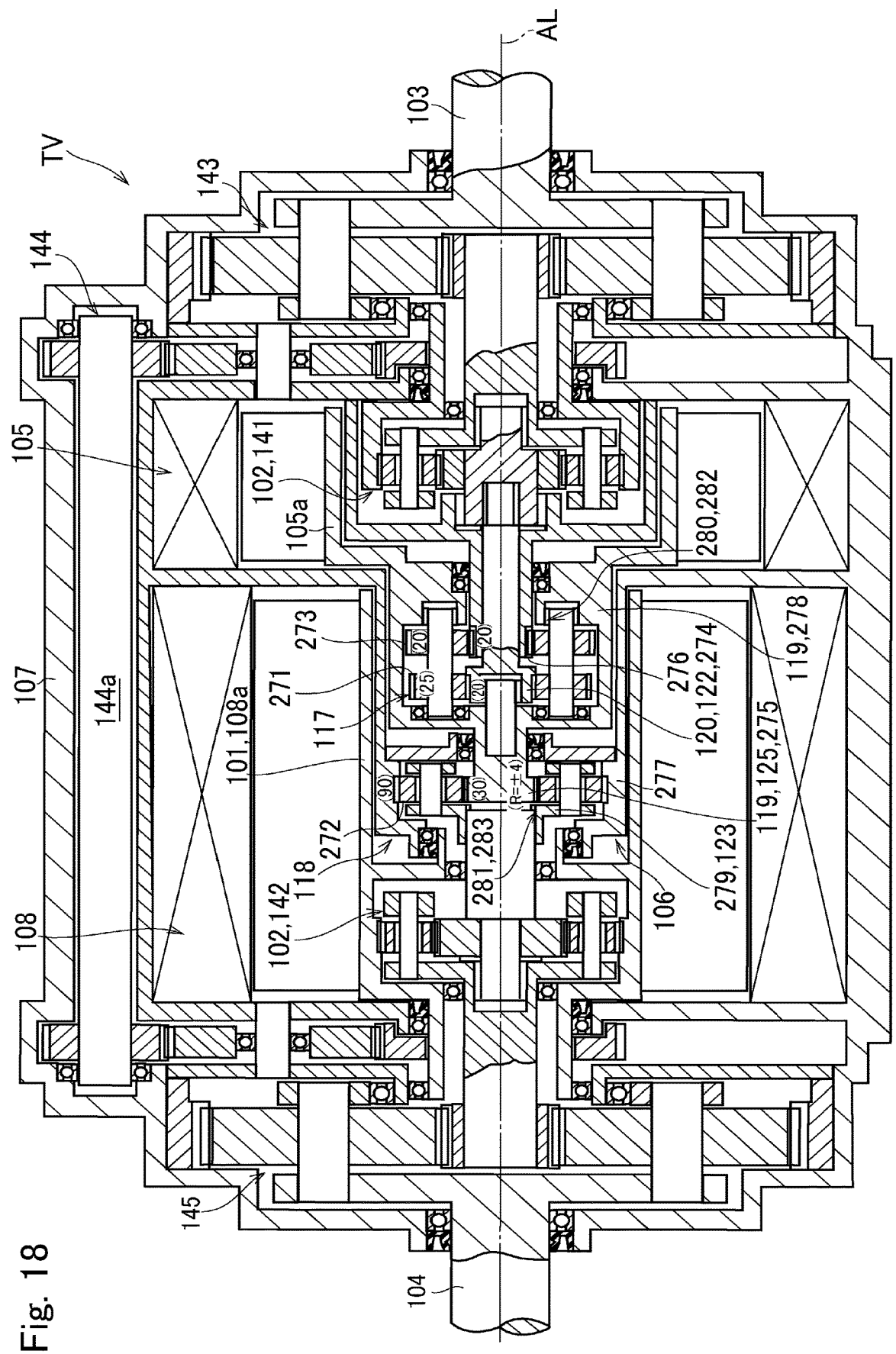
FIG. 18 is a cross-sectional view showing a structure of the torque vectoring device according to the eighteenth example of the present disclosure.

Turning to FIG. 18, there is shown a structure of the torque vectoring device TV according to the eighteenth example. According to the eighteenth example, as the eleventh example, the differential mechanism 102 comprises the first power transmission gear set 141, and the second power transmission gear set 142. The first power transmission gear set 141 and the second power transmission gear set 142 are arranged coaxially with each other around the common rotational center axis AL of the first driveshaft 103 and the second driveshaft 104. According to the eighteenth example, the torque vectoring device TV also comprises the first speed reducing mechanism 143, the second speed reducing mechanism 145, and the connection mechanism 144.

The reversing mechanism 106 comprises: a set of first planetary gears 271, a set of second planetary gears 272, and a set of third planetary gears 273; a first sun gear 274, a second sun gear 275, and a third sun gear 276; a ring gear 277; and a first carrier 278, and a second carrier 279. The reversing mechanism 106 is held in the hollow space of the output shaft 108a.

The first planetary gears 271, the second planetary gears 272, and the third planetary gears 273 are arranged coaxially with one another. Specifically, the first planetary gears 271 and the third planetary gears 273 rotates integrally, but relatively to the second planetary gears 272.

The first sun gear 274, the second sun gear 275, and the third sun gear 276 are arranged coaxially with one another. Specifically, the first sun gear 274 is allowed to rotate relatively with the third sun gear 276, and the second sun gear 275 is also allowed to rotate relatively with the third sun gear 276. The first planetary gears 271 engage with the first sun gear 274, the second planetary gears 272 engage with the second sun gear 275, and the third planetary gears 273 engage with the third sun gear 276. According to the eighteenth example, in order to halt the third sun gear 276, the third sun gear 276 is fixed to the case 7.

The second planetary gears 272 also engage with the second ring gear 277. According to the eighteenth example, in order to halt the second ring gear 277, the second ring gear 277 is also fixed to the case 7.

The first carrier 278 and the second carrier 279 are arranged coaxially with each other while being allowed to rotate relatively to each other. Specifically, the first carrier 278 connected to the second sun gear 275 supports the first planetary gears 271 and the third planetary gears 273 in a rotatable and revolvable manner, and the second carrier 279 supports the second planetary gears 272 in a rotatable and revolvable manner.

The first carrier 278 is connected to the output shaft 105a of the actuator 105. The first sun gear 274 is connected to the second sun gear 109b serving as the first differential reaction element 113 of the differential mechanism 102. On the other hand, the second carrier 279 is connected to the second sun gear 110b serving as the second differential reaction element 115 of the differential mechanism 102.

Accordingly, in the first control gear set 117, the first carrier 278 serves as the control input element 119, and the first sun gear 274 serves not only as the first control output element 120 but also as the first gear 122. On the other hand, in the second control gear set 118, the second sun gear 275 serves not only as the control input element 119 but also as the second gear 125, and the second carrier 279 serves as the second control output element 123.

In the torque vectoring device TV according to the eighteenth example, a first gear train 280 includes the set of the first planetary gears 271, and the first gear 122 (i.e., the first sun gear 274). On the other hand, a second gear train 281 includes the set of the second planetary gears 272, and the second gear 125 (i.e., the second sun gear 275). A gear ratio of the first gear train 280 and a gear ratio of the second gear train 281 are different from each other. Specifically, a gear ratio between each of the first planetary gears 271 and the first sun gear 274 in the first gear train 280 is different from a gear ratio between the ring gear 277 and the second sun gear 275 through the second planetary gears 272 in the second gear train 281. Specifically, the control torque of the actuator 105 is transmitted to the first differential reaction element 113 of the differential mechanism 102 through a gear train 282 including the first carrier 278, the set of the first planetary gears 271, and the first sun gear 274, and to the second differential reaction element 115 of the differential mechanism 102 through a gear train 283 including the first carrier 278, the second sun gear 275, the set of the second planetary gears 272, and the second carrier 279. That is, in the torque vectoring device TV according to the eighteenth example, a gear ratio of the gear train 282 and a gear ratio of the gear train 283 are different from each other.

According to the eighteenth example shown in FIG. 18, specifically, a number of teeth of the first ring gear 274 is set to 20, a number of teeth of each of the first planetary gears 271 is set to 25, a number of teeth of the second sun gear 275 is set to 30, a number of teeth of each of the second planetary gears 272 is set to 30, a number of teeth of the ring gear 277 is set to 90, a number of teeth of the third sun gear 276 is set to 20, and a number of teeth of each of the third planetary gears 273 is set to 20. Thus, the gear ratio of the gear train 282 between the first sun gear 274 and the first planetary gear 271, and the gear ratio of the gear train 283 between the second sun gear 275 and the ring gear 277 through the second planetary gears 272 are different from each other. According to the eighteenth example, the speed reducing ratio R of the torque vectoring device TV is ±4. Thus, the speed reducing ratio R of the torque vectoring device TV according to the eighteenth example is also smaller than that achieved e.g., by the tenth example. However, according to the eighteenth example, the load applied to the reversing mechanism 106 may also be reduced. For this reason, the reversing mechanism 106 can be downsized thereby reducing the size of the torque vectoring device TV.

Here, it is to be noted that: an arrangement of the set of the first planetary gears 271, the set of the second planetary gears 272, and the set of the third planetary gears 273; an arrangement of the first sun gear 274, the second sun gear 275, and the third sun gear 276; an arrangement of the ring gear 277; and an arrangement of the first carrier 278, and the second carrier 279 should not be limited to those shown in FIG. 18. For example, positions of the set of the first planetary gears 271, the set of the third planetary gears 273, the first sun gear 274, the third sun gear 276, and the first carrier 278 may be switched with positions of the set of the second planetary gears 272, the second sun gear 275, the ring gear 277, and the second carrier 279.

Nineteenth Example

Figure 19:
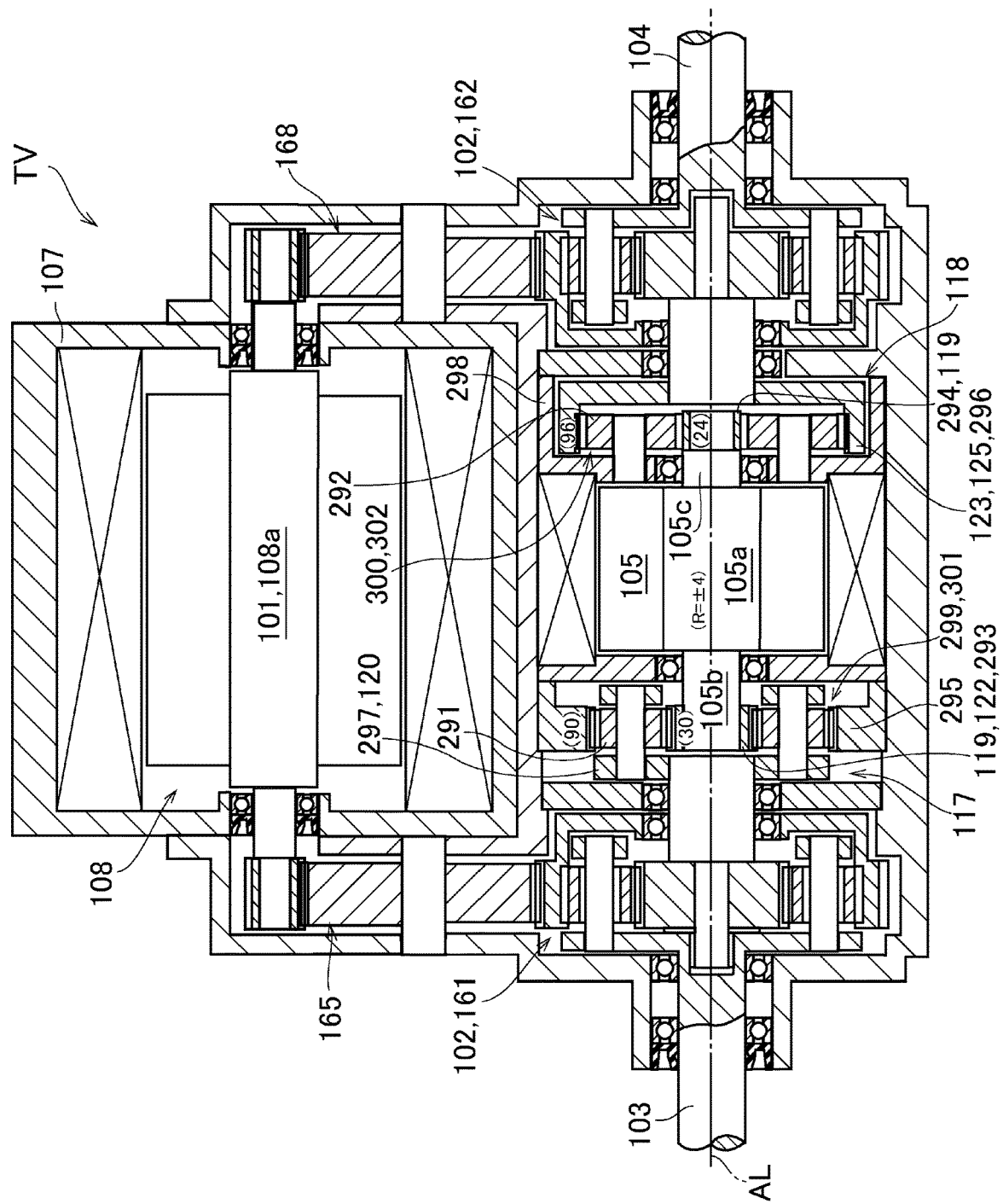
FIG. 19 is a cross-sectional view showing a structure of the torque vectoring device according to the nineteenth example of the present disclosure.

Turning to FIG. 19, there is shown a structure of the torque vectoring device TV according to the nineteenth example. According to the nineteenth example, as the twelfth example, the differential mechanism 102 comprises the first power transmission gear set 161, and the second power transmission gear set 162. The first power transmission gear set 161 and the second power transmission gear set 162 are arranged coaxially with each other around the common rotational center axis AL of the first driveshaft 103 and the second driveshaft 104. The torque vectoring device TV according to the nineteenth example also comprises the gear train 165 and the gear train 168. The output shaft 108a of the motor 108 serving as the prime mover also comprises the first output shaft 108b and the second output shaft 108c extending coaxially from both sides of the motor 108.

According to the nineteenth example, the output shaft 105a of the actuator 105 includes a first rotary shaft 105b and a second rotary shaft 105c extending coaxially. Specifically, the first output shaft 108b protrudes from the left side of the actuator 105 in FIG. 19 toward the first driveshaft 103, and a later-mentioned first sun gear 293 of the reversing mechanism 106 is mounted on the first rotary shaft 105b. On the other hand, the second rotary shaft 105c protrudes from the right side of the actuator 105 in FIG. 19 toward the second driveshaft 104, and a later-mentioned second sun gear 294 of the reversing mechanism 106 is mounted on the second rotary shaft 105c.

The reversing mechanism 106 comprises: a set of first planetary gears 291, and a set of second planetary gears 292; the first sun gear 293, and the second sun gear 173; a first ring gear 295, and a second ring gear 296; and a first carrier 297, and a second carrier 298.

The first planetary gears 251 and the second planetary gears 252 are arranged coaxially with each other, while being allowed to rotate relatively to each other.

The first sun gear 293 and the second sun gear 294 are arranged coaxially with each other while being allowed to rotate relatively with each other. Specifically, the first planetary gears 291 engage with the first sun gear 293, and the second planetary gears 292 engage with the second sun gear 294.

The first ring gear 295 is fixed to the case 7 to be halted, and the second ring gear 296 is arranged coaxially with the first ring gear 295 while being allowed to rotate relatively to the first ring gear 295. The first planetary gears 291 also engage with the first ring gear 295, and the second planetary gears 292 also engage with the second ring gear 296.

The first carrier 297 and the second carrier 298 are arranged coaxially with each other. The second carrier 298 is fixed to the case 7 to be halted, and the first carrier 297 is allowed to rotate relatively to the second carrier 298. Specifically, the first carrier 297 supports the first planetary gears 291 in a rotatable and revolvable manner, and the second carrier 298 supports the second planetary gears 292 in a rotatable and revolvable manner.

The first sun gear 293 is connected to the first rotary shaft 105b of the output shaft 105a of the actuator 105. The first carrier 297 is connected to the sun gear 161a of the first power transmission gear set 161 serving as the first differential reaction element 113 of the differential mechanism 102. On the other hand, the second sun gear 294 is connected to the second rotary shaft 105c of the output shaft 105a of the actuator 105. The second ring gear 296 is connected to the sun gear 162a serving as the second differential reaction element 115 of the differential mechanism 102.

Accordingly, in the first control gear set 117, the first sun gear 293 serves not only as the control input element 119 but also as the first gear 122, and the first carrier 297 serves as the first control output element 120. On the other hand, in the second control gear set 118, the second sun gear 294 serves as the control input element 119, and the second ring gear 296 serves not only as the second control output element 123 but also as the second gear 125.

In the torque vectoring device TV according to the nineteenth example, a first gear train 299 includes the set of the first planetary gears 291, and the first gear 122 (i.e., the first sun gear 293). On the other hand, a second gear train 300 includes the set of the second planetary gears 292, and the second gear 125 (i.e., the second ring gear 296). A gear ratio of the first gear train 299 and a gear ratio of the second gear train 300 are different from each other. Specifically, a gear ratio between each of the first planetary gears 291 and the first ring gear 295 in the first gear train 299 is different from a gear ratio between the second sun gear 294 and the second ring gear 296 through the second planetary gears 292 in the second gear train 300. Specifically, the control torque of the actuator 105 is transmitted to the first differential reaction element 113 of the differential mechanism 102 through a gear train 301 including the first sun gear 293, the set of the first planetary gears 291, and the first carrier 297, and to the second differential reaction element 115 of the differential mechanism 102 through a gear train 302 including the second sun gear 294, the set of the second planetary gears 292, and the second ring gear 296. That is, in the torque vectoring device TV according to the nineteenth example, a gear ratio of the gear train 301 and a gear ratio of the gear train 302 are different from each other.

According to the nineteenth example shown in FIG. 19, specifically, a number of teeth of the first sun gear 293 is set to 30, a number of teeth of the first ring gear 295 is set to 90, a number of teeth of the second sun gear 294 is set to 24, and a number of teeth of the second ring gear 296 is set to 96. Thus, the gear ratio of the gear train 301 and the gear ratio of the gear train 302 are different from each other. According to the nineteenth example, the speed reducing ratio R of the torque vectoring device TV is ±4. Thus, the speed reducing ratio R of the torque vectoring device TV according to the eighteenth example is also smaller than that achieved e.g., by the tenth example. However, according to the nineteenth example, the load applied to the reversing mechanism 106 may also be reduced. For this reason, the reversing mechanism 106 may also be downsized thereby reducing the size of the torque vectoring device TV.

Here, it is to be noted that: an arrangement of the set of the first planetary gears 291, and the set of the second planetary gears 292; an arrangement of the first sun gear 293, and the second sun gear 275; an arrangement of the first ring gear 295, and the second ring gear 296; and an arrangement of the first carrier 297, and the second carrier 298 should not be limited to those shown in FIG. 19. For example, positions of the set of the first planetary gears 291, the first sun gear 293, the first ring gear 295, and the first carrier 297 may be switched with positions of the set of the second planetary gears 292, the second sun gear 294, the second ring gear 296, and the second carrier 298.

Twentieth to Twenty-Second Examples

Figure 20:
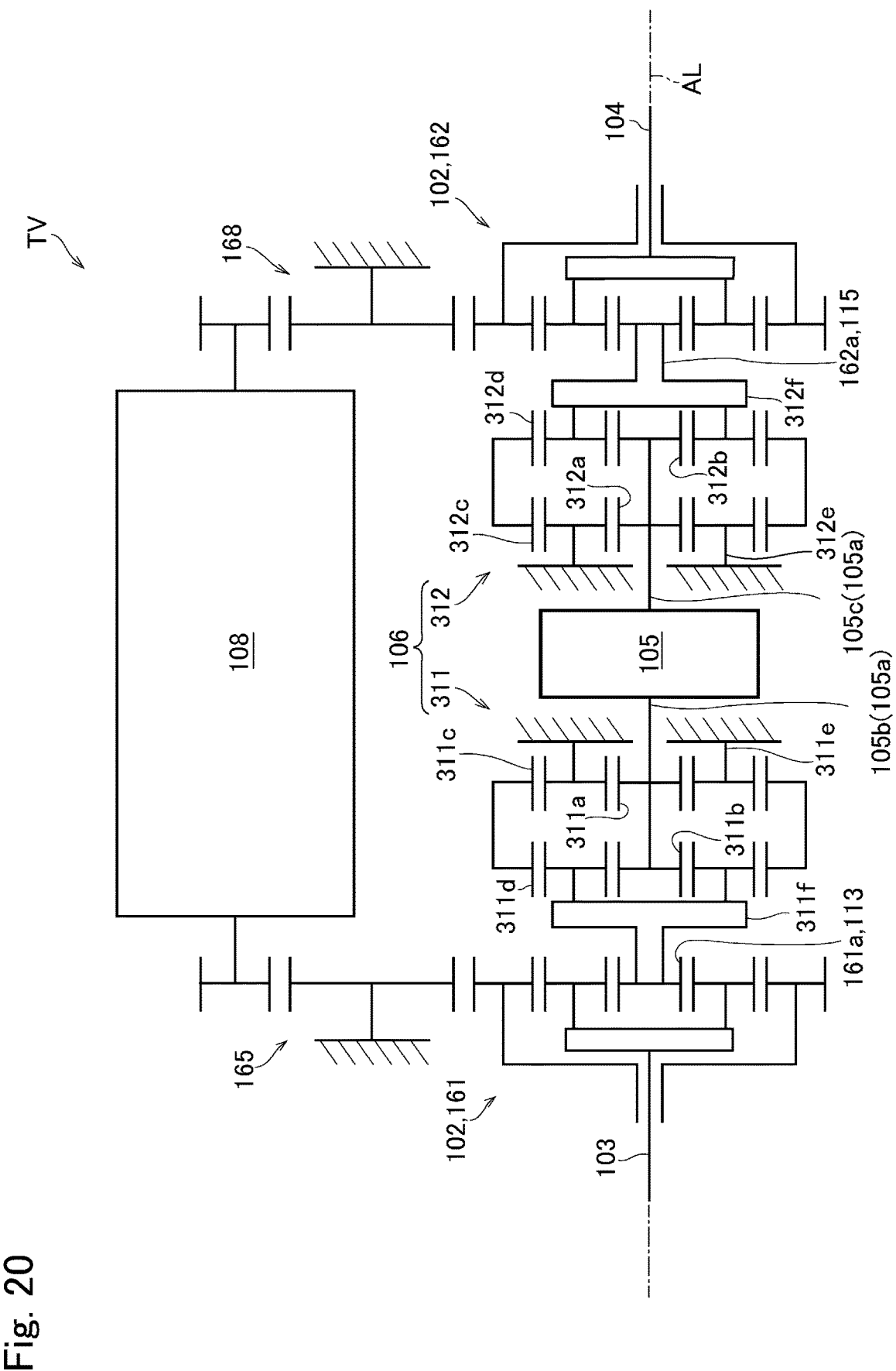
FIG. 20 is a cross-sectional view showing a structure of the torque vectoring device according to the twentieth example of the present disclosure.
Figure 21:
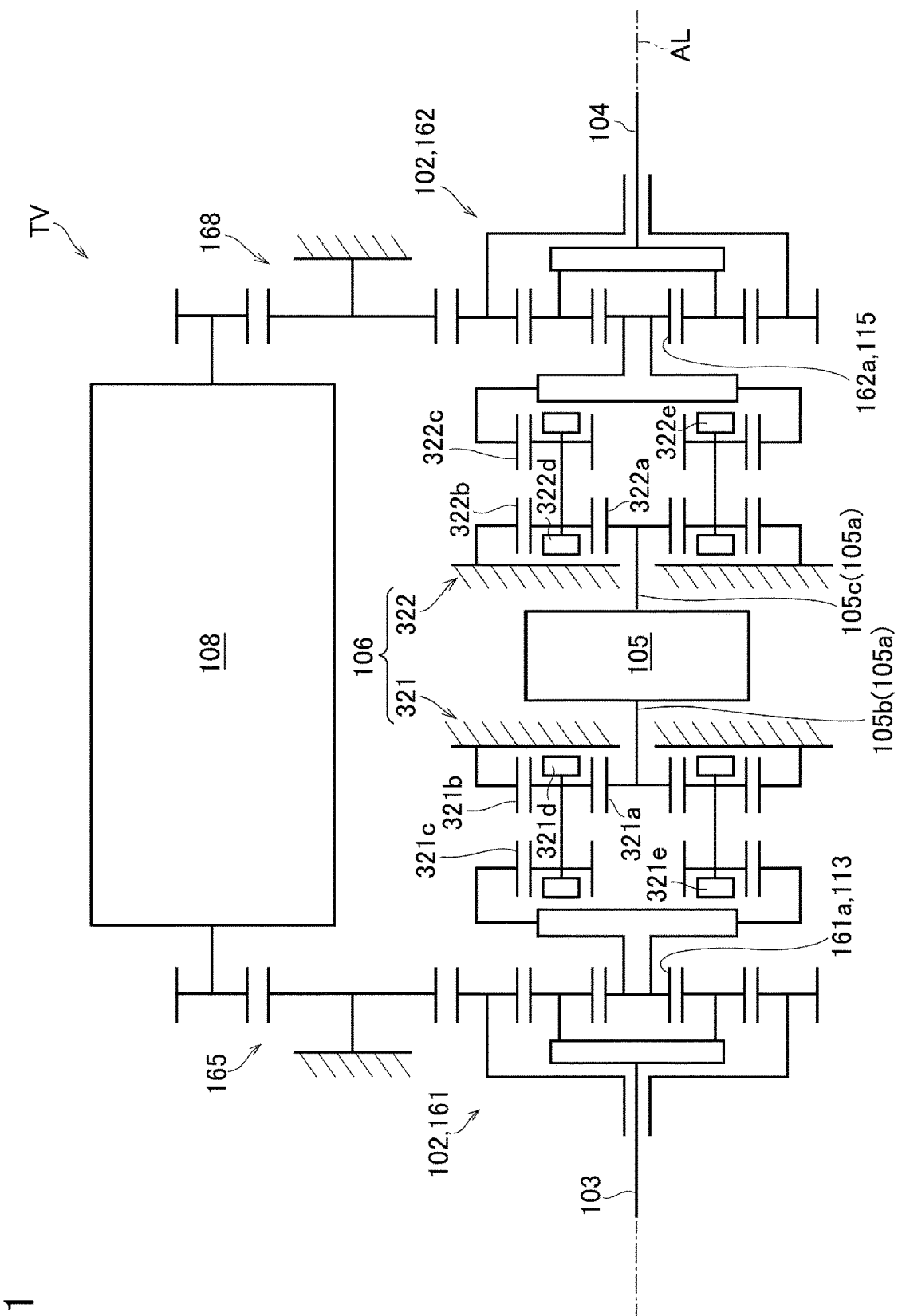
FIG. 21 is a schematic illustration showing a structure of the torque vectoring device according to the twenty-first example of the present disclosure.
Figure 22:
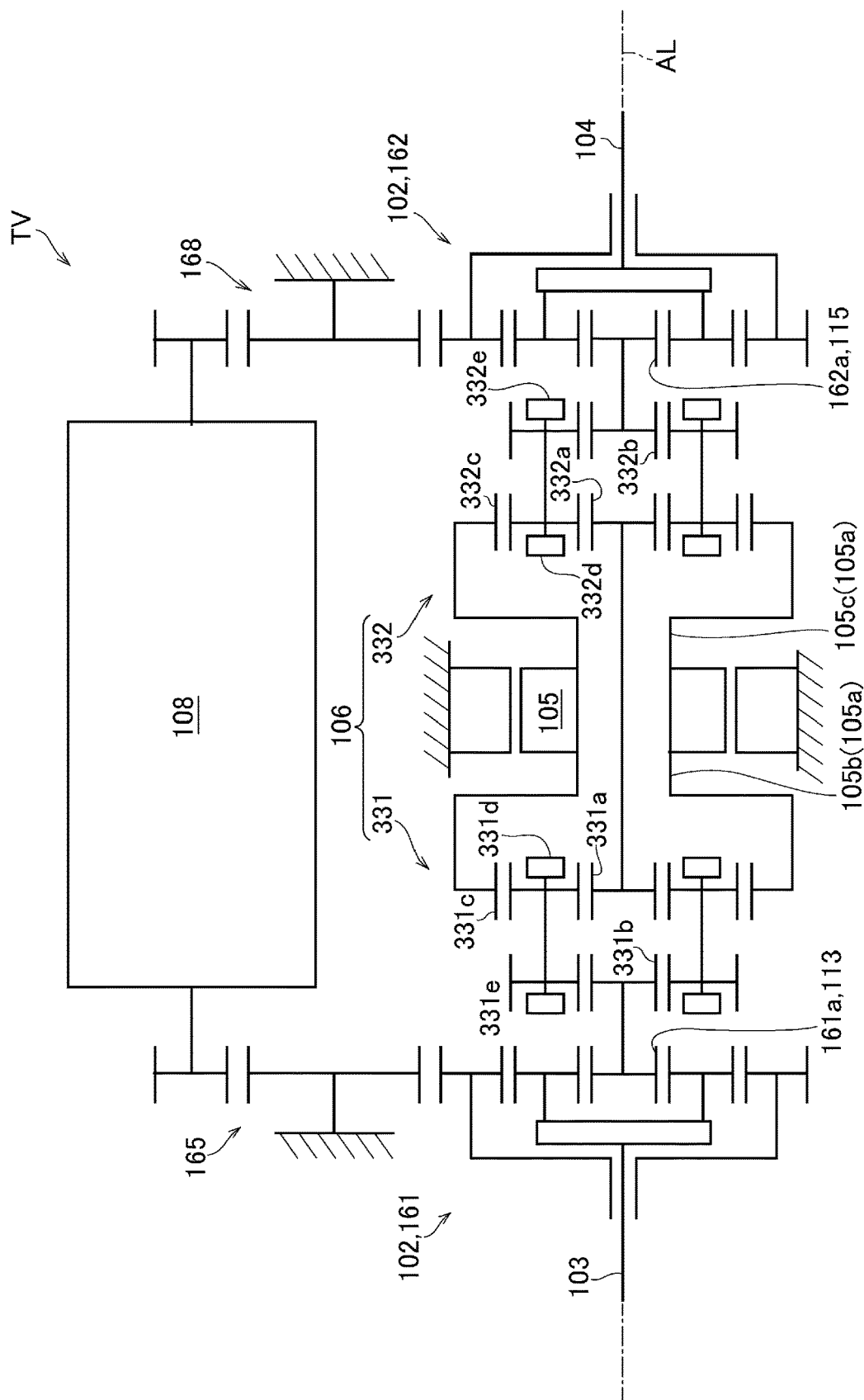
FIG. 22 is a schematic illustration showing a structure of the torque vectoring device according to the twenty-second example of the present disclosure.

The torque vectoring devices TV according to the twentieth to twenty-second examples are shown in FIGS. 20 to 22, respectively. In the torque vectoring device TV shown in any of FIGS. 20 to 22, the reversing mechanism 106 comprises a complex-planetary gear set formed of two sets of planetary gear sets arranged on both sides of the actuator 105.

According to the twentieth example shown in FIG. 20, the reversing mechanism 106 comprises a first control gear set 311, and a second control gear set 312. The first control gear set 311 and the second control gear set 312 are formed coaxially around the common rotational center axis AL of the first driveshaft 103 and the second driveshaft 104.

The first control gear set 311 is a complex planetary gear set formed by combining two sets of planetary gear sets, and the second control gear set 312 is also a complex planetary gear set formed by combining two sets of planetary gear sets.

The first control gear set 311 comprises: a first sun gear 311*a* and a second sun gear 311*b* arranged coaxially with each other to rotate integrally; a first ring gear 311*c* and a second ring gear 311*d* arranged coaxially with each other to rotate integrally; and a first carrier 311*e* that is fixed to be halted, and a second carrier 311*f* that is arranged coaxially with the first carrier 311*e* while being allowed to rotate relatively to the first carrier 311*e*.

The first sun gear 311*a* and the second sun gear 311*b* are connected to the first rotary shaft 105*b* of the output shaft 105*a* of the actuator 105, respectively. The second carrier 311*f* is connected to the sun gear 161*a* of the first power transmission gear set 161 serving as the first differential reaction element 113 of the differential mechanism 102.

The second control gear set 312 comprises: a first sun gear 312*a* and a second sun gear 312*b* arranged coaxially with each other to rotate integrally; a first ring gear 312*c* and a second ring gear 312*d* arranged coaxially with each other to rotate integrally; and a first carrier 312*e* that is fixed to be halted, and a second carrier 312*f* that is arranged coaxially with the first carrier 312*e* while being allowed to rotate relatively to the first carrier 312*e*.

The first sun gear 312*a* and the second sun gear 312*b* are connected to the second rotary shaft 105*c* of the output shaft 105*a* of the actuator 105, respectively. The second ring gear 312*d* is connected to the sun gear 162*a* of the second power transmission gear set 162 serving as the second differential reaction element 115 of the differential mechanism 102.

According to the twenty-first example shown in FIG. 21, the reversing mechanism 106 comprises a first control gear set 321, and a second control gear set 322. The first control gear set 321 and the second control gear set 322 are formed coaxially around the common rotational center axis AL of the first driveshaft 103 and the second driveshaft 104.

The first control gear set 321 is a complex planetary gear set formed by combining two sets of planetary gear sets, and the second control gear set 322 is also a complex planetary gear set formed by combining two sets of planetary gear sets.

The first control gear set 321 comprises: a sun gear 321*a*; a first ring gear 321*b* that is fixed to be halted, and a second ring gear 321*c* arranged coaxially with the first ring gear 321*b* while being allowed to rotate relatively to the first ring gear 321*b*; and a first carrier 321*d* and a second carrier 321*e* arranged coaxially with each other while being allowed to rotate relatively to each other.

The sun gear 321*a* is connected to the first rotary shaft 105*b* of the output shaft 105*a* of the actuator 105. The second ring gear 321*c* is connected to the sun gear 161*a* of the first power transmission gear set 161 serving as the first differential reaction element 113 of the differential mechanism 102.

The second control gear set 322 comprises: a sun gear 321*a*; a first ring gear 322*b* that is fixed to be halted, and a second ring gear 322*c* arranged coaxially with the first ring gear 322*b* while being allowed to rotate relatively to the first ring gear 322*b*; and a first carrier 322*d* and a second carrier 322*e* arranged coaxially with each other while being allowed to rotate relatively to each other.

The sun gear 322*a* is connected to the second rotary shaft 105*c* of the output shaft 105*a* of the actuator 105. The second ring gear 322*c* is connected to the sun gear 161*a* of the first power transmission gear set 161 serving as the first differential reaction element 113 of the differential mechanism 102.

According to the twenty-second example shown in FIG. 22, the reversing mechanism 106 comprises a first control gear set 331, and a second control gear set 332. The first control gear set 331 and the second control gear set 332 are formed coaxially around the common rotational center axis AL of the first driveshaft 103 and the second driveshaft 104.

The first control gear set 331 is a complex planetary gear set formed by combining two sets of planetary gear sets, and the second control gear set 332 is also a complex planetary gear set formed by combining two sets of planetary gear sets.

The first control gear set 331 comprises: a first sun gear 331*a* and a second sun gear 331*b* arranged coaxially with each other while being allowed to rotate relatively to each other; a ring gear 331*c*; and a first carrier 331*d* and a second carrier 331*e* arranged coaxially with each other while being allowed to rotate relatively to each other.

The ring gear 331*c* is connected to the first rotary shaft 105*b* of the output shaft 105*a* of the actuator 105. The second sun gear 331*b* is connected to the sun gear 161*a* of the first power transmission gear set 161 serving as the first differential reaction element 113 of the differential mechanism 102.

The second control gear set 332 comprises: a first sun gear 332a and a second sun gear 332b arranged coaxially with each other while being allowed to rotate relatively to each other; a ring gear 332c; and a first carrier 332d and a second carrier 332e arranged coaxially with each other while being allowed to rotate relatively to each other. The first sun gear 332a of the first control gear set 331 and the first sun gear 332a of the second control gear set 332 are connected to each other to rotate integrally.

The ring gear 332c is connected to the second rotary shaft 105c of the output shaft 105a of the actuator 105. The second sun gear 332c is connected to the sun gear 161a of the first power transmission gear set 161 serving as the first differential reaction element 113 of the differential mechanism 102.

In the torque vectoring device TV shown in any of FIGS. 10 to 22, the input member 101 is connected to the power input element 111, the first power output element 112 is connected to the first driveshaft 103, the second power output element 114 is connected to the second driveshaft 104, and the first differential reaction element 113 and the second differential reaction element 115 are connected to the actuator 105 through the reversing mechanism 106. In the reversing mechanism 106 of the torque vectoring device TV shown in any of FIGS. 10 to 22, the actuator 105 is connected to the control input element 119, the first gear 122 serves as the control input element 119 or the first control output element 120, and the second gear 125 serves as the control input element 119 or the second control output element 123. According to any of the tenth to twenty-second examples, the reversing mechanism 106 transmits the control torque applied to the control input element 119 to the first differential reaction element 113 and the second differential reaction element 115 while multiplying the control torque.

Thus, according to the tenth to twenty-second examples, the control torque generated by the actuator 105 is multiplied by the reversing mechanism 106, and delivered to the first differential reaction element 113 and the second differential reaction element 115 of the differential mechanism 102. Therefore, the actuator 105 may be downsized thereby reducing the size of the torque vectoring device TV. For this reason, the torque vectoring device TV may be mounted easily on a vehicle.

In the torque vectoring device TV shown in any of FIG. 10, FIGS. 12 to 16, and FIGS. 19 to 22, the differential mechanism 102 serves as the speed reducing gear set in which the first control gear set 117 (or 311, 321, 331) and the second control gear set 118 (or 312, 322, 332) multiply the control torque. On the other hand, the reversing mechanism 106 transmits the control torque multiplied by the first control gear set 117 (or 311, 321, 331) to the first differential reaction element 113, and transmits the control torque multiplied by the second control gear set 118 (or 312, 322, 332) to the second differential reaction element 115. That is, a relatively large speed reducing ratio may be achieved by the reversing mechanism 106. Therefore, the actuator 105 may be downsized thereby reducing the size of the torque vectoring device TV.

According to any of the eleventh, seventeenth, and eighteenth examples, the torque vectoring device TV further comprises the first speed reducing mechanism 143 that multiplies the torque delivered to the first driveshaft 103, and the second speed reducing mechanism 145 that multiplies the torque delivered to the second driveshaft 103. In the differential mechanism 102 of the torque vectoring device TV shown in any of FIGS. 11, 17, and 18, the first power output element 112 is connected to the first driveshaft 104 through the first speed reducing mechanism 143, and the second power output element 114 is connected to the second driveshaft 104 through the second speed reducing mechanism 145. The reversing mechanism 106 is disposed between the first speed reducing mechanism 143 and the second speed reducing mechanism 145 in the direction along the rotational center axis AL. In the differential mechanism 102 of the torque vectoring device TV shown in any of FIGS. 11, 17, and 18, therefore, the speed reducing ratio of the reversing mechanism 106 is relatively small, but the load applied to the reversing mechanism 106 may be reduced. Therefore, the actuator 105 may be downsized thereby reducing the size of the torque vectoring device TV.

What is claimed is:

1. A torque vectoring device, comprising:
an input member to which a torque is delivered from a prime mover;
a first driveshaft and a second driveshaft extending coaxially while being allowed to rotate relatively to each other;
a differential mechanism that distributes the torque delivered to the input member to the first driveshaft and the second driveshaft, and that allows the first driveshaft and the second driveshaft to rotate at different speeds;
an actuator that applies a control torque to the differential mechanism to rotate the first driveshaft and the second driveshaft at different speeds; and
a reversing mechanism that allows the first driveshaft and the second driveshaft to rotate in opposite directions when the first driveshaft and the second driveshaft rotate at different speeds,
wherein the differential mechanism comprises a first power transmission gear set and a second power transmission gear set arranged coaxially while being opposed to each other,
the first power transmission gear set comprises:
a power input element to which the torque is delivered from the input member;
a first power output element which delivers the torque to the first driveshaft; and
a first differential reaction element to which the control torque is applied as a reaction force against the torque delivered from the power input element to the first power output element,
the second power transmission gear set comprises:
the power input element;
a second power output element which delivers the torque to the second driveshaft; and
a second differential reaction element to which the control torque is applied as a reaction force against the torque delivered from the power input element to the second power output element,
the reversing mechanism comprises:
a first control gear set that is arranged coaxially around the first driveshaft and the second driveshaft to transmit the control torque to the first driveshaft through the first differential reaction element; and a second control gear set that is arranged coaxially around the first driveshaft and the second driveshaft to transmit the control torque to the second driveshaft through the second differential reaction element, the first control gear set comprises:
- a control input element to which the control torque of the actuator is applied;
- a first control output element which delivers the control torque to the first driveshaft;
- a first planetary gear to which the control torque is delivered from the control input element; and
- a first gear that engages with the first planetary gear to serve as the control input element or the first control output element, the second control gear set comprises:
- the control input element;
- a second control output element which delivers the control torque to the second driveshaft;
- a second planetary gear which is arranged coaxially with the first planetary gear, and to which the control torque is delivered from the control input element; and
- a second gear that engages with the second planetary gear to serve as the control input element or the second control output element, a first gear train includes the first planetary gear and the first gear, a second gear train includes the second planetary gear and the second gear, and a gear ratio of the first gear train and a gear ratio of the second gear train are different from each other.

2. The torque vectoring device according to claim 1, wherein a first speed reducing ratio of the reversing mechanism as a ratio of a speed of the first control output element to a speed of the control input element is greater than 1, a second speed reducing ratio of the reversing mechanism as a ratio of a speed of the second control output element to the speed of the control input element is greater than 1, and the reversing mechanism serves as a speed reducing gear set to transmit the control torque to the first control output element and the second control output element while multiplying the control torque.

3. The torque vectoring device according to claim 1, wherein in the differential mechanism,
- the power input element is connected to the input member,
- the first power output element is connected to the first driveshaft, and
- the second power output element is connected to the second driveshaft, and in the reversing mechanism,
- the control input element is connected to the actuator,
- the first gear serves as the first control output element, and
- the second gear serves as the second control output element, and the reversing mechanism transmits the control torque applied to the control input element to the first driveshaft and the second driveshaft while multiplying the control torque.

4. The torque vectoring device according to claim 3, wherein the reversing mechanism is rotated passively together with the power input element, the first power output element, and the second power output element, when the first driveshaft and the second driveshaft rotate in a same direction at a same speed.

5. The torque vectoring device according to claim 3, further comprising:
- a third planetary gear arranged coaxially with the first planetary gear and the second planetary gear; and
- a carrier that supports the first planetary gear, the second planetary gear, and the third planetary gear in a rotatable and revolvable manner,
- wherein the first planetary gear, the second planetary gear, and the third planetary gear rotate integrally, and
- the torque is delivered from the power input element to the third planetary gear.

6. The torque vectoring device according to claim 3, further comprising:
- a third planetary gear and a fourth planetary gear arranged coaxially with the first planetary gear and the second planetary gear; and
- a carrier that supports the first planetary gear, the second planetary gear, the third planetary gear, and the fourth planetary gear in a rotatable and revolvable manner,
- wherein the first planetary gear and the third planetary gear are formed integrally to rotate integrally,
- the second planetary gear and the fourth planetary gear formed integrally to rotate integrally,
- a unit of the first planetary gear and the third planetary gear and a unit of the second planetary gear and the fourth planetary gear are allowed to rotate relatively to each other, and
- the torque is delivered to the third planetary gear and the fourth planetary gear from the power input element.

7. The torque vectoring device according to claim 5, wherein the differential mechanism comprises:
- the first planetary gear, the second planetary gear, and the third planetary gear;
- a first sun gear, a second sun gear, and a third sun gear arranged coaxially with one another while engaging with the first planetary gear, the second planetary gear, and the third planetary gear, respectively; and
- the carrier, the first sun gear, the second sun gear, and the third sun gear are allowed to rotate relatively to one another, the first power transmission gear set comprises:
- the third sun gear serving as the power input element;
- the first sun gear serving as the first power output element; and
- the carrier serving as the first differential reaction element, the second power transmission gear set comprises:
- the third sun gear serving as the power input element;
- the second sun gear serving as the second power output element; and
- the carrier serving as the second differential reaction element, the reversing mechanism comprises:
- the first planetary gear, the second planetary gear, and the third planetary gear;
- the first sun gear, the second sun gear, and the third sun gear; and
- the carrier, the first control gear set comprises:
- the carrier serving as the control input element; and
- the first sun gear serving as the first gear to serve as the first control output element, the second control gear set comprises:
the carrier serving as the control input element; and
the second sun gear serving as the second gear to serve as the second control output element,
a number of teeth of the first sun gear, a number of teeth of the second sun gear, and a number of teeth of the third sun gear are identical to one another,
a number of teeth of the first planetary gear is larger than a number of teeth of the third planetary gear, and
a number of teeth of the second planetary gear is smaller than the number of teeth of the third planetary gear.

8. The torque vectoring device according to claim 5,
wherein the differential mechanism comprises:
the first planetary gear, the second planetary gear, and the third planetary gear;
a first sun gear, a second sun gear, and a third sun gear arranged coaxially with one another while engaging with the first planetary gear, the second planetary gear, and the third planetary gear, respectively;
the carrier; and
a ring gear as an internal gear engaging with the third planetary gear,
the first sun gear, the second sun gear, and the third sun gear are allowed to rotate relatively to one another,
the first power transmission gear set comprises:
the third sun gear serving as the power input element;
the first sun gear serving as the first power output element; and
the ring gear serving as the first differential reaction element,
the second power transmission gear set comprises:
the third sun gear serving as the power input element;
the second sun gear serving as the second power output element; and
the ring gear serving as the second differential reaction element,
the reversing mechanism comprises:
the first planetary gear, the second planetary gear, and the third planetary gear;
the first sun gear, the second sun gear, and the third sun gear;
the carrier; and
the ring gear,
the first control gear set comprises:
the ring gear serving as the control input element; and
the first sun gear serving as the first gear to serve as the first control output element,
the second control gear set comprises:
the ring gear serving as the control input element; and
the second sun gear serving as the second gear to serve as the second control output element,
a number of teeth of the first sun gear, a number of teeth of the second sun gear, and a number of teeth of the third sun gear are identical to one another,
a number of teeth of the first planetary gear is larger than a number of teeth of the third planetary gear, and
a number of teeth of the second planetary gear is smaller than the number of teeth of the third planetary gear.

9. The torque vectoring device according to claim 5,
wherein the differential mechanism comprises:
the first planetary gear, the second planetary gear, and the third planetary gear;
a first ring gear as an internal gear, a second ring gear as an internal gear, and a third ring gear as an internal gear arranged coaxially with one another while engaging with the first planetary gear, the second planetary gear, and the third planetary gear, respectively; and
the carrier,
the first ring gear, the second ring gear, and the third ring gear are allowed to rotate relatively to one another,
the first power transmission gear set comprises:
the third ring gear serving as the power input element;
the first ring gear serving as the first power output element; and
the carrier serving as the first differential reaction element,
the second power transmission gear set comprises:
the third ring gear serving as the power input element;
the second ring gear serving as the second power output element; and
the carrier serving as the second differential reaction element,
the reversing mechanism comprises:
the first planetary gear, the second planetary gear, and the third planetary gear;
the first ring gear, the second ring gear, and the third ring gear; and
the carrier,
the first control gear set comprises:
the carrier serving as the control input element; and
the first ring gear serving as the first gear to serve as the first control output element,
the second control gear set comprises:
the carrier serving as the control input element; and
the second ring gear serving as the second gear to serve as the second control output element,
a number of teeth of the first ring gear, a number of teeth of the second ring gear, and a number of teeth of the third ring gear are identical to one another,
a number of teeth of the first planetary gear is larger than a number of teeth of the third planetary gear, and
a number of teeth of the second planetary gear is smaller than the number of teeth of the third planetary gear.

10. The torque vectoring device according to claim 5,
wherein the differential mechanism (2) comprises:
the first planetary gear, the second planetary gear, and the third planetary gear;
a first sun gear, a second sun gear, and a third sun gear arranged coaxially with one another while engaging with the first planetary gear, the second planetary gear, and the third planetary gear, respectively; and
the carrier,
the first sun gear, the second sun gear, and the third sun gear are allowed to rotate relatively to one another,
the first power transmission gear set comprises:
the third sun gear serving as the power input element;
the first sun gear serving as the first power output element; and
the carrier serving as the first differential reaction element,
the second power transmission gear set comprises:
the third sun gear serving as the power input element;
the second sun gear serving as the second power output element; and
the carrier serving as the second differential reaction element,
the reversing mechanism comprises:
the first planetary gear, the second planetary gear, and the third planetary gear;

the first sun gear, the second sun gear, and the third sun gear; and
the carrier,
the first control gear set comprises:
the carrier serving as the control input element; and
the first sun gear serving as the first gear to serve as the first control output element,
the second control gear set comprises:
the carrier serving as the control input element; and
the second sun gear serving as the second gear to serve as the second control output element,
a number of teeth of the first sun gear, a number of teeth of the second sun gear, and a number of teeth of the third sun gear are identical to one another,
a number of teeth of the first planetary gear is larger than a number of teeth of the third planetary gear,
a number of teeth of the second planetary gear is smaller than the number of teeth of the third planetary gear, and
the torque vectoring device further comprises a speed reducing gear set that transmits the control torque of the actuator to the carrier while multiplying the control torque.

11. The torque vectoring device according to claim 5,
wherein the differential mechanism comprises:
the first planetary gear, the second planetary gear, and the third planetary gear;
a first sun gear, a second sun gear, and a third sun gear arranged coaxially with one another while engaging with the first planetary gear, the second planetary gear, and the third planetary gear, respectively; and
the carrier,
the first sun gear, the second sun gear, and the third sun gear are allowed to rotate relatively to one another,
the first power transmission gear set comprises:
the third sun gear serving as the power input element;
the first sun gear serving as the first power output element; and
the carrier serving as the first differential reaction element,
the second power transmission gear set comprises:
the third sun gear serving as the power input element;
the second sun gear serving as the second power output element; and
the carrier serving as the second differential reaction element,
the reversing mechanism comprises:
the first planetary gear, the second planetary gear, and the third planetary gear;
the first sun gear, the second sun gear, and the third sun gear; and
the carrier,
the torque vectoring device further comprises a speed reducing gear set that transmits the control torque of the actuator to the carrier while multiplying the control torque,
the speed reducing gear set comprises a fourth sun gear, a ring gear, and the carrier,
the first control gear set comprises:
the fourth sun gear serving as the control input element; and
the first sun gear serving as the first gear to serve as the first control output element,
the second control gear set comprises:
the fourth sun gear serving as the control input element; and
the second sun gear serving as the second gear to serve as the second control output element,
a number of teeth of the first sun gear, a number of teeth of the second sun gear, and a number of teeth of the third sun gear are identical to one another,
a number of teeth of the first planetary gear is larger than a number of teeth of the third planetary gear, and
a number of teeth of the second planetary gear is smaller than the number of teeth of the third planetary gear.

12. The torque vectoring device according to claim 11,
wherein the speed reducing gear set further comprises a fourth planetary gear that engages with the fourth sun gear and the ring gear,
the fourth planetary gear is arranged coaxially with the first planetary gear, the second planetary gear, and the third planetary gear while being allowed to rotate relatively to the first planetary gear, the second planetary gear, and the third planetary gear, and
the first planetary gear, the second planetary gear, the third planetary gear, and the fourth planetary gear are supported by the carrier in a rotatable and revolvable manner.

13. The torque vectoring device according to claim 6,
wherein the differential mechanism comprises:
the first planetary gear, the second planetary gear, the third planetary gear, and the fourth planetary gear;
a first ring gear as an internal gear, a second ring gear as an internal gear, a third ring gear as an internal gear, and a fourth ring gear arranged coaxially with one another while engaging with the first planetary gear, the second planetary gear, the third planetary gear, and the fourth planetary gear, respectively; and
the carrier,
the third ring gear and the fourth ring gear rotate integrally,
the first ring gear and the second ring gear are allowed to rotate relatively to the third ring gear and the fourth ring gear,
the first power transmission gear set comprises:
the third ring gear serving as the power input element;
the first ring gear serving as the first power output element; and
the carrier serving as the first differential reaction element,
the second power transmission gear set comprises:
the fourth ring gear serving as the power input element;
the second ring gear serving as the second power output element; and
the carrier serving as the second differential reaction element,
the reversing mechanism comprises:
the first planetary gear, the second planetary gear, the third planetary gear, and the fourth planetary gear;
the first ring gear, the second ring gear, the third ring gear, and the fourth ring gear; and
the carrier,
the first control gear set comprises:
the carrier serving as the control input element; and
the first ring gear serving as the first gear to serve as the first control output element,
the second control gear set comprises:
the carrier serving as the control input element; and
the second ring gear serving as the second gear to serve as the second control output element,
a number of teeth of the first planetary gear, a number of teeth of the second planetary gear, a number of teeth of the third planetary gear, and a number of teeth of the fourth planetary gear are identical to one another, a number of teeth of the first ring gear and a number of teeth of the second ring gear are identical to each other, a number of teeth of the third ring gear is smaller than the number of teeth of the first ring gear and the number of teeth of the second ring gear, and a number of teeth of the fourth ring gear is larger than the number of teeth of the first ring gear and the number of teeth of the second ring gear.

14. The torque vectoring device according to claim 1, wherein in the differential mechanism, the power input element is connected to the input member, the first power output element is connected to the first driveshaft, the second power output element is connected to the second driveshaft, and the first differential reaction element and the second differential reaction element are connected to the actuator through the reversing mechanism, in the reversing mechanism, the control input element is connected to the actuator, the first gear serves as the control input element or the first control output element, the second gear serves as the control input element or the second control output element, and the reversing mechanism transmits the control torque applied to the control input element to the first differential reaction element and the second differential reaction element while multiplying the control torque.

15. The torque vectoring device according to claim 14, wherein the first control gear set and the second control gear set of the reversing mechanism serve as a speed reducing mechanism that multiplies the control torque, the control torque multiplied by the first control gear set is delivered to the first differential reaction element, and the control torque multiplied by the second control gear set is delivered to the second differential reaction element.

16. The torque vectoring device according to claim 14, further comprising:

a first speed reducing mechanism that multiplies the torque delivered to the first driveshaft; and a second speed reducing mechanism that multiplies the torque delivered to the second driveshaft and that is arranged coaxially with the first speed reducing mechanism, wherein the first power output element and the first driveshaft are connected to each other through the first speed reducing mechanism, the second power output element and the second driveshaft are connected to each other through the second speed reducing mechanism, and the reversing mechanism is arranged between the first speed reducing mechanism and the second speed reducing mechanism in an axial direction.

17. The torque vectoring device according to claim 14, wherein the reversing mechanism comprises:

a first planetary gear, a second planetary gear, a third planetary gear, and a fourth planetary gear arranged coaxially with one another;

a first sun gear, a second sun gear, a third sun gear, and a fourth sun gear arranged coaxially with one another while engaging with the first planetary gear, the second planetary gear, the third planetary gear, and the fourth planetary gear, respectively; and a carrier that supports the first planetary gear, the second planetary gear, the third planetary gear, and the fourth planetary gear in a rotatable and revolvable manner, the first planetary gear rotates integrally with the third planetary gear, the second planetary gear rotates integrally with the fourth planetary gear, a pair of the first planetary gear and the third planetary gear and a pair of the second planetary gear and the fourth planetary gear are allowed to rotate relatively to each other, the third sun gear and the fourth sun gear are joined to each other, the first sun gear, the second sun gear, and a unit of the third sun gear and the fourth sun gear are allowed to rotate relatively to one another, the first sun gear is joined to the first differential reaction element, the second sun gear is joined to the second differential reaction element, the first control gear set comprises:

the carrier serving as the control input element; and the first sun gear serving as the first gear to serve as the first control output element, the second control gear set comprises:

the carrier serving as the control input element; and the second sun gear serving as the second gear to serve as the second control output element, a number of teeth of the first sun gear, a number of teeth of the second sun gear, a number of teeth of the third sun gear, and a number of teeth of the fourth sun gear are identical to one another, a number of teeth of the third planetary gear and a number of teeth of the fourth planetary gear are identical to each other, a number of teeth of the first planetary gear is larger than the number of teeth of the third planetary gear and the number of teeth of the fourth planetary gear, and a number of teeth of the second planetary gear is smaller than the number of teeth of the third planetary gear and the number of teeth of the fourth planetary gear.

18. The torque vectoring device according to claim 14, wherein the reversing mechanism comprises:

a first planetary gear, a second planetary gear, and a third planetary gear arranged coaxially with one another;

a first sun gear, a second sun gear, and a third sun gear arranged coaxially with one another while engaging with the first planetary gear, the second planetary gear, and the third planetary gear, respectively; and a carrier that supports the first planetary gear, the second planetary gear, and the third planetary gear in a rotatable and revolvable manner, the first planetary gear, the second planetary gear, and the third planetary gear rotate integrally, the first sun gear, the second sun gear, and the third sun gear are allowed to rotate relatively to one another, the first sun gear is connected to the first differential reaction element, the second sun gear is connected to the second differential reaction element, the first control gear set comprises:

the carrier serving as the control input element; and the first sun gear serving as the first gear to serve as the first control output element, the second control gear set comprises:
   the carrier serving as the control input element; and
   the second sun gear serving as the second gear to serve as the second control output element,
a number of teeth of the first sun gear, a number of teeth of the second sun gear, and a number of teeth of the third sun gear are identical to one another,
a number of teeth of the first planetary gear is smaller than a number of teeth of the third planetary gear, and
a number of teeth of the second planetary gear is larger than the number of teeth of the third planetary gear.

19. The torque vectoring device according to claim 14, wherein the reversing mechanism comprises:
   a first planetary gear, a second planetary gear, a third planetary gear, and a fourth planetary gear arranged coaxially with one another;
   a first sun gear, a second sun gear, a third sun gear, and a fourth sun gear arranged coaxially with one another while engaging with the first planetary gear, the second planetary gear, the third planetary gear, and the fourth planetary gear, respectively;
   a first ring gear as an internal gear, a second ring gear as an internal gear, a third ring gear as an internal gear, and a fourth ring gear as an internal gear arranged coaxially with one another while engaging with the first planetary gear, the second planetary gear, the third planetary gear, and the fourth planetary gear, respectively; and
   a first carrier, a second carrier, and a third carrier arranged coaxially with one another while supporting the first planetary gear, the second planetary gear, the third planetary gear and the fourth planetary gear respectively in a rotatable and revolvable manner,
the first planetary gear, the second planetary gear, the third planetary gear, and the fourth planetary gear are allowed to rotate relatively to one another,
the first sun gear and the third sun gear rotate integrally,
the second sun gear and the fourth sun gear rotate integrally,
a unit of the first sun gear and the third sun gear and a unit of the second sun gear and the fourth sun gear are allowed to rotate relatively to each other,
the first ring gear, the second ring gear, the third ring gear, and the fourth ring gear rotate integrally,
the first carrier, the second carrier, and the third carrier are allowed to rotate relatively to one another,
the first carrier is connected to the first differential reaction element,
the second carrier is connected to the second differential reaction element,
the first control gear set comprises:
   the first ring gear serving as the first gear to serve as the control input element; and
   the first carrier serving as the first control output element,
the second control gear set comprises:
   the second ring gear serving as the second gear to serve as the control input element; and
   the second carrier serving as the second control output element,
a number of teeth of the first planetary gear, a number of teeth of the second planetary gear, a number of teeth of the third planetary gear, and a number of teeth of the fourth planetary gear are identical to one another,
a number of teeth of the third sun gear and a number of teeth of the fourth sun gear are identical to each other,
a number of teeth of the first sun gear is smaller than the number of teeth of the third sun gear and the number of teeth of the fourth sun gear,
a number of teeth of the second sun gear is larger than the number of teeth of the third sun gear and the number of teeth of the fourth sun gear,
a number of teeth of the third ring gear and a number of teeth of the fourth ring gear are identical to each other,
a number of teeth of the first ring gear is larger than the number of teeth of the third ring gear and the number of teeth of the fourth ring gear, and
a number of teeth of the second ring gear is smaller than the number of teeth of the third ring gear and the number of teeth of the fourth ring gear.

20. The torque vectoring device according to claim 14, wherein the reversing mechanism comprises:
   a first planetary gear, a second planetary gear, and a third planetary gear arranged coaxially with one another;
   a first sun gear, a second sun gear, and a third sun gear arranged coaxially with one another while engaging with the first planetary gear, the second planetary gear, and the third planetary gear, respectively;
   a first ring gear as an internal gear, a second ring gear as an internal gear, and a third ring gear as an internal gear arranged coaxially with one another while engaging with the first planetary gear, the second planetary gear, and the third planetary gear, respectively; and
   a first carrier, a second carrier, and a third carrier arranged coaxially with one another while supporting the first planetary gear, the second planetary gear, and the third planetary gear respectively in a rotatable and revolvable manner,
the first sun gear, the second sun gear, and the third sun gear rotate integrally,
the first ring gear, the second ring gear, and the third ring gear rotate integrally,
the first carrier, the second carrier, and the third carrier are allowed to rotate relatively to one another,
the first carrier is connected to the first differential reaction element,
the second carrier is connected to the second differential reaction element,
the first control gear set comprises:
   the first ring gear serving as the first gear to serve as the control input element; and
   the first carrier serving as the first control output element,
the second control gear set comprises:
   the second ring gear serving as the second gear to serve as the control input element; and
   the second carrier serving as the second control output element,
a number of teeth of the first planetary gear, a number of teeth of the second planetary gear, and a number of teeth of the third planetary gear are identical to one another,
a number of teeth of the first sun gear is smaller than a number of teeth of the third sun gear,
a number of teeth of the second sun gear is larger than the number of teeth of the third sun gear,
a number of teeth of the first ring gear is larger than a number of teeth of the third ring gear, and
a number of teeth of the second ring gear is smaller than the number of teeth of the third ring gear.

21. The torque vectoring device according to claim 14, wherein the reversing mechanism comprises:
- a first planetary gear, a second planetary gear, and a third planetary gear arranged coaxially with one another;
- a first sun gear, a second sun gear, and a third sun gear arranged coaxially with one another while engaging with the first planetary gear, the second planetary gear, and the third planetary gear, respectively;
- a ring gear as an internal gear that engages with the second planetary gear; and
- a first carrier supporting the first planetary gear and the third planetary gear in a rotatable and revolvable manner, and a second carrier supporting the second planetary gear in a rotatable and revolvable manner that is arranged coaxially with the first carrier,
- the first planetary gear and the third planetary gear rotate integrally with each other, but relatively to the second planetary gear,
- the first sun gear, the second sun gear, and the third sun gear are allowed to rotate relatively to one another,
- the first carrier and the second carrier are allowed to rotate relatively to each other,
- the first carrier is connected to the second sun gear,
- the third sun gear and the ring gear are fixed to be halted,
- the first sun gear is connected to the first differential reaction element,
- the second carrier is connected to the second differential reaction element,
- the first control gear set comprises:
  - the first carrier serving as the control input element; and
  - the first sun gear serving as the first gear to serve as the first control output element,
- the second control gear set comprises:
  - the second sun gear serving as the second gear to serve as the control input element; and
  - the second carrier serving as the second control output element,
- a gear ratio of a gear train to transmit the control torque to the first differential reaction element through the first carrier, the first planetary gear, and the first sun gear is different from a gear ratio of a gear train to transmit the control torque to the second differential reaction element through the second sun gear, the second planetary gear, and the second carrier.

22. The torque vectoring device according to claim 17, wherein the input member comprises an output shaft as a hollow shaft that transmits the torque of the prime mover to the differential mechanism,
the actuator comprises an output shaft as a hollow shaft that transmits the control torque to the reversing mechanism, and
the reversing mechanism is held in hollow spaces of the output shaft of the input member and the output shaft of the actuator.

23. The torque vectoring device according to claim 15, wherein the actuator comprises:
- a first rotary shaft protruding toward the first driveshaft to transmit the control torque to the first driveshaft; and
- a second rotary shaft protruding toward the second driveshaft to transmit the control torque to the second driveshaft,
- the reversing mechanism comprises the first control gear set, and the second control gear set arranged on both sides of the actuator,
- the first control gear set comprises a first input shaft to which the control torque is applied, and a first output shaft which delivers the control torque to the first driveshaft,
- the second control gear set comprises a second input shaft to which the control torque is applied, and a second output shaft which delivers the control torque to the second driveshaft,
- the first rotary shaft is connected to the first input shaft,
- the second rotary shaft is connected to the second input shaft,
- the first output shaft is connected to the first differential reaction element,
- the second output shaft is connected to the second differential reaction element,
- a gear ratio of a gear train transmitting the control torque to the first differential reaction element through the first rotary shaft, the first input shaft, the first control gear set, and the first output shaft is different from a gear ratio of a gear train transmitting the control torque to the second differential reaction element through the second rotary shaft, the second input shaft, the second control gear set, and the second output shaft.

24. The torque vectoring device according to claim 1, wherein the actuator includes:
- a motor that generates a drive torque as the control torque to rotate the first differential reaction element and the second differential reaction element; or
- a brake mechanism that generates a brake torque as the control torque to brake the first differential reaction element and the second differential reaction element.

25. The torque vectoring device according to claim 1, wherein the prime mover includes at least one of:
- a motor that generates a drive torque to drive the first driveshaft and the second driveshaft; and
- a brake device that generates a brake torque to brake the first driveshaft and the second driveshaft.

* * * * *